US012145681B2

(12) United States Patent
Stephens et al.

(10) Patent No.: US 12,145,681 B2
(45) Date of Patent: Nov. 19, 2024

(54) BICYCLE VISIBILITY SYSTEM FOR AN ELECTRIC BICYCLE

(71) Applicant: Rad Power Bikes Inc., Seattle, WA (US)

(72) Inventors: Redwood Stephens, Seattle, WA (US); Kyle Lobisser, Seattle, WA (US); Derek Gutheil, Seattle, WA (US); Jake Silsby, Seattle, WA (US); Andrew Ressa, Seattle, WA (US); Neal Wilding, Seattle, WA (US); Zachary Williams, Seattle, WA (US)

(73) Assignee: Rad Power Bikes Inc., Seattle, WA (US)

( * ) Notice: Subject to any disclaimer, the term of this patent is extended or adjusted under 35 U.S.C. 154(b) by 249 days.

(21) Appl. No.: 17/564,001

(22) Filed: Dec. 28, 2021

(65) Prior Publication Data
US 2023/0202596 A1    Jun. 29, 2023

Related U.S. Application Data

(63) Continuation of application No. 17/563,613, filed on Dec. 28, 2021.

(51) Int. Cl.
*G08B 21/00* (2006.01)
*B60L 15/10* (2006.01)
(Continued)

(52) U.S. Cl.
CPC ............... *B62J 6/028* (2020.02); *B60L 15/10* (2013.01); *B60L 15/20* (2013.01);
(Continued)

(58) Field of Classification Search
CPC ....... B62J 6/028; B62J 1/28; B62J 3/10; B62J 6/015; B62J 6/057; B62J 6/22; B62J 6/24;
(Continued)

(56) References Cited

U.S. PATENT DOCUMENTS

2010/0123402 A1* 5/2010 Chen ................... B62H 5/20
                                                                        315/156
2010/0283590 A1* 11/2010 Tee ............................ B62J 6/01
                                                                        340/432

(Continued)

FOREIGN PATENT DOCUMENTS

JP      2017-159674 A      9/2017
JP       2017206242 A     11/2017
(Continued)

OTHER PUBLICATIONS

International Search Report and Written Opinion dated Jun. 8, 2023 for International Application No. PCT/US2022/081926.

*Primary Examiner* — Mark S Rushing
(74) *Attorney, Agent, or Firm* — AMPACC Law Group, PLLC

(57) ABSTRACT

Various systems and methods associated with protecting a rider of an electric bicycle from hazards while riding their bicycle are described. In some embodiments, the systems and methods enhance the safety of the rider in response current detected conditions surrounding the rider, such as conditions associated with the route or path traveled by the rider, other vehicles within the route or path traveled by the rider, potential hazards within the route or path traveled by the rider, environmental conditions through which the rider is traveling, and so on.

20 Claims, 36 Drawing Sheets

(51) Int. Cl.
| | |
|---|---|
| B60L 15/20 | (2006.01) |
| B60L 58/10 | (2019.01) |
| B62J 1/28 | (2006.01) |
| B62J 3/10 | (2020.01) |
| B62J 6/015 | (2020.01) |
| B62J 6/028 | (2020.01) |
| B62J 6/057 | (2020.01) |
| B62J 6/22 | (2020.01) |
| B62J 6/24 | (2020.01) |
| B62J 6/26 | (2020.01) |
| B62J 27/00 | (2020.01) |
| B62J 43/13 | (2020.01) |
| B62J 45/20 | (2020.01) |
| B62J 45/41 | (2020.01) |
| B62J 45/416 | (2020.01) |
| B62J 45/42 | (2020.01) |
| B62J 45/421 | (2020.01) |
| B62J 45/422 | (2020.01) |
| B62J 50/21 | (2020.01) |
| B62J 50/22 | (2020.01) |
| B62K 11/00 | (2006.01) |
| B62K 11/10 | (2006.01) |
| B62K 21/12 | (2006.01) |
| B62M 6/40 | (2010.01) |
| B62M 6/45 | (2010.01) |
| B62M 6/50 | (2010.01) |
| B62M 6/55 | (2010.01) |
| B62M 6/60 | (2010.01) |
| B62M 6/90 | (2010.01) |
| G06V 20/56 | (2022.01) |
| G06V 20/58 | (2022.01) |
| G08G 1/16 | (2006.01) |
| B62J 45/412 | (2020.01) |
| B62J 45/414 | (2020.01) |
| B62J 45/415 | (2020.01) |
| B62K 11/02 | (2006.01) |

(52) U.S. Cl.
CPC ........... *B60L 15/2009* (2013.01); *B60L 58/10* (2019.02); *B62J 1/28* (2013.01); *B62J 3/10* (2020.02); *B62J 6/015* (2020.02); *B62J 6/057* (2020.02); *B62J 6/22* (2020.02); *B62J 6/24* (2020.02); *B62J 6/26* (2020.02); *B62J 27/00* (2013.01); *B62J 43/13* (2020.02); *B62J 45/20* (2020.02); *B62J 45/41* (2020.02); *B62J 45/416* (2020.02); *B62J 45/42* (2020.02); *B62J 45/421* (2020.02); *B62J 45/422* (2020.02); *B62J 50/21* (2020.02); *B62J 50/22* (2020.02); *B62K 11/00* (2013.01); *B62K 11/10* (2013.01); *B62K 21/12* (2013.01); *B62M 6/40* (2013.01); *B62M 6/45* (2013.01); *B62M 6/50* (2013.01); *B62M 6/55* (2013.01); *B62M 6/60* (2013.01); *B62M 6/90* (2013.01); *G06V 20/58* (2022.01); *G06V 20/588* (2022.01); *G08G 1/166* (2013.01); B60L 2200/12 (2013.01); B60L 2250/20 (2013.01); B60L 2250/22 (2013.01); *B62J 45/412* (2020.02); *B62J 45/414* (2020.02); *B62J 45/415* (2020.02); *B62K 11/02* (2013.01); B62K 2204/00 (2013.01)

(58) Field of Classification Search
CPC ..... B62J 6/26; B62J 27/00; B62J 43/13; B62J 45/20; B62J 45/41; B62J 45/416; B62J 45/42; B62J 45/421; B62J 45/422; B62J 50/21; B62J 50/22; B62J 45/412; B62J 45/414; B62J 45/415; B62J 50/25; B62J 6/01; B60L 15/10; B60L 15/20; B60L 15/2009; B60L 58/10; B60L 2200/12; B60L 2250/20; B60L 2250/22; B60L 3/0015; B60L 50/20; B62K 11/00; B62K 11/10; B62K 21/12; B62K 11/02; B62K 2204/00; B62M 6/40; B62M 6/45; B62M 6/50; B62M 6/55; B62M 6/60; B62M 6/90; G06V 20/58; G06V 20/588; G08G 1/166; B62H 5/18; B62H 5/20
USPC .......................................................... 340/432
See application file for complete search history.

(56) References Cited

U.S. PATENT DOCUMENTS

| | | | |
|---|---|---|---|
| 2014/0203923 A1* | 7/2014 | Lai | G01C 21/365 340/432 |
| 2016/0159432 A1* | 6/2016 | Nishikawa | B62K 11/00 356/402 |
| 2018/0001952 A1* | 1/2018 | Rajamani | B62J 45/41 |
| 2018/0326906 A1 | 11/2018 | Savaresi et al. | |
| 2019/0002052 A1* | 1/2019 | Chen | B62J 6/015 |
| 2022/0012995 A1* | 1/2022 | Oboril | B62J 45/40 |

FOREIGN PATENT DOCUMENTS

| | | |
|---|---|---|
| JP | 2018-118710 A | 8/2018 |
| KR | 101743721 B1 | 6/2017 |
| KR | 20180058968 A | 6/2018 |
| WO | WO-2018017100 A1 * | 1/2018 |

* cited by examiner

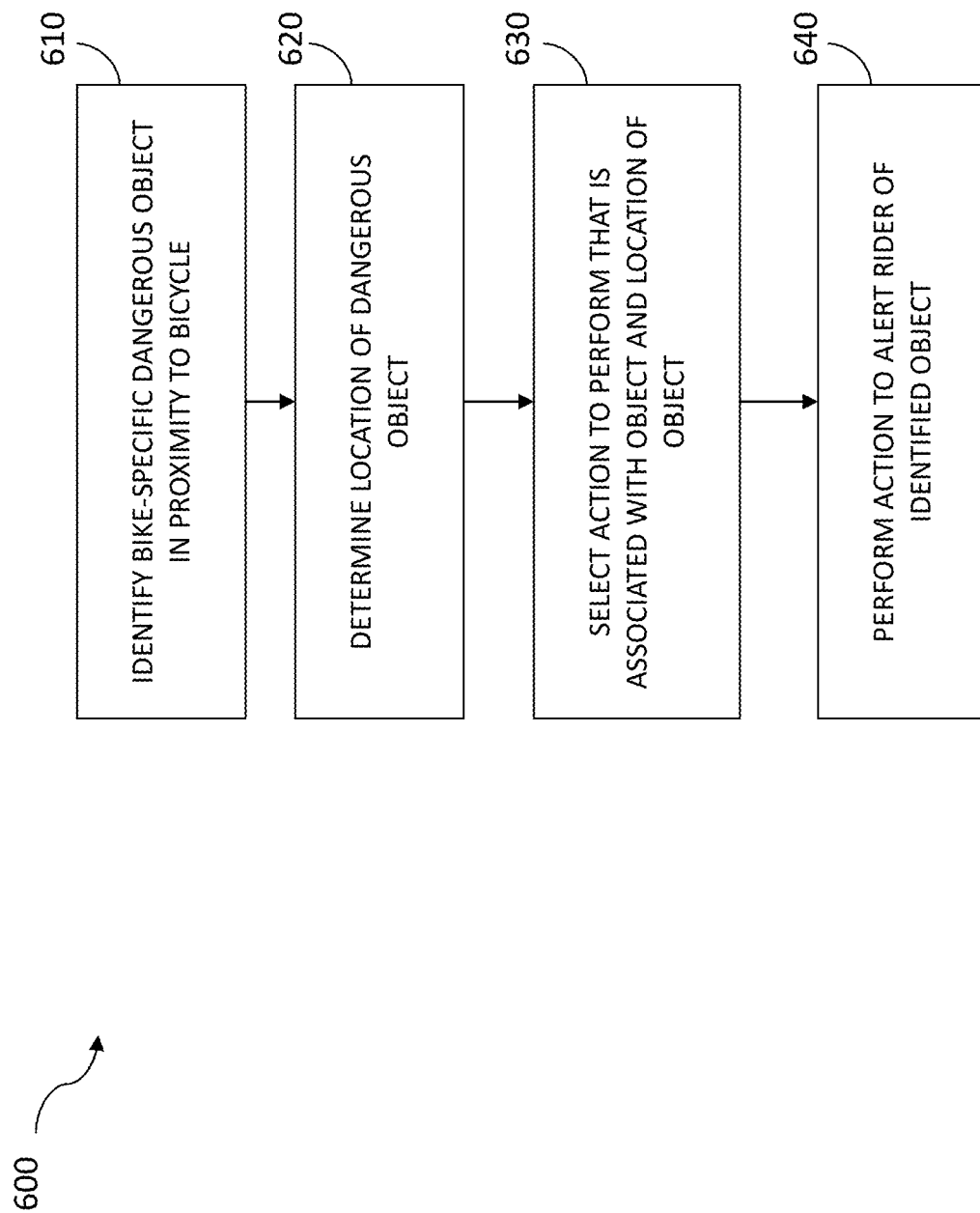

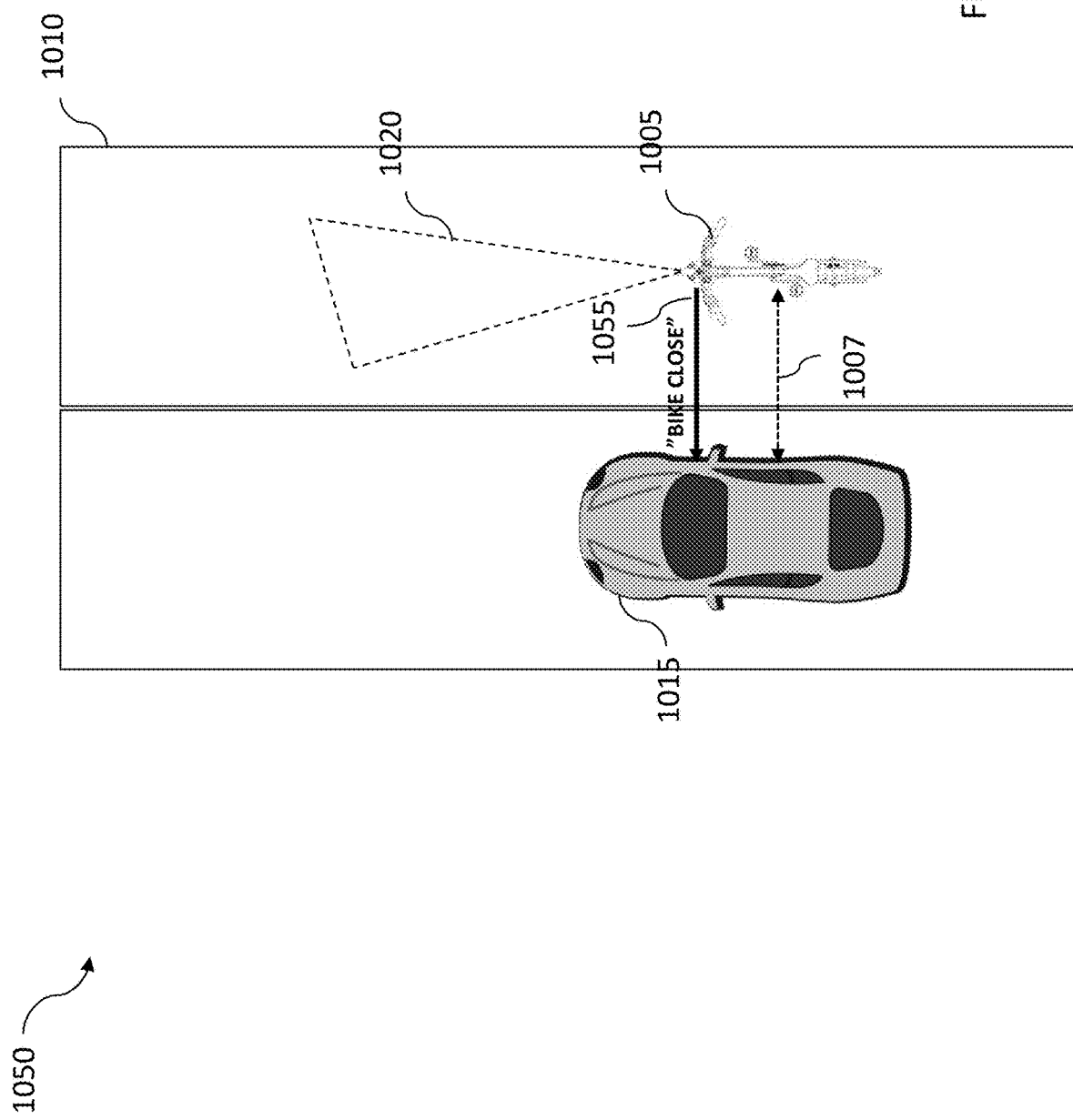

BICYCLE VISIBILITY SYSTEM FOR AN ELECTRIC BICYCLE

CROSS REFERENCE TO RELATED APPLICATIONS

This application is a continuation of U.S. patent application Ser. No. 17/563,613, filed on Dec. 28, 2021, entitled SAFETY SYSTEMS AND MODES OF LIGHTING FOR ELECTRIC BICYCLES, which is hereby incorporated by reference in its entirety.

This application is related to U.S. patent application Ser. No. 17/216,440, filed on Mar. 29, 2021, entitled SECURITY SYSTEMS AND COMMUNICATION NETWORKS FOR ELECTRIC BICYCLES, which is hereby incorporated by reference in its entirety.

BACKGROUND

Electric bicycles, or e-bikes, are a popular method of transportation for use by individual riders, families, commercial enterprises, and so on. Riders utilize e-bikes for many different types of travel, including bike trips, commuting, transporting cargo, carrying children and other passengers, making deliveries within cities and other urban environments, and so on. It follows that riders utilize e-bikes in all conditions (e.g., warm, cold, sunny, rainy, snowy, and so on) and at times of the day (e.g., early morning, during the day, at night, and so on).

Electric bicycles (and other bicycles) include components and devices that assist in enhancing the safety of a rider on their bicycle. These components/devices include lighting components (e.g., headlights, taillights, frame or rim lighting, downlighting), reflectors and reflective paint, and sensors (e.g., detection or tire pressure sensors) and associated detection systems. While such systems exist, they have not been widely adopted by riders, and suffer from lack of effectiveness or are useful in enhancing the rider's safety when riding on an e-bike or other bicycle.

These and other drawbacks exist with respect to conventional lighting and safety systems adapted for electric bicycles.

BRIEF DESCRIPTION OF THE DRAWINGS

Embodiments of the present technology will be described and explained through the use of the accompanying drawings.

FIG. 6 is a flow diagram illustrating an example method for performing an action for a rider of an electric bicycle in response to detecting a hazardous object.

FIGS. 10A-10D are diagrams illustrating different enhanced visibility actions.

Figure 1:
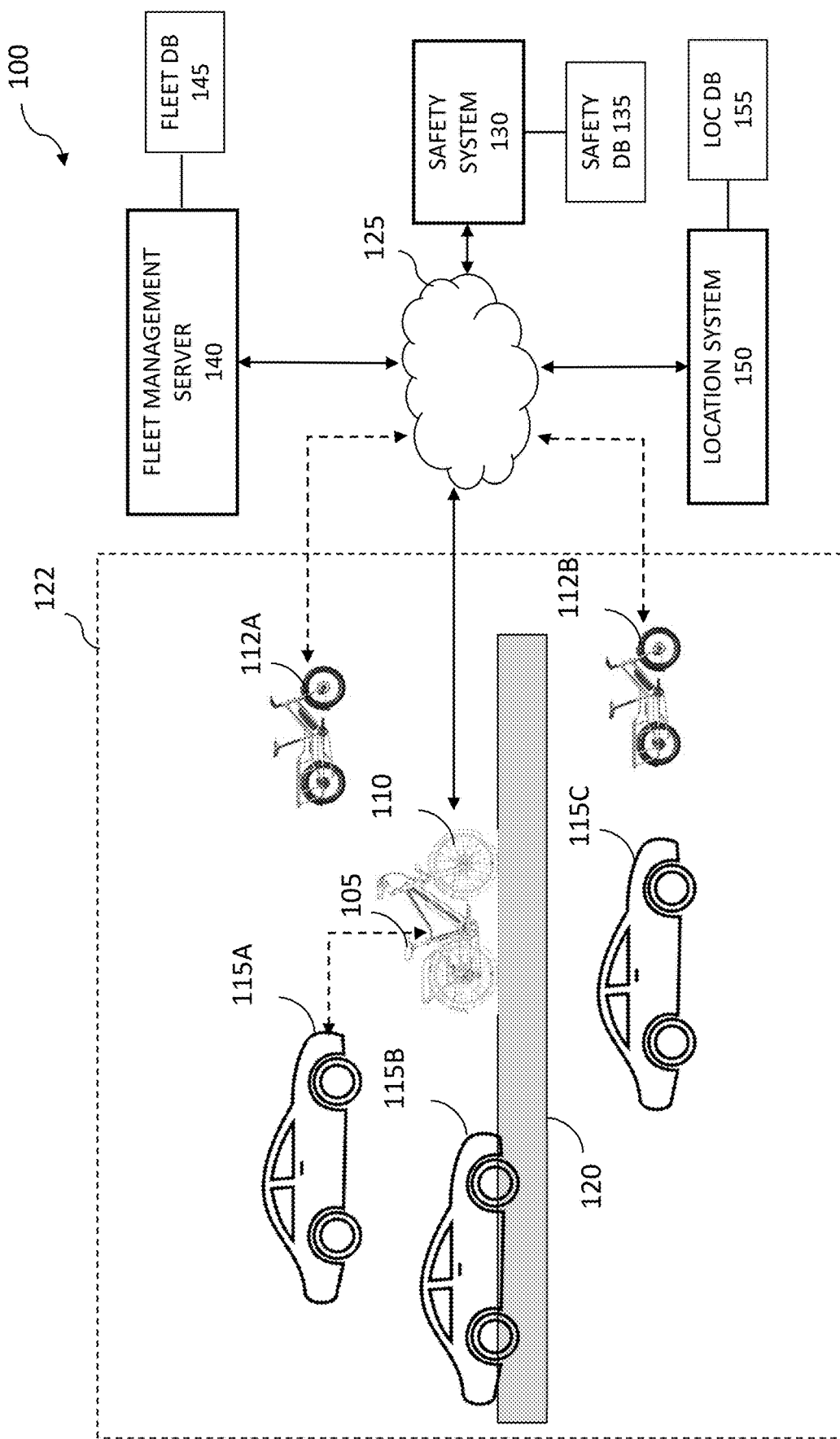
FIG. 1 is a diagram illustrating an electric bicycle and associated communication network.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

Various systems and methods associated with protecting a rider of an electric bicycle from hazards while riding their bicycle are described. In some embodiments, the systems and methods enhance the safety of the rider in response current detected conditions surrounding the rider, such as conditions associated with the route or path traveled by the rider, other vehicles within the route or path traveled by the rider, potential hazards within the route or path traveled by the rider, environmental conditions through which the rider is traveling, and so on.

Further, in some embodiments, the systems and methods modify and/or control operations of an electric bicycle based on information associated with the rider and/or conditions surrounding the rider as they ride their electric bicycle. The systems and methods can utilize and/or control lighting systems, haptic or audio feedback systems, alert systems, braking systems, and other bicycle supported safety components and devices.

In various embodiments, the technology described herein determines that a potential hazard or unsafe condition has or may arise for a rider of an electric bicycle and performs a bicycle or rider specific action to mitigate, prevent, and/or avoid the potential hazard or unsafe condition. To do so, the systems and methods described herein enhance or expand upon typical safety systems, such as lighting or avoidance systems (e.g., collision avoidance systems), by creating or targeting actions that protect a rider of a bicycle associated with a specific ride context or unsafe condition, among other benefits.

Thus, the systems and methods facilitate a safe and enjoyable rider experience by enhancing a rider's safety and/or optimizing the operation of their electric bicycle in response to conditions, hazards, and other factors affecting (or predicted to affect) the rider, among other benefits.

While described herein with respect to electric bicycles, in some embodiments aspects of the technology described herein can be configured or utilized with other bicycles or cycles, such as non-electric bicycles, tricycles, scooters or other wheeled micro-mobility vehicles, mopeds, and so on.

Various embodiments of the technology will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of Electric Bicycle Networks and Suitable Communication Environments

As described herein, the technology employs various systems and methods to provide a safe and enjoyable rider experience to a rider or user of an electric bicycle. FIG. 1 is a diagram 100 illustrating an electric bicycle 110 and associated network environment.

A rider 105 (e.g., user, cyclist, and so on) rides their electric bicycle 110 along a route or path 120 within a location, area, or environment 122. For example, the rider 105 can take a bike ride using the electric bicycle 110 on a road, street (e.g., in a bike lane or sharrow), bike path, and so on. The route/path 120 and/or location 122 can include other bicycles 112A-B or micro-mobility vehicles, as well as cars and other motorized vehicles 115A-C. Further, the route/path 120 and/or environment 122 can include various infrastructure devices or objects, including traffic signals, road signs, curbs or other roadway objects, and so on.

The rider 105 (e.g., via an associated mobile device) and electric bicycle 110 communicate over a network 125, such as a wireless or telecommunications network. As described herein, the electric bicycle 110 can include various wireless components that facilitate sending and receiving messages or data between the electric bicycle 110 and other vehicles, such as the bicycles 112A-B, the vehicles 115A-C, networked infrastructure components, and so on.

In some cases, the rider 105 and/or electric bicycle 110 communicates over the network 125 with a safety system 130, such as a system at a remote location (e.g., a cloud-based server) that facilitates the performance of various safety actions by the electric bicycle 110 within the environment 122. For example, the safety system 130 can include or incorporate aspects of various methods and systems, described in more detail herein, that detect hazards, determine safety actions to perform, and/or cause the electric bicycle 110 to modify current or future operations. The safety system 130 can include or be associated with a safety database, which can store information associated with the detection of hazards, the performance of safety actions, the capabilities or devices supported by the electric bicycle 110, and so on.

The rider 105 and/or electric bicycle 110 can also communicate over the network 125 with a fleet management server 140 configured to perform operations when managing a group or fleet of electric bicycles, such as the electric bicycle 110. For example, the fleet management server 140 can store data in an associated fleet database 145 for the electric bicycles of a managed fleet or fleets. The fleet management server 145 can communicate with the fleet bicycles, such as by sending information to the bicycles, receiving data from the bicycles (e.g., telematics or sensor data), and so on. In some cases, the fleet management server 140 manages the electric bicycles as Internet of Things (IoT) devices over the network 125.

The fleet database 145 can store data associated with the electric bicycles of the fleet, the riders employing the bicycles, the types of each of the bicycles, as well as data representing the use of the bicycles and their components (e.g., motors, batteries, controllers, and so on). For example, the fleet database 145 can store data collected from the bicycles that identifies the route traveled by the bicycles and the state and operation of the batteries, motors, and/or controllers of the bicycles. Further, the fleet database 145 can collect or receive sensor data from the bicycles, such as data from sensors that capture movement data for the bicycles and data from sensors that capture environmental data associated with the bicycles, the routes traveled by the bicycles, and/or the environment within which the bicycles travel, among other data.

In some embodiments, the fleet database 145 and/or the safety database 135 can store information associated with safety events, hazards, and/or unsafe conditions related to the electric bicycle 110 and/or a fleet of bicycles, as well as information associated with actions performed by the bicycles in response to hazards or unsafe conditions, when applicable. The tracking and storage of such information can enable the safety system 130 and/or the fleet management server 140 to identify or predict a safety context or base safety condition for a given location through which the bicycles travel. Further, the tracked information, collected from a group of bicycles, can inform the monitoring and actions performed on behalf of a single bicycle within the group of bicycles, enabling that single bicycle to benefit from safety determinations and actions performed for the other bicycles.

The tracked safety information can include accident information as well as "near miss" information, where an accident does not occur, but a dangerous condition and/or hazard was determined to be present with respect to a bicycle. Thus, the databases 135, 145 can be leveraged by the safety system 130 and fleet management server 140 to identify dangerous or potentially dangerous conditions or locations for the electric bicycle 110 without utilizing crash or other accident data sets obtained from various state organizations. These data sets can be incomplete and/or inaccurate in depicting the likely danger or unsafe condition of a route or location, because such data sets mainly track actual crash or accident occurrences.

As an example, the databases 135, 145 can track, for a given location or group of locations (e.g., a city or area of a city), information captured from electric bicycles as they travel through the locations. The following table depicts an example of information tracked and stored in the databases 135, 145:

TABLE 1

| Location | Event % | Action to be performed |
|---|---|---|
| Main/State intersection | 23% | base warning haptic feedback |
| Cherry Street Bike Path N | 7% | n/a |
| Cherry Street Bike Path S | 13% | Interface notification |

As depicted in Table 1, the database can store information, collected from a fleet of bicycles over time, that relates a location or area to an action to be performed for any electric bicycle that enters or travels through the location or area. For example, the first entry, associated with the location "Main/State intersection," indicated that 23 percent of all bicycles that have traveled through that location (e.g., a busy intersection in a city) have detected a hazard or unsafe condition (e.g., a car turning into a bike lane).

Based on that percentage meeting a certain threshold, the fleet management server 140 will cause a bicycle that enters that location to perform a "base warning haptic feedback" action (e.g., presenting haptic feedback via the grips of the bicycle to the rider) that proactively indicates to a rider that the bicycle is entering a predetermined unsafe location. Of course, Table 1 can include other types of information and/or other ways of tracking events and actions. Also, further details regarding other actions to perform are discussed herein.

The electric bicycle 110 can also communicate over the network 125 with a location system 150, such as a system that stores information about maps and routes (e.g., GPS information), such as in an associated location database 155. The location system 150 can also store and provide information obtained from various public databases, such as information that identifies accidents or crashes for locations, construction or other blockages of routes, re-routing of traffic, traffic patterns, topological information, and so on. The electric bicycle 110, the safety system 130, and/or the fleet management server 140 can request for and receive information from the location system 150.

While the various systems as depicted in FIG. 1 as being remotely located from the electric bicycle 110, some or all aspects of these systems can be incorporated into the systems of the electric bicycle 110, as described herein. Examples of the type of electrical and communication systems supported by the electric bicycle 110 will now be described.

Figure 2A:
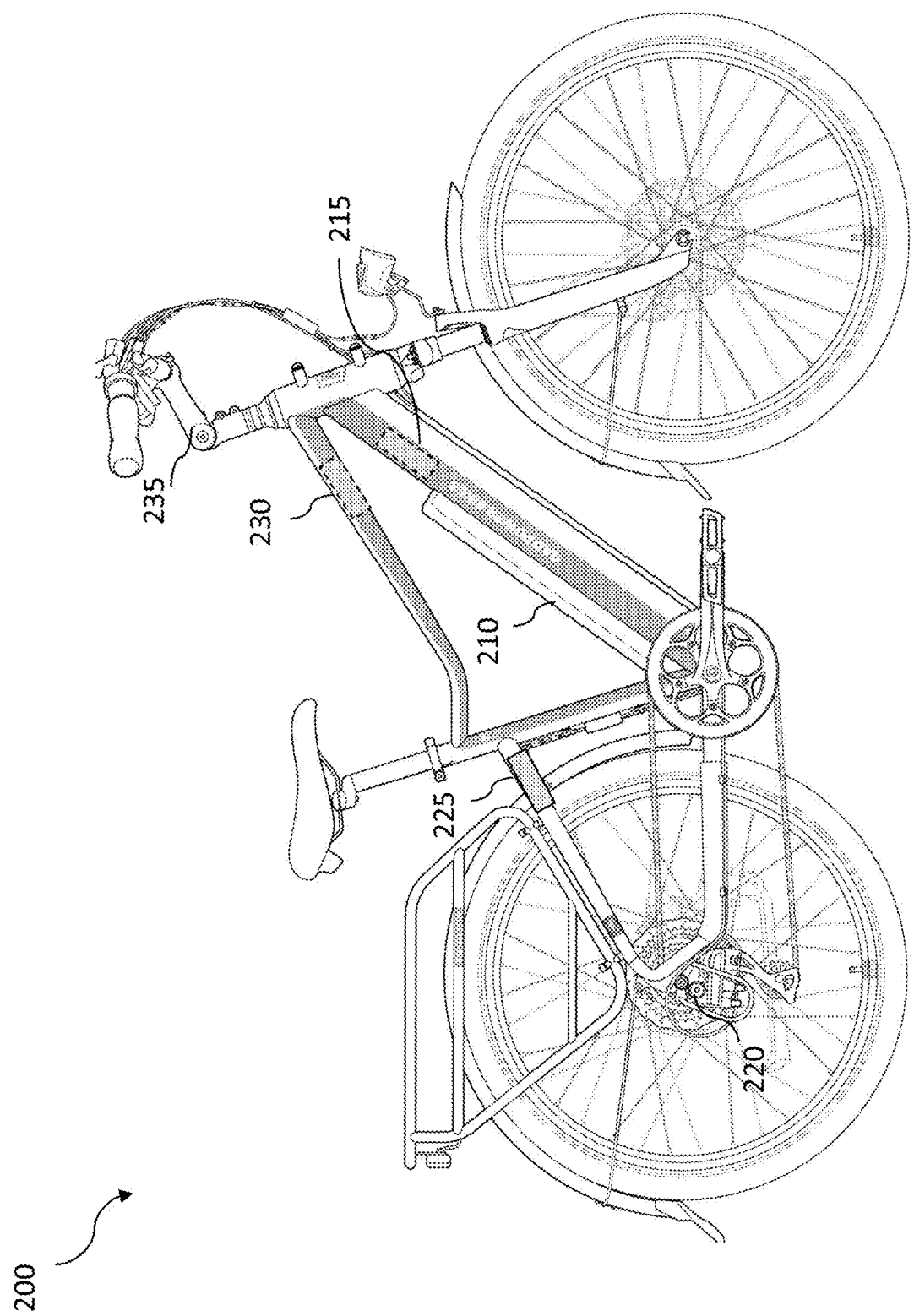
FIG. 2A is a diagram illustrating network components supported by an electric bicycle.

FIG. 2A depicts an electric bicycle 200, such as the electric bicycle 110, that incorporates many of the various features of the technology described herein. As depicted, the electric bicycle, or e-bike, is a city e-bike configured to be propelled either by human pedaling of the e-bike and/or via an electric motor that assists the human's pedal-power or propels the e-bike without pedaling (similar to a moped or scooter). Of course, the electric bicycle 200 can be of various other types or styles, including different classes of bikes (e.g., class 1, 2, or 3 e-bike), electric bikes having different frames (e.g., road bikes, commuter bikes, folding bikes, cargo bikes, trikes), and so on.

The electric bicycle 200 includes components common to bicycles, such as a front wheel and rear wheel that support a frame of the bicycle, a crankset (that supports pedals, not shown), a chain that extends from the crankset to a rear axle of the rear wheel, a seat, handlebars, cargo rack, and so on. The frame can include a head tube, a down tube, a top tube and a seat tube, as well as seat stays or other cross tubes. The front wheel can be attached to the frame via a fork connected to the head tube, and the rear wheel can be attached to the frame via a dropout assembly of the frame.

The electric bicycle 200 also includes a battery pack 210 positioned and/or mounted to a down tube of the frame, a controller 215 mounted within the down tube (and connected to the battery 210), and an electric motor 220 (e.g., a hub motor) mounted to the rear wheel, and connected to the controller 215 and battery pack 210. In some cases, the battery pack 210 and/or controller 215 can be integrated or semi-integrated into the frame of the electric bicycle 200. During operation of the electric bicycle 200, the battery pack 210 provides power to the electric motor 220, which propels the bicycle under control of the controller 215. In some configurations, the battery pack 21, the controller 215, and/or the motor 220 are mounted to other components of the frame (e.g., the motor 220 can be a mid-drive motor).

Further, the electric bicycle 200 can include an integrated security device 225. The integrated security device 225 can include a cable or tether lock component integrated with a wheel lock (having a sliding or rotating shackle), which enables a rider to secure his/her bicycle via one or two integrated mechanisms of deterrence or protection housed within the bike lock.

In order to communicate with the network 125, the electric bicycle 200 includes a communication device 230 (located inside the top tube), such as a wireless communication device that is configured to communicate over a wireless network, such as a cellular network. The communication device 230 can include components configured to communicate over the network 125, such as WiFi components, cellular components (e.g., 4G or 5G cellular components), Bluetooth components, and so on. For example, the communication device 230 can include various embedded sensors, processors (microprocessors), and connectivity ports or antennas. In some cases, the communication device 230 functions as an Internet of Things (IoT) device and can enable the electric bicycle 200 to be part of a network of connected e-bikes, such as a fleet of electric bicycles in communication with a central server or portal (e.g., the fleet management server 140)

As described herein, the communication device 230 provides one or more communication methods, protocols, systems and/or devices, such as cellular communication technologies, Bluetooth® communication technologies, Near-Field Communication (NFC) technologies, Radio Frequency Identification (RFID) communication technologies, GSM/GPRS, and so on. These technologies can communicate via various communication protocols, such as HTTP, MQTT (Message Queueing Telemetry Transport), AMQP (Advanced Message Queueing Protocol), and so on.

Thus, the communication device 230 can include various combinations of communication technologies, in order to establish or support an electric bicycle network. Example combinations include:

a Bluetooth component that facilitates Bluetooth protocol communications between the communication device and a controller, battery pack, and/or electric motor, and a wireless component that facilitates WiFi protocol communications between the communication device and the wireless network;

a Bluetooth component that facilitates Bluetooth protocol communications between a communication device and the controller, battery pack, and/or electric motor, and a cellular component that facilitates cellular protocol communications between the communication device and the wireless network;

a bicycle communications component that facilitates communications between the communication device and a controller, a battery pack, and/or an electric motor of the electric bicycle, and a network communications component that facilitates communications between the electric bicycle and the wireless network; and so on.

As described herein, the communication device 230, in some cases, acts as a communications hub for the electric bicycle, and can perform various operations or methods as the communications hub. For example, the communication device 230 can perform a method of facilitating communications between components of an electric bicycle by receiving, via a bicycle communications component of the communications device, information associated with a current operation of a component of the electric bicycle from a controller of the electric bicycle, and transmitting, via a network communications component of the communication device, a message to the fleet management server 140 that is remote from the electric bicycle over a wireless network, where the message includes the information associated with the current operation of the component of the electric bicycle.

The communication device 230 can then receive, at the network communications component of the communication device, a reply message from the fleet management server over the wireless network, and send, via the bicycle communications component, a control signal to the component of the electric bicycle to control the current operation of the component of the electric bicycle in response to the reply message received from the fleet management server 140.

In some cases, the communication device 230 is disposed within an internal area of the frame of the electric bicycle, such as within an internal area of a top tube of the electric bicycle, an internal area of a down tube of the electric bicycle, or other internal areas within the bicycle frame.

The electric bicycle 200 can also include a display device 235, which is configured to receive input from a rider of the bicycle 200 and/or present information to the rider of the bicycle. For example, the display device 235 can present information associated with a current ride or trip (e.g., speed, pedal assist level, battery level, route, and so on), information associated with communications by the communication device 230 over the network 125, information associated with safety actions (e.g., alerts, notifications, and/or instructions), and so on. The display device 235 can also facilitate receiving input from the rider, such as input to adjust the pedal assist level or to communicate information over the network 125.

Thus, in some embodiments, the electric bicycle 200 provides a bike supported network of various communication components, such as components configured to trigger alerts and/or alarms associated with hazards or unsafe conditions around the bicycle 200, as well as components configured to perform other communication functions, as described herein. In some cases, the bike supported network includes the control device or controller 215 that controls functions of the electric battery 210 and/or the hub motor 220.

In addition to the components depicted in FIG. 2A, the electric bicycle can include other components not shown, such as pedals, pedal assist sensors, throttles, torque sensors and other bike or component movement sensors, brakes and braking systems, various accessories, fenders, various types of rims, tires, or wheels, locking or security systems, lights and reflectors, bells or other audible alert systems, GPS, screens, and/or other user interfaces or display devices, and so on.

Further, the electric bicycle 200, in some embodiments, can operate in a low power state mode, where, when the electric battery 210 is in a low (or critically low) power state, the bicycle 200 provides some basic or selected functions via the sensors and components described herein. For example, a low power state can employ sensors to detect hazards and provide warnings to a rider but may avoid high data transmission or computation techniques until the battery has a higher state of charge. The selectivity of functions provided during a lower power state can be based on context of the rider or electric bicycle 200, such as a context that identifies a certain level of safety or hazard at a location through which the electric bicycle 200 is traveling.

Figure 2B:
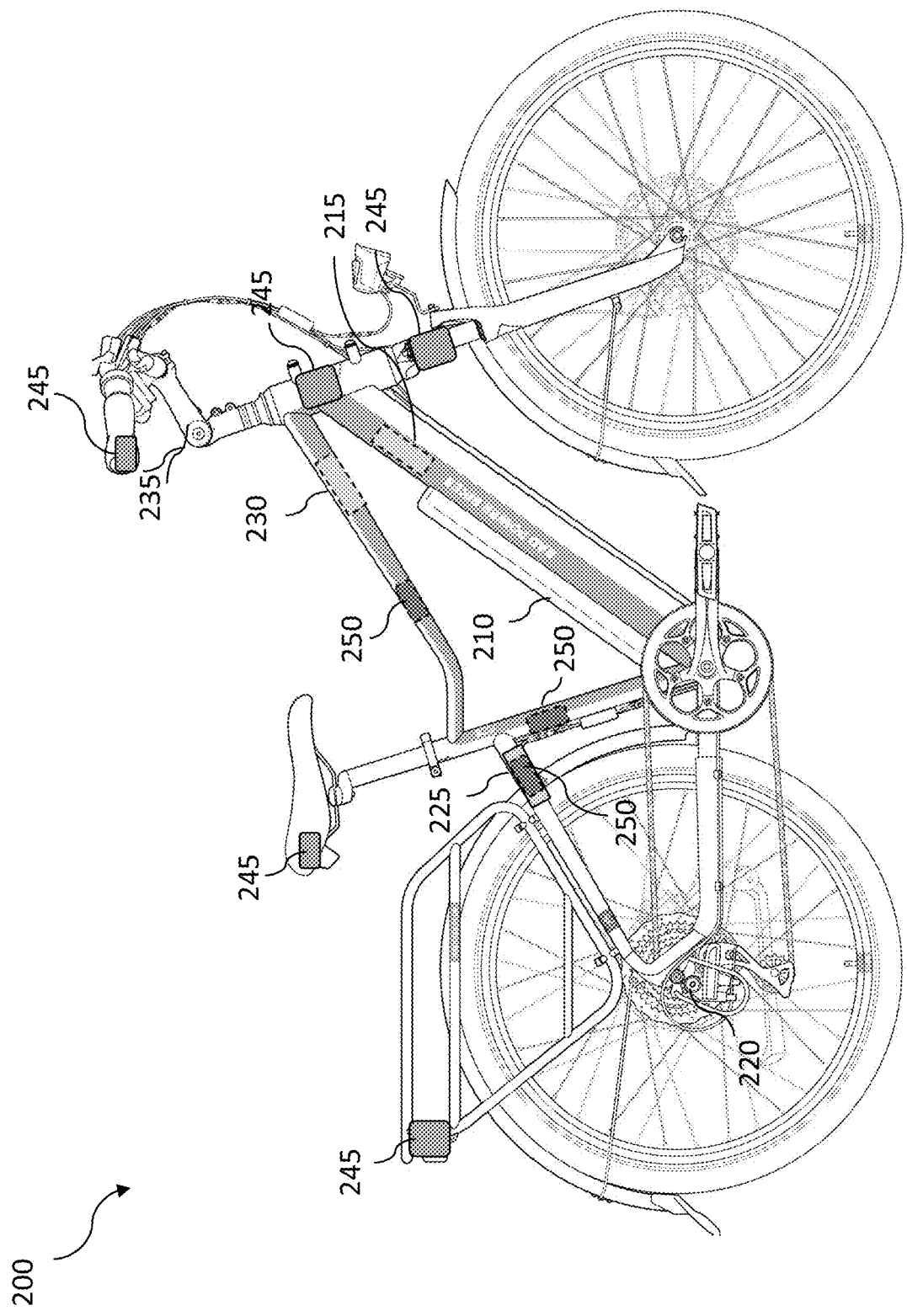
FIG. 2B is a diagram illustrating various sensors supported by an electric bicycle.

FIG. 2B depicts the various sensors supported by an electric bicycle, such as the electric bicycle 200. The electric bicycle 200 includes sensors (e.g., sensors 250) that capture data associated with movement of the electric bicycle, as well as sensors (e.g., sensors 245) that capture data from the environment through which the electric bicycle travels (e.g., data from the route 120 or within the environment 122). The electric bicycle 200 can power the sensors 245, 250 via the battery 210 and control the sensors via the controller 215.

The environmental sensors 145 can be located, disposed, and/or attached at various locations of the electric bicycle 200, as shown. For example, sensors can be located on the handlebars (e.g., at the center or at each end), on the top tube, on the fork, on the seat, on the rear rack, and so on. The sensors can be configured and placed at bike locations to detect objects and the movement of the objects within the entire proximity (360 degrees around) of the bicycle 200.

These environmental sensors 145 can include optical sensors, motion sensors, range finders, infrared (IR) sensors, time of flight (ToF) sensors, radar and/or LIDAR sensors, image capture components, and other sensors configured to sense objects (e.g., the vehicles 115A-C, the other bicycles 112A-B, pedestrians, terrain, signs, and so on) and the movement of those objects with respect to the electric bicycle 200.

The environmental sensors 145 can also include sensors that measure environmental and weather factors, such as temperature sensors, humidity sensors, vision or visibility sensors, wind speed sensors, atmospheric pressure sensors, rain gauges, microphones and audio sensors, and so on.

The bicycle sensors, or movement sensors 250, capture data associated with the movement of the electric bicycle 200. The movement sensors 250 can be located, disposed, and/or attached at various locations of the electric bicycle 200, as shown. For example, the movement sensors 250 can be placed within the top tube, the seat tube, the lock 225, the down tube, or other areas of the bicycle 200, such as areas located at or near the center of mass of the electric bicycle 200 (with or without the rider 105).

These movement sensors 250 can include all types of accelerometers, gyroscopes, inertial measurement units (IMUs), pressure sensors, load cells or sensors, strain gauges, and so on. For example, the movement sensors 250, or an arrangement of sensors (e.g., two or more sensors 250 placed at different areas of the frame of the bicycle 200, can capture movement data and force data for the bicycle 200, such as data identifying the velocity or change in velocity of a moving bicycle, the orientation of the bicycle, vibrations applied to the bicycle, the turning or stopping of the bicycle, mass supported by the wheels, and so on.

The electric bicycle 200 (and the systems described herein) can interact with other sensors, such as body worn sensors or helmet worn sensors that connect and communicate wirelessly to the electrical systems of the bicycle 200. For example, body sensors can include cameras, heart rate monitors, accelerometers, and so on, which capture data associated with the rider and/or the operation of the bicycle 200.

Figure 2C:
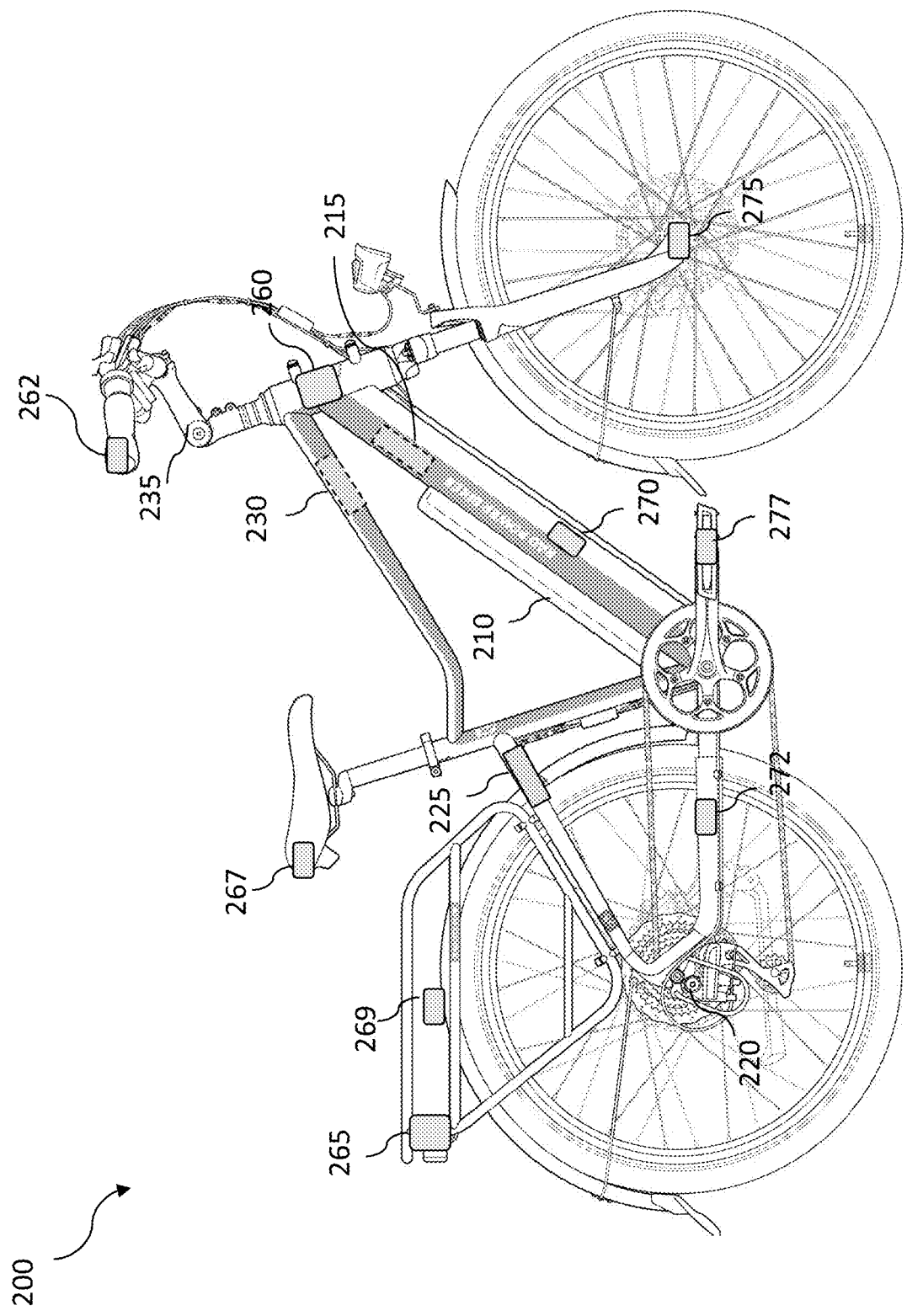
FIG. 2C is a diagram illustrating various lighting systems supported by an electric bicycle.

FIG. 2C depicts the various lighting systems and devices supported by an electric bicycle, such as the electric bicycle 200. The electric bicycle 200, which can power the lighting devices via the battery 210 and control the lighting devices via the controller 215, utilizes the lighting devices to present illumination in a variety of intensities, directions, patterns, and so on.

The lighting system of the bicycle 200 can include a front light 260, such as a headlamp, which can be mounted to the head post and/or handlebars of the bicycle 200. The front light 260 can direct illumination towards a front area of the bicycle 200 (e.g., parallel to a direction of travel of the bicycle 200). The handlebars can include end lights 262, which present illumination outwardly from the bicycle (e.g., in a direction perpendicular or at an angle with respect to the direction of travel of the bicycle 200). In some cases, the end lights 262 can direct illumination towards the front of the bicycle 200, such as in tandem with the front light 260.

Other lighting devices can be disposed on the bicycle 200 to direct illumination to a side area of the bicycle (e.g., a peripheral area to the direction of travel). For example, a chain-stay lighting device 272, a pedal lighting device 277, a rack mounted lighting device 269, and/or a wheel or spoke lighting device 275 can project illumination around the bicycle 200.

Further, the bicycle 200 can include various lighting devices configured and disposed to illuminate a rear area of the bicycle. These devices include a rear rack light 265 (or any rear light) and a seat light 267. Also, lighting devices are mounted or attached to light an area below the bicycle (e.g., downlighting), including a bottom tube lighting device 270, as well as some of the other lighting devices (e.g., the chain-stay lighting device 272).

Also, the lighting system can include body worn lighting, such as lighting devices disposed and/or attached to the rider's body and/or helmet. Such lighting can interact with the electric bicycle 200 via wired or wireless communication, and perform the various techniques described herein. Example body worn lighting includes helmet lights (e.g., smart helmets), light up gloves, light up jackets, and so on.

As described herein, each of the lighting devices can project lighting in a variety of different intensities, patterns, colors, and directions. The devices can include LED components (e.g., white LEDs), LASER or light projection components, or other lighting systems, including reflectors, reflective paint, and so on. Thus, the systems and methods can utilize some or all of the lighting devices to illuminate the environment 122 (and objects within) through which the bicycle 200 travels (e.g., to see) and to become visible (or more visible) to others within the environment 122 (e.g., to be seen). As discussed herein, such illumination can include (1) creating, expanding, or dynamically altering a lighting envelope formed around the bicycle 200, (2) modifying a direction or intensity of the illumination, (3) outlining or creating lighted pathways within the environment 122, (4) generating a more visible version of the bicycle 200 (e.g., in 3D space), and so on.

FIGS. 1A-2C and the components, systems, servers, and devices depicted herein provide a general computing environment and network within which the technology described herein can be implemented. Further, the systems, methods, and techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The network or cloud 125 can be any network, ranging from a wired or wireless local area network (LAN), to a wired or wireless wide area network (WAN), to the Internet or some other public or private network, to a cellular (e.g., 4G, LTE, or 5G network), and so on. While the connections between the various devices and the network 125 and are shown as separate connections, these connections can be any kind of local, wide area, wired, or wireless network, public or private.

Further, any or all components depicted in the Figures described herein can be supported and/or implemented via one or more computing systems or servers. Although not required, aspects of the various components or systems are described in the general context of computer-executable instructions, such as routines executed by a general-purpose computer, e.g., mobile device, a server or cloud-based computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, AR/VR devices, and the like. Indeed, the terms "computer," "host," and "host computer," and "mobile device" and "handset" are generally used interchangeably herein and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or pre-programmed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system may reside on a server computer, while corresponding portions may reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Examples of a Safety Feedback System

Figure 3:
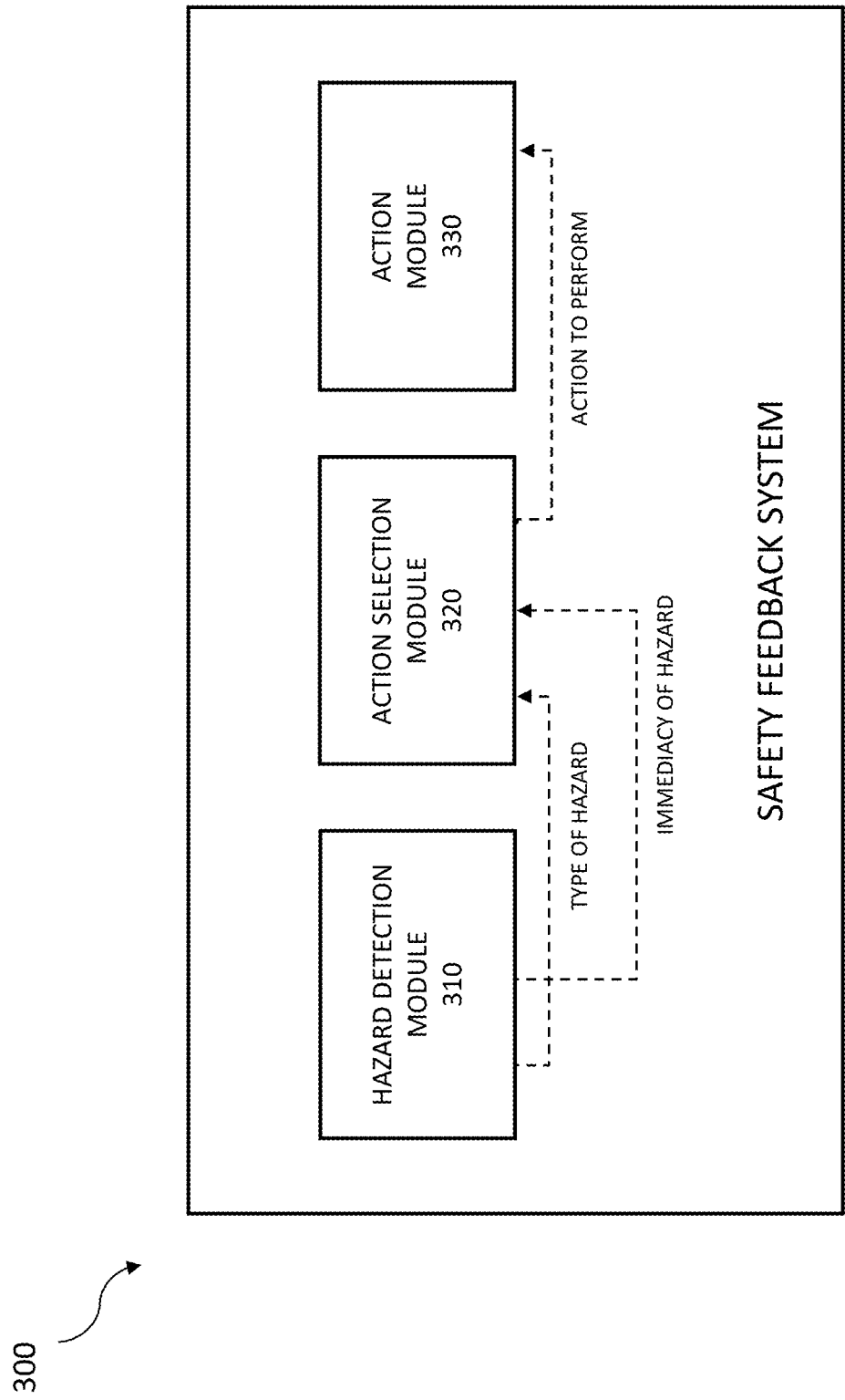
FIG. 3 is a block diagram illustrating components of a rider safety system.

As described herein, in some embodiments, the electric bicycle 100 utilizes the systems and methods described herein to perform specific and/or targeted safety actions for an electric bicycle (e.g., electric bicycle 110, 200) and/or the rider of the electric bicycle. FIG. 3 is a block diagram illustrating components of a rider safety system 300.

The components and/or modules of the rider safety system 300 (which can be supported or included by the safety system 130 and/or the fleet management server 140) can be implemented with a combination of software (e.g., executable instructions, or computer code) and hardware (e.g., at least a memory and processor). Accordingly, as used herein, in some example embodiments, a component/module is a processor-implemented component/module and represents a computing device having a processor that is at least temporarily configured and/or programmed by executable instructions stored in memory to perform one or more of the functions that are described herein. The rider safety system 300 includes a hazard detection module 310, an action selection module 320, and an action module 330.

In some embodiments, the hazard detection module 310 is configured and/or programmed to receive data captured by one or more sensors of an electric bicycle, such as data from an environment through which the electric bicycle is traveling. Using the received data, the hazard detection module 310 can detect an occurrence of a potential hazard to the electric bicycle or to a rider of the electric bicycle and/or an imminence or immediacy of the potential hazard to the electric bicycle or to the rider of the electric bicycle.

For example, the hazard detection module 310 can utilize sensor data captured by the sensors 245 (e.g., radar sensors, lidar sensors, ultrasonic sensors, acoustic sensors, LED sensors, GPS sensors, and so on) when detecting an object proximate to the electric bicycle (e.g., bicycle 110 or 200) and/or the movement of the object proximate to the electric bicycle. Example potential hazards include vehicles, other bicycles, pedestrians, ground objects, structures, and so on.

In some embodiments, the action selection module 320 is configured and/or programmed to select a safety action based on the occurrence of the potential hazard and/or the imminence of the potential hazard. For example, the action selection module 320 selects a safety action that relates or is associated with the potential hazard and the imminence of the potential hazard. In some cases, the selected safety action can include a combination of actions that both enhance the visibility of the electric bicycle (e.g., an action that causes the bicycle to be seen) and increase the vision or awareness of the rider of the electric bicycle (e.g., an action that causes the rider to see or be aware).

In some embodiments, the action module 330 is configured and/or programmed to cause the electric bicycle to perform the selected safety action in response to the detected potential hazard. For example, the action module 330 can cause the electric bicycle 200 to emit an alarm, modify illumination presented by the bicycle, send a message to the potential hazard, alert the rider of the bicycle, adjust operations of the bicycle, and so on.

Thus, the rider safety system 300 includes modules that utilize sensor data to identify a potential hazard (or a type of hazard) and an immediacy of the potential hazard to the electric bicycle 200 and select a safety action or actions to perform to mitigate or prevent an unsafe condition arising in response to the identified potential hazard and the timing in which it may impact the bicycle.

The system 300, therefore, can perform such actions in response to potential hazards or hazard types, including the following:

the hazard detection module 310 detects the potential hazard is a vehicle moving towards the electric bicycle at a certain rate of speed above a threshold rate of speed associated with a dangerous movement of the vehicle with respect to the electric bicycle (e.g., in any lighting condition), and the action selection module 320 selects a safety action that alerts the rider to the movement of the vehicle towards the electric bicycle at the certain rate of speed and a safety action that causes the electric bicycle to perform an auditory alarm in a direction towards the vehicle;

the hazard detection module 310 detects the potential hazard is a vehicle moving towards the electric bicycle at a certain rate of speed above a threshold rate of speed associated with a dangerous movement of the vehicle with respect to the electric bicycle (e.g., the electric bicycle is traveling during the nighttime or during a low lighting condition), and the action selection module 320 selects a safety action that alerts the rider to the movement of the vehicle towards the electric bicycle at the certain rate of speed a safety action that causes the electric bicycle to emit safety illumination in a direction towards the vehicle;

the hazard detection module 310 detects the potential hazard is a vehicle moving towards the electric bicycle at a certain rate of speed above a threshold rate of speed associated with a dangerous movement of the vehicle with respect to the electric bicycle, and action selection module 320 selects a safety action that alerts the rider to the movement of the vehicle towards the electric bicycle at the certain rate of speed and a safety action that causes the electric bicycle to transmit a warning message to the vehicle; and so on.

Thus, the hazard detection module 310, in some embodiments, can determine an object (e.g., a vehicle) moving towards the electric bicycle 200 as a potential hazard with a high or dangerous immediacy, and determine an object (e.g., the vehicle) moving parallel to the electric bicycle 200 (next to the bicycle) as a potential hazard with a low or cautious immediacy. With either determination, the hazard detection module 310 can classify the potential hazard and the immediacy and send the classification information to the action selection module, for action selection.

As an example, a vehicle can be classified as high risk (e.g., where impact is likely to cause harm to the rider of the bicycle), another bicycle or scooter can be classified as medium risk (e.g., where impact may cause harm to the rider of the bicycle), and a congestion of objects in the area of the bicycle (e.g., a busy road of bicycles and/or vehicles) can be classified as low risk (e.g., where dangerous conditions increase, but no single potential hazards). The action selection module 320 can receive such classification information and select actions that respond to the risk classification.

As described herein, the hazard detection module 310 identifies or determines potential hazards based on data captured by sensors on the electric bicycle 200, such as sensors 245 and 250. For example, the sensors can include motion detection sensors that capture data associated with movement of objects within the environment, and the hazard detection module 310 can detect an occurrence of a potential hazard when the captured data identifies an object moving towards the electric bicycle or towards a path of travel of the electric bicycle.

As another example, the sensors can include image detection sensors that identify types of objects within the environment and hazard detection module 310 detects an occurrence of a potential hazard when the captured data identifies a certain type of object within a current path of travel of the electric bicycle.

As a further example, the sensors can include sound (e.g., ultrasound or ultrasonic) detection sensors that capture data associated with movement of objects within the environment and the hazard detection module 310 detects an occurrence of a potential hazard when the captured data identifies an object moving towards the electric bicycle or towards a path of travel of the electric bicycle (e.g., the sound of a vehicle approaching the bicycle)

Further, the sensors can include motion detection sensors and image detection sensors (or other combination) and the hazard detection module 310 detects an occurrence of a potential hazard when the captured data identifies a certain type of object moving towards a current path of travel of the electric bicycle. Thus, in some cases the hazard detection module 310 can detect an object moving towards the electric bicycle 200 and/or moving towards a path or direction of travel on which the bicycle is moving.

The action selection module 320 selects different actions based on the potential hazard and the immediacy of the hazard to the electric bicycle 200. For example, the action selection module 320 selects a safety action that alerts the rider to the movement of a vehicle towards the electric bicycle at a certain rate of speed via a display action performed by a user interface of the electric bicycle.

As another example, the action selection module 320 selects a safety action that alerts the rider to the movement of the vehicle towards the electric bicycle at the certain rate of speed by presenting a vibration alert to the rider of the electric bicycle via one or both handlebar grips of the electric bicycle (e.g., via integrated haptic sensors or actuators).

Further, the action selection module 320 can select a safety action that alerts the rider to the movement of the vehicle towards the electric bicycle at the certain rate of speed by causing the electric motor to perform a regenerative braking action or other braking action that slows the electric bicycle.

As described herein, the action selection module 320 can select combinations of safety actions to ensure the rider of the electric bicycle 200 is aware of the potential hazard as well as to increase the awareness of the potential hazard (e.g., when the hazard is a vehicle or bicycle).

Figure 4A:
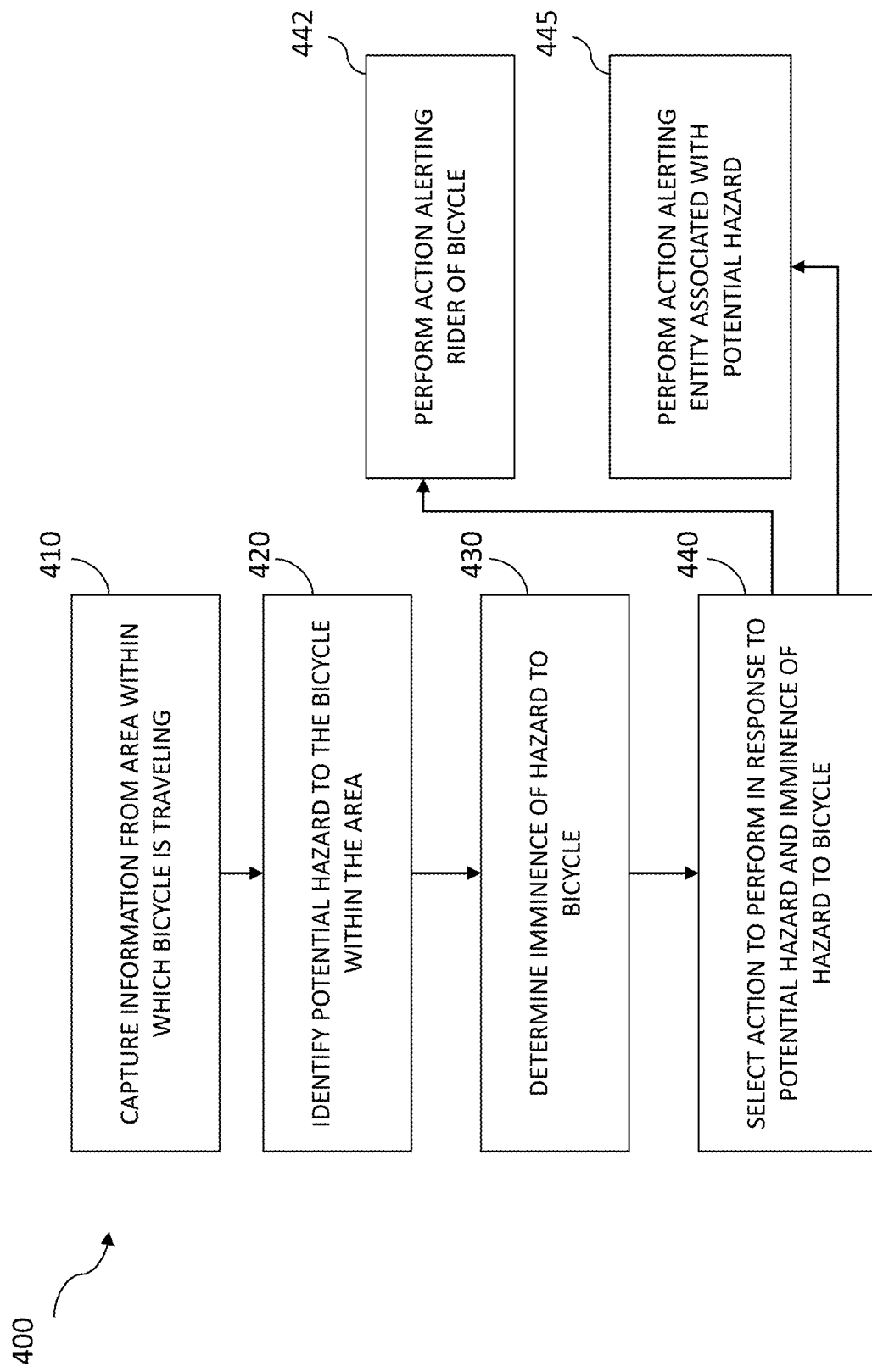
FIG. 4A is a flow diagram illustrating an example method for performing a safety action on behalf of a rider of an electric bicycle.

The rider safety system 300, as described herein, performs various processes or method to mitigate and improve the safety of a rider on an electric bicycle, such as the rider 105 on the electric bicycle 110 within the environment 122. FIG. 4A is a flow diagram illustrating an example method 400 for performing a safety action on behalf of a rider of an electric bicycle. The method 400 may be performed by the rider safety system 300 and, accordingly, is described herein merely by way of reference thereto. It will be appreciated that the method 400 may be performed on any suitable hardware.

In operation 410, the rider safety system 300 captures information from an area within which the electric bicycle 110, 200 is traveling. For example, the hazard detection module 310 can receive data captured by one or more sensors of the electric bicycle 200 and from an environment through which the electric bicycle is traveling.

In operation 420, the rider safety system 300 detects an occurrence of a potential hazard to the electric bicycle or to a rider of the electric bicycle. For example, the hazard detection module 310 can utilize sensor data captured by the sensors 245 (e.g., radar sensors, lidar sensors, ultrasonic sensors, LED sensors, GPS sensors, and so on) when detecting an object proximate to the electric bicycle and/or the movement of the object proximate to the electric bicycle. As described herein, example potential hazards include vehicles, other bicycles, pedestrians, ground objects, structures, and so on.

In operation 430, the rider safety system 300 detects an immediacy of the potential hazard to the electric bicycle or to the rider of the electric bicycle. For example, the hazard detection module 310 determines a timing or likelihood of impact or proximity based on a movement of the potential hazard and/or the electric bicycle and assigns an immediacy or imminence factor or metric to the potential hazard.

In operation 440, the rider safety system 300 selects a safety action based on the occurrence of the potential hazard and the immediacy of the potential hazard. For example, the action selection module 320 selects different actions based on the potential hazard and the immediacy of the hazard to the electric bicycle 200, such as a safety action that alerts the rider to the movement of a vehicle towards the electric bicycle at the certain rate of speed via a display action performed by a user interface of the electric bicycle and a safety action that sends a message to the vehicle about the presence of the electric bicycle.

In operation 442, the rider safety system 300 causes the electric bicycle to perform an action alerting the rider of the electric bicycle of the potential hazard, and, in operation 445, causes the electric bicycle to perform an action alerting an entity associated with the potential hazard (of a certain type of hazard) of the dangerous condition. As described herein, the action module 330 can cause the electric bicycle 200 to alert a rider of an incoming vehicle while also sounding an alarm and modifying the lighting of the electric bicycle to increase the visibility of the bicycle to the vehicle.

In some cases, the rider safety system 300 can identify and/or determine a context for the electric bicycle as it travels through the environment, and select safety actions, at least in part on the determined context. For example, the context could indicate the type of route (e.g., the bicycle is on a bike path versus a road), the current or forecasted weather (e.g., it is cold/hot, raining, snowing, sleeting, and so on), the time of day (e.g., noon and sunny versus 9 pm and dark out), the rider knowledge of the route (e.g., the route has been traveled by rider numerous times versus a new street/path to the rider), and so on.

Thus, in some embodiments, the rider safety system 300, being located or stored in memory of the controller 215 of the electric bicycle 200 can perform safety operations, such as detecting an occurrence of a potential hazard to the electric bicycle or to a rider of the electric bicycle based on data from an environment through which the electric bicycle is traveling that is captured by one or more sensors of the electric bicycle, and selecting a safety action based on the occurrence of the potential hazard. The safety actions can include a safety action that alerts the rider to the occurrence of the potential hazard to the electric bicycle or to the rider of the electric bicycle and a safety action that causes the electric bicycle to an entity associated with the potential hazard of the occurrence of the potential hazard.

As described herein, the system 300 can also detect an immediacy of the potential hazard to the electric bicycle or to the rider of the electric bicycle and select the safety action based on the occurrence of the potential hazard and the detected immediacy of the potential hazard to the electric bicycle or to the rider of the electric bicycle.

For example, when the occurrence of the potential hazard is a vehicle moving towards the electric bicycle within the environment, the safety action can alert the rider to the occurrence of the potential hazard to the electric bicycle or to the rider of the electric bicycle by displaying a warning to the rider of the electric bicycle via a user interface of the electric bicycle, and can cause the electric bicycle to warn the vehicle of the occurrence of the potential hazard by causing the electric bicycle to emit safety illumination in a direction towards the approaching vehicle and performing an auditory alarm in a direction towards the vehicle.

Examples of a Rider Alert System

As described herein, in some embodiments, the electric bicycle 110 can employ the rider safety system 300 to alert the rider 105 of the electric bicycle 110 of a potential hazard or unsafe condition during a ride via haptic feedback or other physical stimulus actions. For example, the sensors 250 can include one or more haptic actuators that present haptic feedback to the rider of the electric bicycle 200. The haptic actuators, or sensors, can be disposed or positioned at/in grips on the handlebars, on/in the seat of the bicycle 200, on the pedals of the bicycle 200, and so on.

In some cases, the sensors can be worn by the rider, and provide haptic feedback via clothing or accessories worn by the rider. These body worn devices can include body worn displays, body worn acoustic devices, body worn haptics, or other body worn alert systems, which are wired or wirelessly connected to the bicycle systems, as described herein. For example, haptic gloves, haptic shoes, and/or haptic bracelets or watches can present an alert to the rider of the electric bicycle 200.

Referring back to FIG. 3, the rider safety system 300, via the action selection module 320, can select an action based on a potential hazard that is performed by the one or more haptic actuators of the electric bicycle. The action can include causing a haptic actuator to pulse or vibrate, to cause multiple haptic actuators or pulse or vibrate, and/or to cause a group of actuators to follow a vibration pattern that informs the rider of the potential hazard.

For example, the system 300 can map haptic feedback actions to potential hazards as shown in the following table:

TABLE 2

| Potential hazard | Haptic feedback action |
| --- | --- |
| Vehicle approaching from left/right | Vibrate left/right handlebar grip |
| Vehicle moving into path of travel | Vibrate both handlebar grips |
| Object is detected in path | Two pulses via both handlebar grips |
| Hole or contour in road surface | Three pulses via both handlebar grips |
| Vehicle approaching from behind | Vibrate seat of bicycle |
| Approaching intersection is "unsafe" | Pulse handlebar grips in alternating pattern |
| Area around bicycle is congested | Vibrate smart watch worn by rider |

Following the table, when the rider safety system 300 determines a vehicle is approaching from a right side of the electric bicycle, the system 300 selects an action to vibrate a right-side handlebar grip to alert the rider of the vehicle; similarly, when the system 300 determines the bicycle is approaching an unsafe or dangerous intersection in a city (e.g., based on fleet managed data), the system 300 selects an action to pulse the handlebar grips in an alternating sequence or patterns, to inform the rider to be cautious as they move through the intersection.

In some cases, the rider safety system 300 maintains the haptic feedback until receiving an acknowledgement from the rider, such as via a change in operation of the electric bicycle (e.g., the rider brakes or adjusts their path of travel). For example, the system 300 can monitor operations of the electric bicycle 200 after the action module 330 caused the electric bicycle to perform a safety action in response to a detected potential hazard, determine that the electric bicycle has not performed a hazard mitigation operation (e.g., braking, slowing, or altering course), and perform the selected safety action again.

Similarly, the system 300 can determine that the electric bicycle has performed a hazard mitigation operation (e.g., a braking or turning operation detected by the sensors 250) and cause the electric bicycle to stop performance of the selected safety action in response to the rider's actions.

Thus, the system 300 can utilize different haptic feedback actions or patterns to warn riders of imminent and predicted hazards or dangerous conditions, such as the occurrence of a potential collision with a vehicle with the electric bicycle or the occurrence of an object within a path traveled by the bicycle.

As described herein, the system 300 can also utilize haptic feedback to warn a rider of a general or increasing dangerous condition within an environment through which an electric bicycle is traveling. For example, the haptic feedback can indicate a dangerous movement pattern of multiple vehicles within an immediate proximity of the electric bicycle or a dangerous location pattern of multiple vehicles within an immediate proximity of the electric bicycle (e.g., more vehicles than average on the road shared by the electric bicycle). The system 300 can receive the potential hazard information from the sensors of the bicycle 245 and/or from the fleet management server 140 that manages a fleet of electric bicycles that includes the electric bicycle (e.g., tracking data received from electric bicycle over time).

Figure 4B:
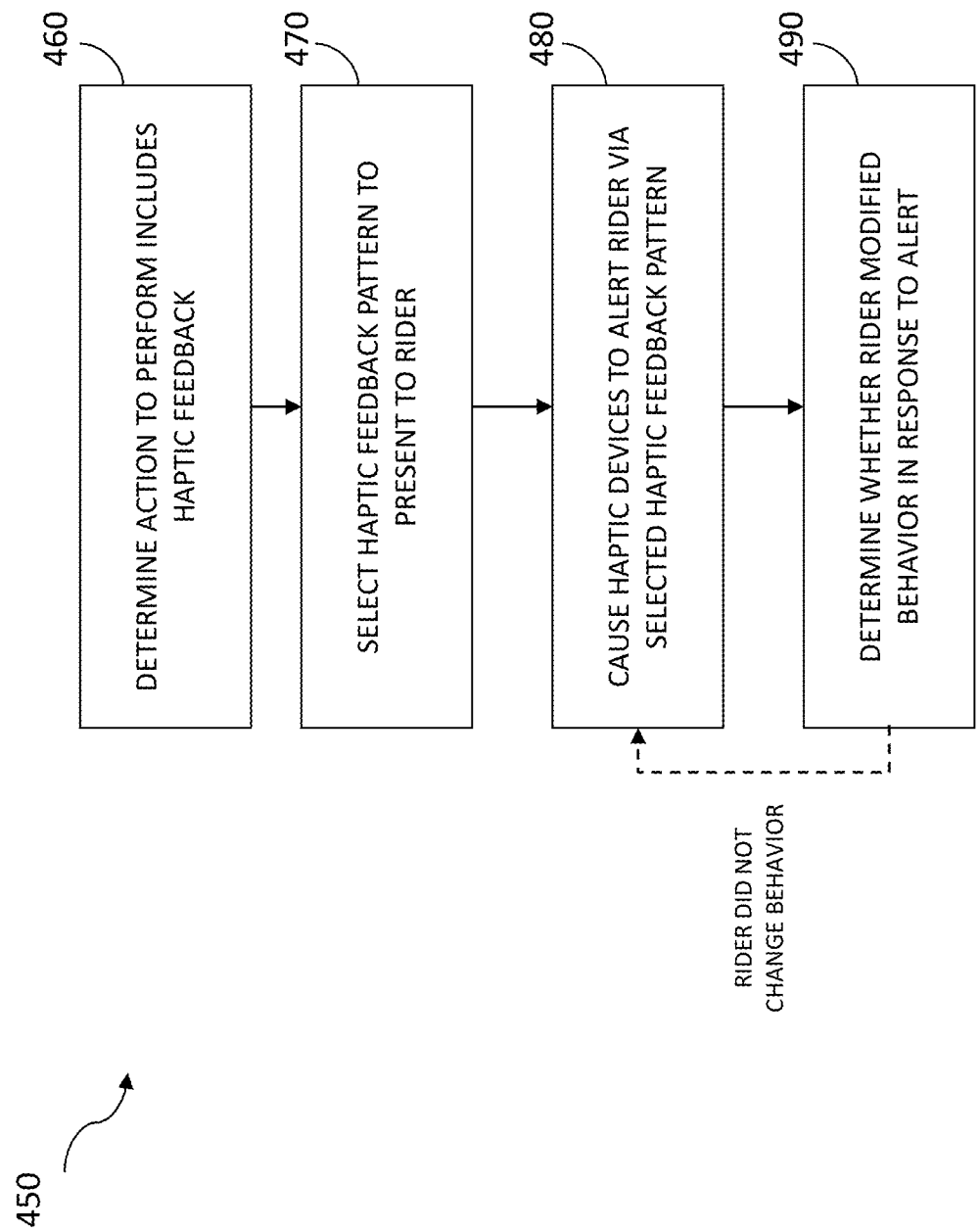
FIG. 4B a flow diagram illustrating an example method for selecting a haptic feedback sequence to perform for a rider of an electric bicycle.

The system 300, therefore, performs various processes and methods for alerting riders to potential hazards and dangerous conditions. FIG. 4B a flow diagram illustrating an example method 450 for selecting a haptic feedback sequence to perform for a rider of an electric bicycle. The method 450 may be performed by the rider safety system 300 and, accordingly, is described herein merely by way of reference thereto. It will be appreciated that the method 450 may be performed on any suitable hardware.

In operation 460, the rider safety system 300 determines an action to perform in response to a potential hazard or detected dangerous condition includes the presentation of haptic feedback to a rider of an electric bicycle. For example, the action selection module 320 can determine a risk or imminence of a potential hazard and select an action that includes haptic feedback.

In operation 470, the rider safety system 300 selects a haptic feedback pattern to present to the rider of the electric bicycle. For example, the action selection module 320 can utilize the information in Table 2 that relates potential hazards to haptic feedback actions when selecting the feedback pattern to present to the rider.

In operation 480, the rider safety system 300 causes haptic actuators of the electric bicycle to alert the rider via the selected haptic feedback pattern. For example, the action module 330 can cause various haptic devices, such as actuators positioned at/in grips on the handlebars, on/in the seat of the bicycle 200, and/or on the pedals of the bicycle 200, to present the haptic feedback patterns to the rider.

In operation 490, the rider safety system 300 can determine whether the rider modified their behavior in response to the alert. For example, the system 300 can monitor operations of the electric bicycle after performing the selected safety action, determine that the electric bicycle has not performed a hazard mitigation operation in response to the performance of the selected safety action, and, returning to operation 480, cause the electric bicycle to re-perform the selected safety action.

In some cases, the system 300 can attempt to alert the rider using different patterns, depending on the hazard and/or immediacy of danger. For example, the system 300 can determine that the electric bicycle has not performed a hazard mitigation operation (e.g., turning, slowing, braking) in response to the performance or re-performance of the selected safety action, and cause the electric bicycle to perform a different safety action in response to the determination that the electric bicycle has not performed the operation.

Thus, the rider safety system 300 can proactively warn riders of hazards or dangerous conditions, as well as encourage or prompt riders to take actions for their safety, via the presentation of haptic feedback to the riders. For example, the rider safety system 300, being located within the controller 215 of the electric bicycle 200, can detect an occurrence of a potential hazard to the electric bicycle or to a rider of the electric bicycle, select a safety action that includes presenting haptic feedback to a rider of the electric bicycle, and cause the electric bicycle to perform the selected safety action in response to the detected potential hazard. The system 300 can determine that the rider of the electric bicycle has performed a turning operation, slowing operation and/or a braking operation in response to the selected safety action and cause the electric bicycle to stop performance of the selected safety action in response to the turning operation, slowing operation, or the braking operation.

Examples of an Object Detection System

As described herein, in some embodiments, the electric bicycle 110 includes technology that monitors an environment for objects or conditions specifically hazardous to a moving bicycle and performs actions to mitigate the danger that can arise due to these objects or conditions.

Figure 5:
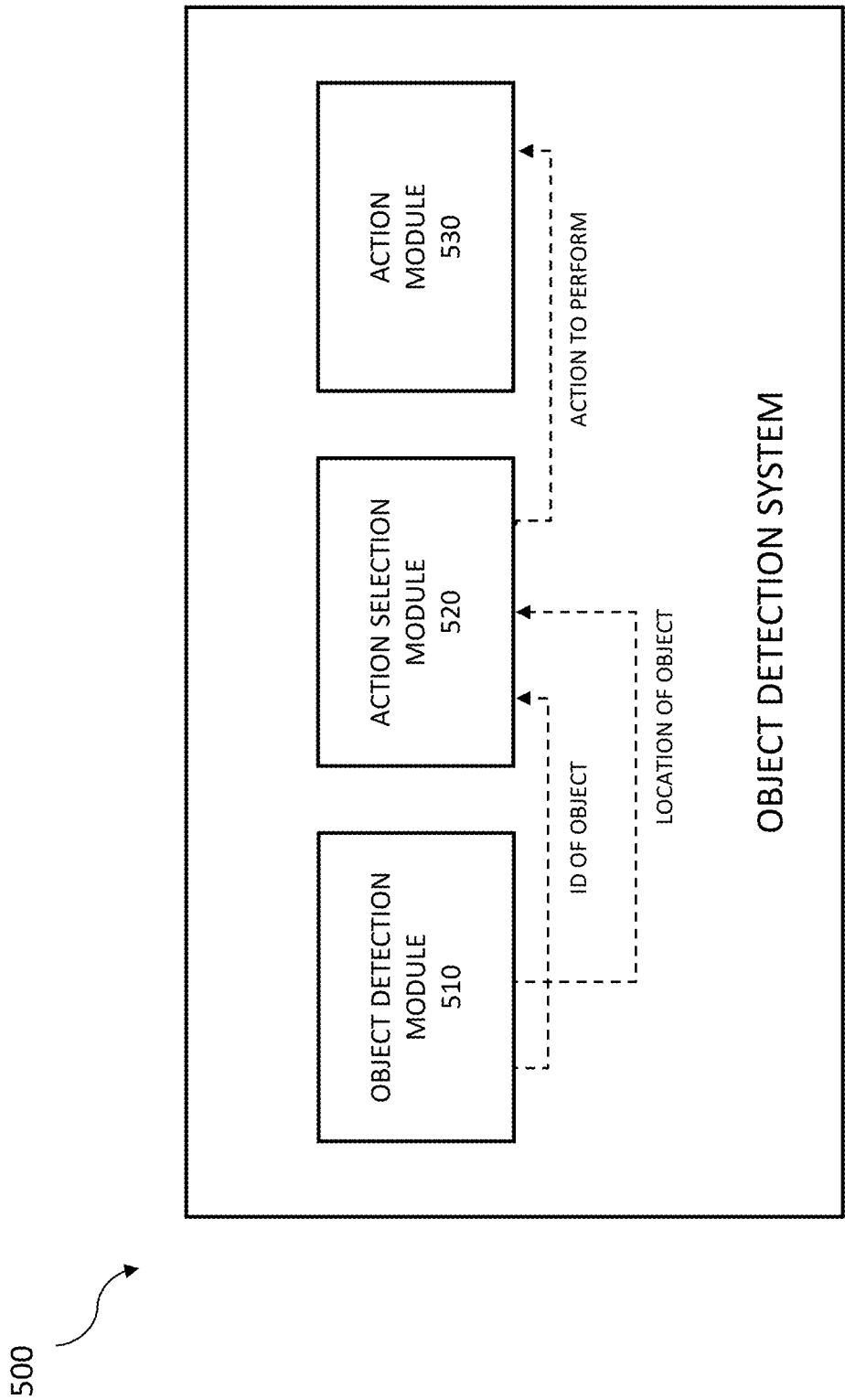
FIG. 5 is a block diagram illustrating components of a hazardous object detection system.

FIG. 5 is a block diagram illustrating components of an object detection system 500. The components and/or modules of the object detection system 500 (which can be supported or included by the safety system 130 and/or the fleet management server 140) can be implemented with a combination of software (e.g., executable instructions, or computer code) and hardware (e.g., at least a memory and processor). Accordingly, as used herein, in some example embodiments, a component/module is a processor-implemented component/module and represents a computing device having a processor that is at least temporarily configured and/or programmed by executable instructions stored in memory to perform one or more of the functions that are described herein. The object detection system 500 includes an object detection module 510, an action selection module 520, and an action module 530.

In some embodiments, the object detection module 510 is configured and/or programmed to receive or access data captured by one or more sensors of the electric bicycle and from an environment through which the electric bicycle is traveling. The object detection module 510 determines an identification of an object within the environment through which the electric bicycle is traveling and a location of the object within the environment through which the electric bicycle is traveling.

For example, the object detection module 510 receives image data captured by an image detection sensor and determines that the object is an open car door (or car pulling out) within a path traveled by the electric bicycle. The image sensor, which captures images of the environment, can capture an image of a shape similar to a car door, and the module 510 can determine the shape is a car door (or, potentially a car door) within the path of travel of the electric bicycle.

As another example, the object detection module receives image data captured by an image detection sensor and determines that the object is a pothole or other hazard/obstacle in a road traveled by the electric bicycle (e.g., a curb or raised structure). The image sensor, which captures images of the environment, can capture images of the road and the module 510 can determine the shape is constantly changing or includes uncommon objects or imperfections.

In some cases, the object detection system 500 can utilize context information when identifying objects within a path of travel of the electric bicycle. For example, the object detection module 510 can determine a safety context within the environment through which the electric bicycle is traveling and identify an object within the environment through which the electric bicycle is traveling based on the determined safety context.

The safety context can include various types of information associated with the surface of travel, the type of route (e.g., path, road, street, and so on), the weather or lighting conditions, and so on. For example, the module 510 can access information (e.g., map information) about a route traveled by the bicycle that identifies cars are parked along the route and/or utilize sensor captured information to infer cars are parked along the route.

Using the information, the module 510 can capture an image (or images) of an object in front of the electric bicycle and moving towards the bicycle (based on the point of view of the bicycle, which is in fact moving), and detect the object as an open car door within the path of travel of the bicycle.

In some embodiments, the action selection module 520 is configured and/or programmed to select a safety action based on the identification of the object and the location of the object within the environment through which the electric bicycle is traveling. For example, similar to the action selection module 320, the module 520 can select an action that alerts the rider 105 of the electric bicycle 110, 200, such as an alert presented to a rider of the electric bicycle via a user interface of the electric bicycle and/or via haptic feedback presented to the rider via grips of handlebars of the electric bicycle.

In addition, the selected action can modify operation of the electric bicycle to increase the safety of the rider, such as to slow down the electric bicycle and/or enhance the vision of the rider within the environment through which the electric bicycle is traveling. For example, the module 520 can select an action that modifies operation of the electric bicycle, such as by modifying the illumination emitted by a head lamp or other lighting devices of the electric bicycle.

In some embodiments, the action module 530 is configured and/or programmed to cause the electric bicycle to perform the selected safety action in response to the identification of the object. For example, like the action module 330, the module 530 can cause various lighting devices (e.g., head lamp 260) to modify operations (e.g., increase intensity) and/or cause the bicycle to alert the rider of the object or dangerous condition in the path of travel.

The object detection system 500, as described herein, includes processes and methods that detect objects specifically hazardous to an electric bicycle (e.g., car doors, road divots, ice patches, and so on), and perform actions to mitigate the potentially hazardous objects.

FIG. 6 is a flow diagram illustrating an example method 600 for performing an action for a rider of an electric bicycle in response to detecting a hazardous object. The method 600 may be performed by the object detection system 500 and, accordingly, is described herein merely by way of reference thereto. It will be appreciated that the method 600 may be performed on any suitable hardware.

In operation 610, the object detection system 500 receives data captured by one or more sensors of the electric bicycle and from an environment through which the electric bicycle is traveling, and identifies, from the data captured by the one or more sensors, an object within the environment through which the electric bicycle is traveling. In operation 620, the system 500 determines a location of the object within the environment.

For example, the object detection module 510 receives image data captured by an image detection sensor and determines that the object is an open car door within a path traveled by the electric bicycle. The image sensor, which captures images of the environment, can capture an image of a shape of a car door, and the module 510 can determine the shape is a car door (or, potentially a car door) within the path of travel of the electric bicycle.

In operation 630, the object detection system 500 selects a safety action based on the identification of the object and the location of the object within the environment through which the electric bicycle is traveling. For example, the action selection module 520 can select an action that alerts the rider 105 of the electric bicycle 110, 200, such as an alert presented to a rider of the electric bicycle via a user interface of the electric bicycle and/or via haptic feedback presented to the rider via grips of handlebars of the electric bicycle.

In operation 640, the object detection system 500 causes the electric bicycle to perform the selected safety action in response to the identification of the object. For example, the action module 530 can cause various lighting devices (e.g., head lamp 260) to modify operations (e.g., increase intensity, shape, and direction of light beam) and/or cause the bicycle to alert the rider of the object or dangerous condition in the path of travel.

As described herein, the system 500 can utilize context information, such as a ride context for a path traveled by the electric bicycle, when determining objects are potentially hazardous and performing actions in response to the objects. For example, the object detection system 500, which can be stored in memory of the 215 controller of the electric bicycle 200, can receive data captured by one or more sensors and from an environment through which the electric bicycle is traveling, and determine a ride context for the electric bicycle 200 while traveling through the environment.

The object detection system 500 can then identify an object within the environment through which the electric bicycle is traveling based on the data captured by the one or more sensors and from the determined ride context, select a safety action based on the identification of the object, and cause the electric bicycle to perform the selected safety action in response to the identification of the object.

In some cases, the system 500 can utilize artificial intelligence (AI) and machine learning (ML) algorithms to assist in learning what inputs represent certain objects. For example, the system 500 can utilize AI/ML to increase the accuracy of predicting an object captured by an image or optical sensor is an open car door (e.g., the AL identifies or learns a pattern of an opened door in the images).

In some cases, the system 500 determines a ride context where the bicycle is traveling proximate to multiple cars parked along a road (e.g., via image sensors or other sensors 245) and identifies the object as an open car door based on the data captured by the one or more sensors indicating an object is located within the road traveled by the electric bicycle.

In some cases, the system 500 determines a ride context where the bicycle is traveling through the environment on a bumpy road (e.g., via IMUs or other sensors 250 and identifies the object as a pothole within the bumpy road based on the data captured by the one or more sensors indicating the object is located on the road traveled by the electric bicycle.

The object detection system 500, as described herein, can enhance the safety of a rider of an electric bicycle in a variety of scenarios. FIGS. 7A-7D depict the system 500 operating within these scenarios.

Figure 7A:
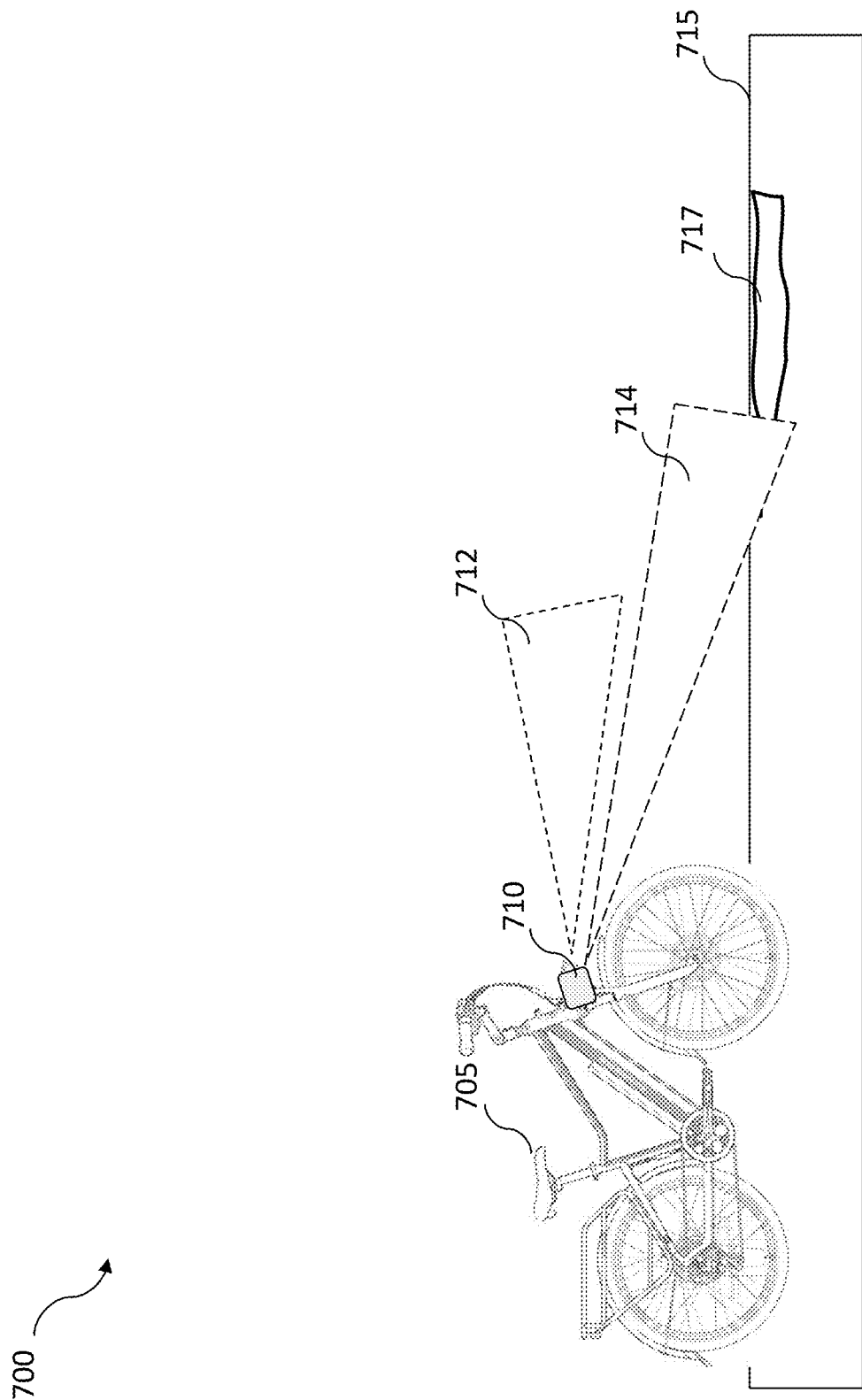
FIGS. 7A-7D Are diagrams illustrating the detection of different hazardous objects.

FIG. 7A depicts a scenario 700 where an electric bicycle 705 is traveling along a road 715 on a cold night and has its head lamp 710 on and emitting light 712 to illuminate the area in front of the bicycle 705. The object detection system 500, located in a controller of the bicycle 705, captures images of the road 715 and identifies a potentially hazardous object 717 within the road 715. The system 500 detects the object 717 (e.g., a patch of ice) as being in a location on the road 715 that is in the path of travel of the bicycle 705 and performs a safety action to modify the shape of light emitted by the head lamp 710 to a lower shape 714 that illuminates the road 715, and, when encountered, the hazardous object. Thus, the system 500 identifies a potential hazard specific to the electric bicycle 705 during a ride and causes the bicycle 705 to automatically modify operation (e.g., adjust its lighting) to create a safer ride for the rider of the bicycle 705.

Figure 7B:
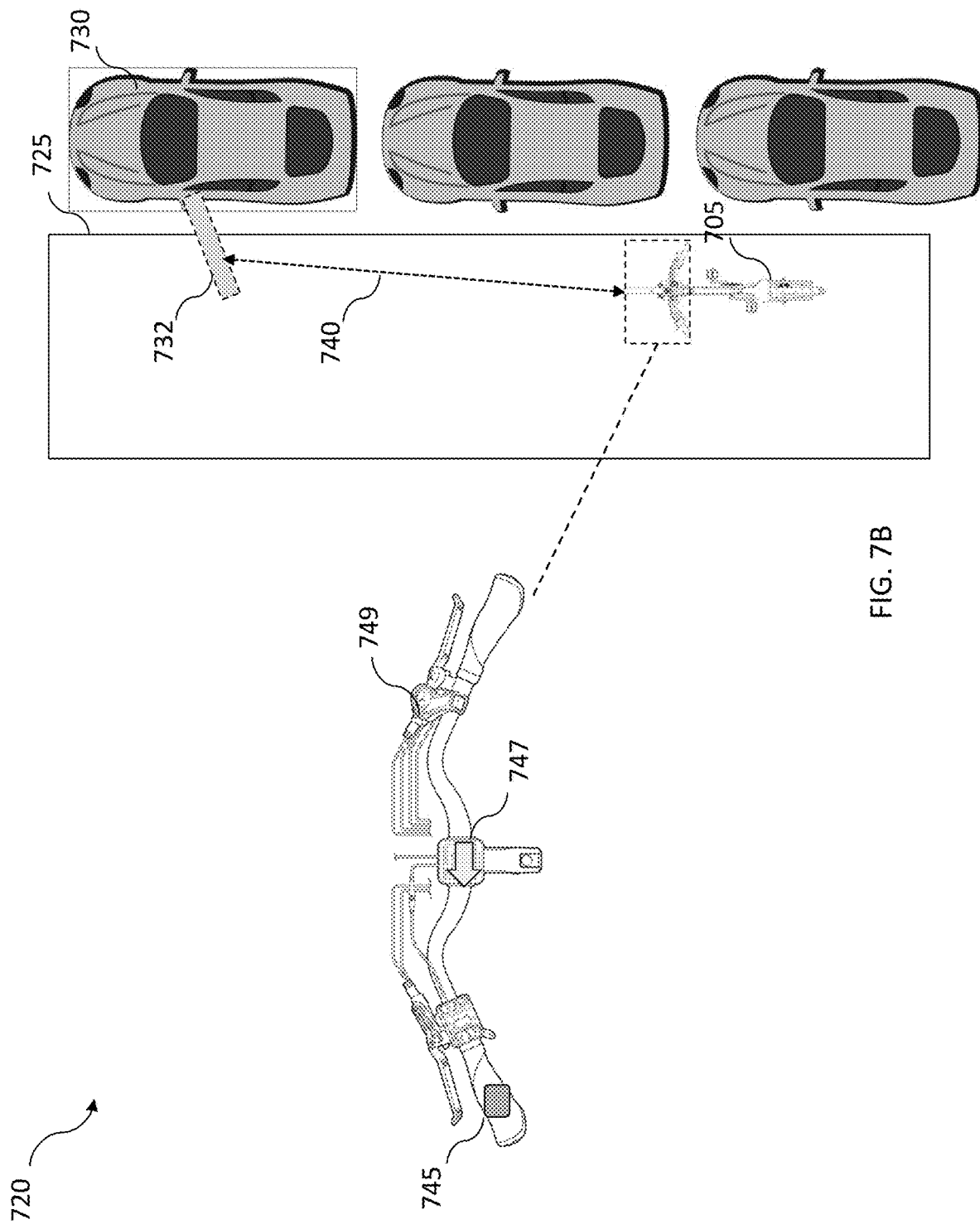

FIG. 7B depicts a scenario 720 where the electric bicycle 705 is traveling along a street 725 in a busy part of a city. The object detection system 500, located in the controller of the bicycle 705, captures images of the street 725 (and the area surrounding the bicycle 705) and identifies a series of parked cars 730 alongside the street 725. The system also captures information identifying a potentially hazardous object 732 within the road 725, such as via a motion detector that emits a beam 740 to detect objects in the street 725. The system 500 detects the object 732 (e.g., an open car door) as being in a location on the street 725 that is in the path of travel of the bicycle 705 and performs a series of safety actions.

The safety actions can include: an action to alert 747 the rider, via a user interface of the bicycle, to move away from the cars 730, an action that vibrates 745 the left grip of the bicycle to alert the rider to move away from the cars 730, and/or an action to vibrate the brake 749 to alert the rider to slow down before reaching the open car door. Thus, the system 500 identifies a potential hazard specific to the electric bicycle 725 during a ride and causes the bicycle 705 to alert the rider to create a safer ride for the rider of the bicycle 705.

Figure 7C:
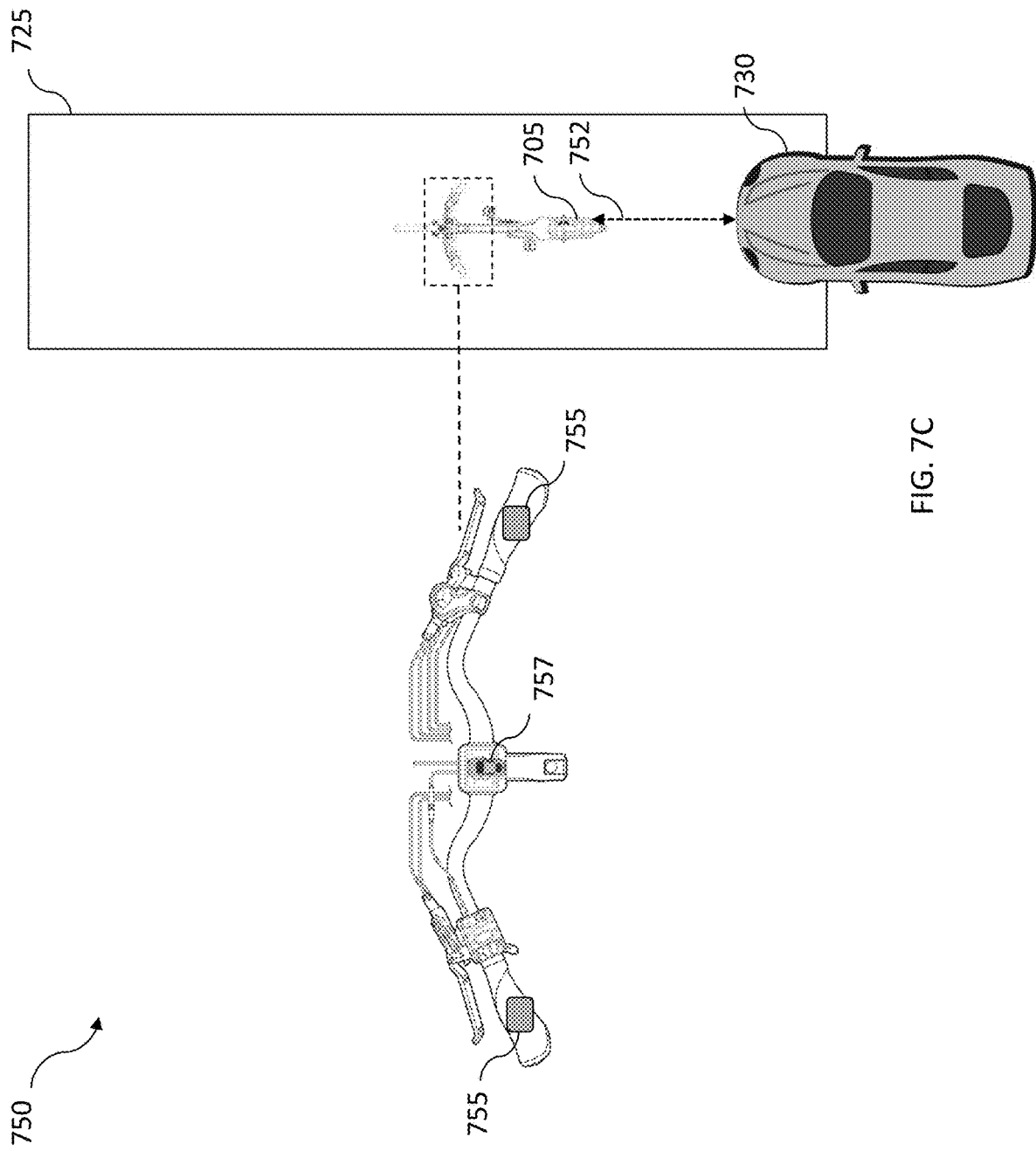

FIG. 7C depicts a scenario 750 where the electric bicycle 705 is traveling along the street 725 and the car 730 approaches from behind the electric bicycle 705. The object detection system 500, located in the controller of the bicycle 705, captures information identifying a potentially hazardous object, the car 730, approaching behind the electric bicycle 725, such as via a motion detector that emits a beam 752 to detect objects in the street 725. The system 500 detects the car 730 as being close to the bicycle 725 (e.g., within a certain threshold distance) and performs a series of safety actions in response to the approaching car 730.

The safety actions can include: an action to alert 757 the rider, via a user interface of the bicycle, of the approaching car 730 (e.g., show an alert and/or presents images of the rear of the bicycle using a rear mounted camera), and/or an action that vibrates 755 the left and right grip of the bicycle to alert the rider of the approaching car 730. Thus, the system 500 identifies a potential hazard specific to the electric bicycle 725 during a ride and causes the bicycle 705 to alert the rider to create a safer ride for the rider of the bicycle 705.

Figure 7D:
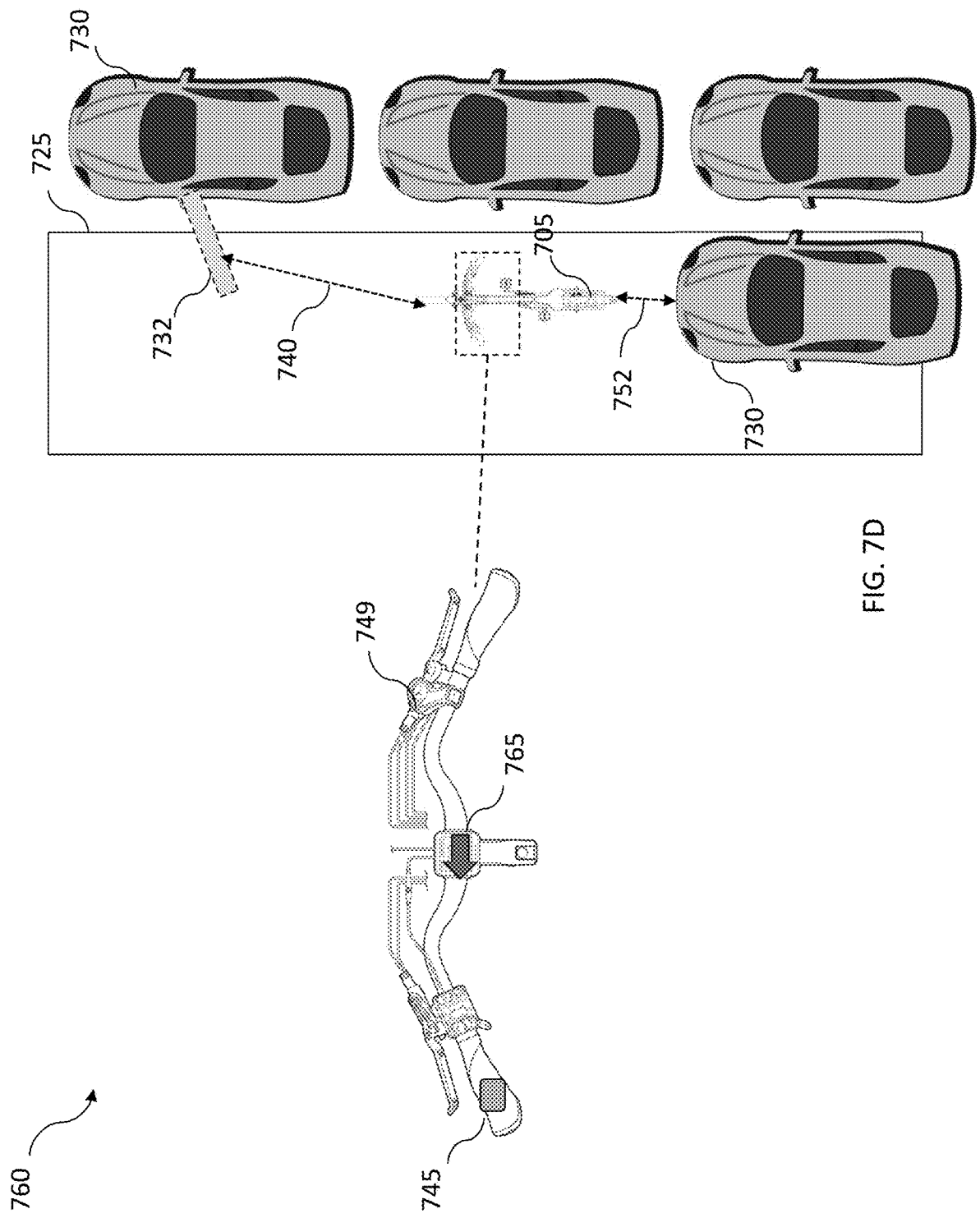

FIG. 7D depicts a scenario 760 combines the scenarios depicted in FIGS. 7B and 7C, where the electric bicycle 705 is traveling along the street 725 and the car 730 approaches from behind the electric bicycle 705 while other cars are parked along the road 725. The system 500 detects the object 732 (e.g., an open car door) as being in a location on the street 725 that is in the path of travel of the bicycle 705 and performs a series of safety actions. However, the system 500 also detects the car 730 as being close to the rear of the bicycle 725 (e.g., within a certain threshold distance) and performs a series of safety actions in response to the approaching car 730 and the open door 732.

The safety actions can include: an action to alert 765 the rider of a dangerous situation, via a user interface of the bicycle, of the approaching car 730, and/or an action that vibrates 755 the left and right grip of the bicycle to alert the rider of the approaching car 730. For example, the action 765 informs the rider to move to the left to avoid the car door 732, but includes an indication of caution (e.g., a red arrow) when the rider changes course, because the car 730 is behind the bicycle 705. Thus, the system 500 identifies a combination of potential hazards specific to the electric bicycle 725 during a ride and causes the bicycle 705 to alert the rider of the dangerous situation to create a safer ride for the rider of the bicycle 705.

Of course, the system 500 can be implemented to mitigate other dangerous situations and/or potential hazards, as described herein.

Examples of a Bicycle Visibility System

As described herein, in some embodiments, the electric bicycle 110 includes technology that enhances or increases the visibility of the bicycle 110 in response to detected potential hazards or unsafe conditions at an environment within which the bicycle is traveling.

Figure 8:
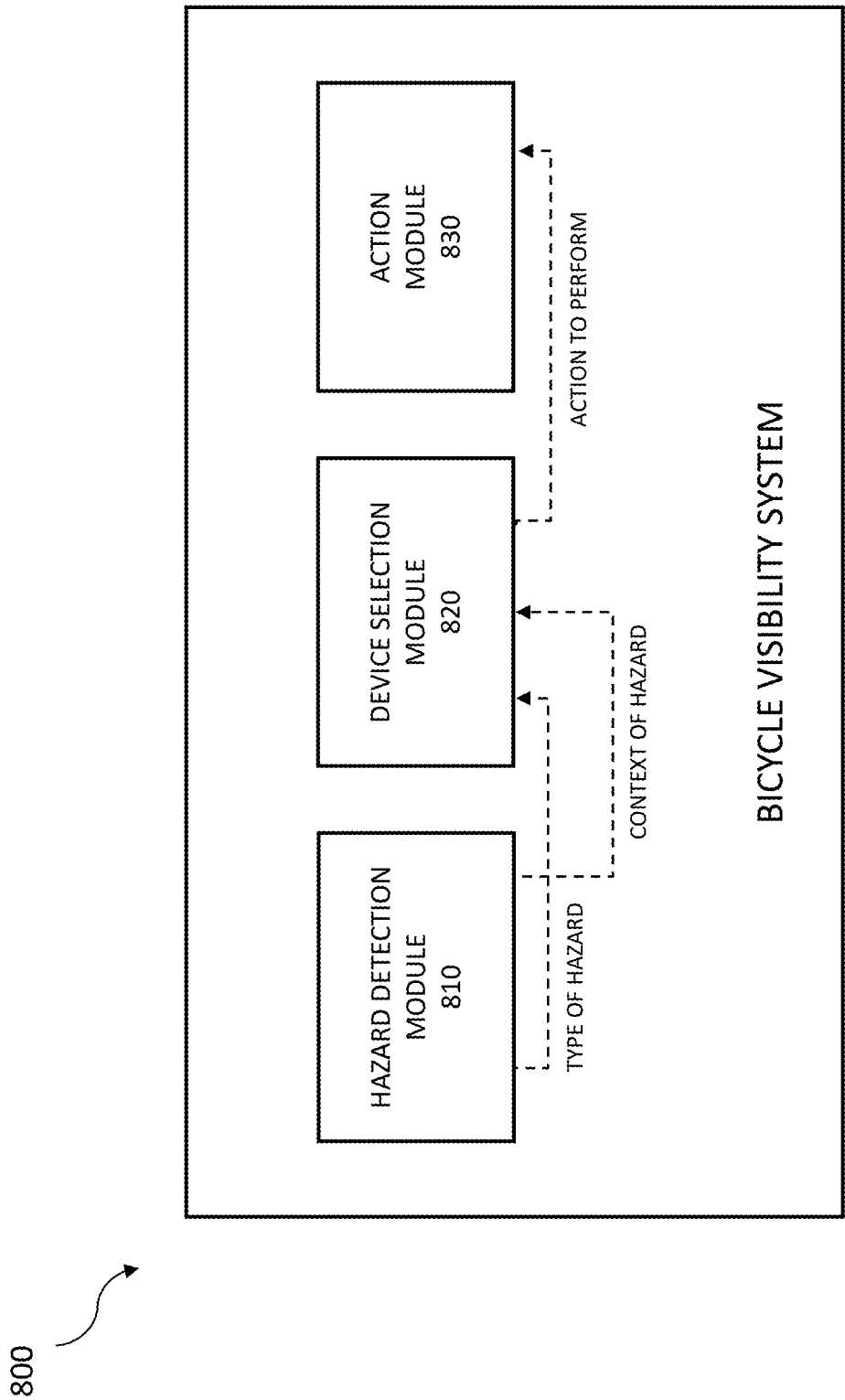
FIG. 8 is a block diagram illustrating components of a bicycle visibility system.

FIG. 8 is a block diagram illustrating components of a bicycle visibility system 800. The components and/or modules of the bicycle visibility system 800 (which can be supported or included by the safety system 130 and/or the fleet management server 140) can be implemented with a combination of software (e.g., executable instructions, or computer code) and hardware (e.g., at least a memory and processor). Accordingly, as used herein, in some example embodiments, a component/module is a processor-implemented component/module and represents a computing device having a processor that is at least temporarily configured and/or programmed by executable instructions stored in memory to perform one or more of the functions that are described herein. The bicycle visibility system 800 includes a hazard detection module 810, a device selection module 820, and an action module 830.

In some embodiments, the hazard detection module 810 is configured and/or programmed to receive or access data captured by various sensors from an environment through which the electric bicycle is traveling. Further, the module 810 detects an occurrence of a potential hazard to the electric bicycle or to a rider of the electric bicycle, and a context associated with the occurrence of the potential hazard.

For example, like the rider safety system 300 described herein, the hazard detection module 810 can utilize sensor data from the sensors 245 to detect a potential hazard or unsafe condition for the electric bicycle, such as the electric bicycle 110, 200. The hazards can include vehicles, other bicycles or micro-mobility vehicles, pedestrians, and so on.

The hazard detection module 810 also determines or identifies a context within which the electric bicycle is traveling, such as via data captured by the sensors 245, 250 and/or from information received from various remote servers, such as the fleet management server 140.

For example, the hazard detection module 810 receives data captured by one or more visibility sensors (e.g., current level of light or how clear the area is) and determines a visibility context associated with the occurrence of the potential hazard. The visibility context can identify a level of visibility for a rider of the electric bicycle, such as a low level, medium level, or high level of visibility.

As another example, the hazard detection module 810 receives data captured by one or more motion sensors (e.g., number of objects in area) and determines a vehicle hazard context associated with the occurrence of the potential hazard. The vehicle hazard context can identify a number of vehicles proximate to the electric bicycle, such as a low number of vehicles, a normal number of vehicles, or a high level of vehicles (traffic on the road).

Further, the hazard detection module 810 can receive data captured by one or more location sensors (e.g., GPS sensors) and determine a location safety context associated with the occurrence of the potential hazard. The location safety context can identify a safety factor or danger factor for the location within which the electric bicycle is traveling, such as a factor that identifies how dangerous the location is or is predicted to be based on historical levels or hazard events for the location.

Also, the hazard detection module 810 can receive data captured by one or more light sensors (e.g., which measure the light around the bicycle) and determine an environmental lighting context associated with the occurrence of the potential hazard. The environmental lighting context can indicate a current ambient light for a location, such as how bright or dark is the environment that surrounds the electric bicycle.

In some embodiments, the device selection module 820 is configured and/or programmed to select one or more safety devices based on the occurrence of the potential hazard and the context of the occurrence of the potential hazard. For example, the device selection module 820 can select a variety of different lighting devices (e.g., any or all of devices 260-277).

Further, depending on the determined context, the device selection module 820 can select non-visual or non-lighting visibility devices, such as an audio safety device that outputs an auditory alarm in a direction of the potential hazard and/or a notification device that transmits a message indicating a presence of the electric bicycle to a computing device associated with a hazard (e.g., a vehicle, an autonomous vehicle, or other bicycle).

In some embodiments, the action module 830 is configured and/or programmed to cause the electric bicycle to perform a visibility action for the electric bicycle using the selected one or more safety devices. For example, like the action modules 330, 530 described herein, the action module 830 performs actions to increase and/or enhance the visibility of the electric bicycle.

Some example actions include adjusting an angle of illumination for light emitted by the head lamp 260 of the electric bicycle, dynamically adjusting a shape of light emitted by the head lamp 260 of the electric bicycle (e.g., changing the shape and/or size of the emitted light), such as within an area between the electric bicycle and the potential hazard.

Other example actions include causing the multiple rear lighting devices 265, 267 of the electric bicycle to emit a dynamically changing pattern of light in three-dimensional space behind the electric bicycle, causing the lighting devices on a side of the frame of the electric bicycle (e.g., device 272 or 262) to generate a three-dimensional shape visible in an area between the electric bicycle and the potential hazard, and so on. For example, presenting light via various devices in 3D space (e.g., rear lights, side lights, helmet light) can cause an appearance of a 3D image and alert the hazard of the presence of the bicycle.

The following examples illustrate how visibility actions can increase, enhance, or otherwise modify the visibility of the bicycle:

When the selected safety devices include some or all of the multiple lighting devices 260-277 mounted to the frame of the electric bicycle, and when the multiple lighting devices include the head lamp 260 that emits light having a first shape associated with a normal operation of the electric bicycle, and a second shape associated with a safety operation of the electric bicycle, the action module 830 causes the electric bicycle to perform the visibility action by causing the head lamp to emit light having the second shape associated with a safety operation of the electric bicycle.

When the selected safety devices include the multiple lighting devices 260-277 mounted to the frame of the electric bicycle, and when the multiple lighting devices include the head lamp 260 that emits light in a forward direction and lights 262 mounted to an end of handlebars of the electric bicycle, the action module 830 causes the electric bicycle to perform the visibility action by causing the headlamp 260 to emit light in the forward direction and causing the light 262 mounted to the end of handlebars of the electric bicycle to emit light to a side direction away from the electric bicycle.

When the selected safety devices include the multiple lighting devices 260-377 mounted to the frame of the electric bicycle, and when the multiple lighting devices include a downlighting system (e.g., device 270 and/or 272) that illuminates a surface under which the electric bicycle is traveling, the action module 830 causes the electric bicycle to perform the visibility action by causing the downlighting system to modify a shape of illumination of the surface under which the electric bicycle is traveling.

As described herein, the bicycle visibility system 800 performs various processes and methods to increase the safety of a rider of an electric bicycle by enhancing the visibility of the electric bicycle in response to detected potential hazards or unsafe conditions around the bicycle.

Figure 9:
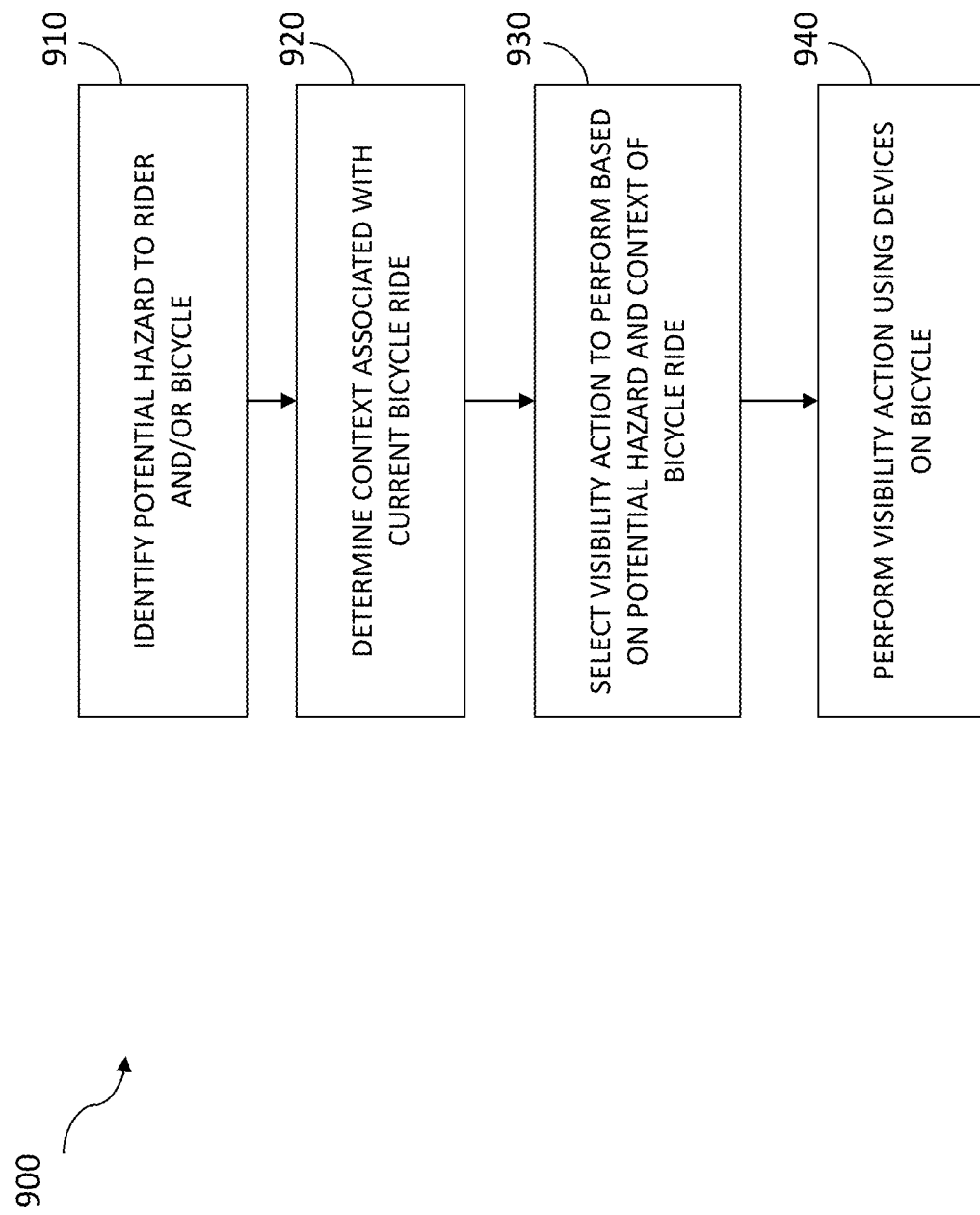
FIG. 9 is a flow diagram illustrating an example method for enhancing the visibility of an electric bicycle.

FIG. 9 is a flow diagram illustrating an example method 900 for enhancing the visibility of an electric bicycle. The method 900 may be performed by the bicycle visibility system 800 and, accordingly, is described herein merely by way of reference thereto. It will be appreciated that the method 900 may be performed on any suitable hardware.

In operation 910, the bicycle visibility system 800 receives or accesses data captured by one or more sensors and from an environment through which the electric bicycle is traveling and detects an occurrence of a potential hazard to the electric bicycle or to a rider of the electric bicycle. For example, like the rider safety system 300 described herein, the hazard detection module 810 can utilize sensor data from the sensors 245 to detect a potential hazard or unsafe condition for the electric bicycle, such as the electric bicycle 110, 200. The hazards can include vehicles, other bicycles or micro-mobility vehicles, pedestrians, and so on.

In operation 920, the bicycle visibility system 800 determines a context associated with a path traveled by the electric bicycle (e.g., a current or predicted ride for the bicycle). For example, the hazard detection module 810 determines or identifies a context within which the electric bicycle is traveling, such as via data captured by the sensors 245, 250 and/or from information received from various remote servers, such as the fleet management server 140.

In operation 930, the bicycle visibility system 800 selects one or more safety devices based on the occurrence of the potential hazard and the determined context of the path traveled by the electric bicycle and/or selects a visibility action to perform based on the potential hazard and the determined context. For example, the device selection module 820 can select a variety of different lighting devices (e.g., any or all of devices 260-277), as well as non-visual or non-lighting visibility devices, such as an audio safety device that outputs an auditory alarm in a direction of the potential hazard and/or a notification device that transmits a message indicating a presence of the electric bicycle to a computing device associated with a hazard (e.g., a vehicle or other bicycle).

In operation 940, the bicycle visibility system 800 causes the electric bicycle to perform a visibility action for the electric bicycle using the selected one or more safety devices. For example, the action module 830 performs actions to increase and/or enhance the visibility of the electric bicycle. As described herein, some example actions include adjusting an angle of illumination for light emitted by the head lamp 260 of the electric bicycle, dynamically adjusting a shape of light emitted by the head lamp 260 of the electric bicycle (e.g., changing the shape and/or size of the emitted light), such as within an area between the electric bicycle and the potential hazard.

The bicycle visibility system 800, as described herein, can enhance the visibility of a rider of an electric bicycle in a variety of scenarios. FIGS. 10A-10D depict the system 800 operating within these scenarios.

Figure 10A:
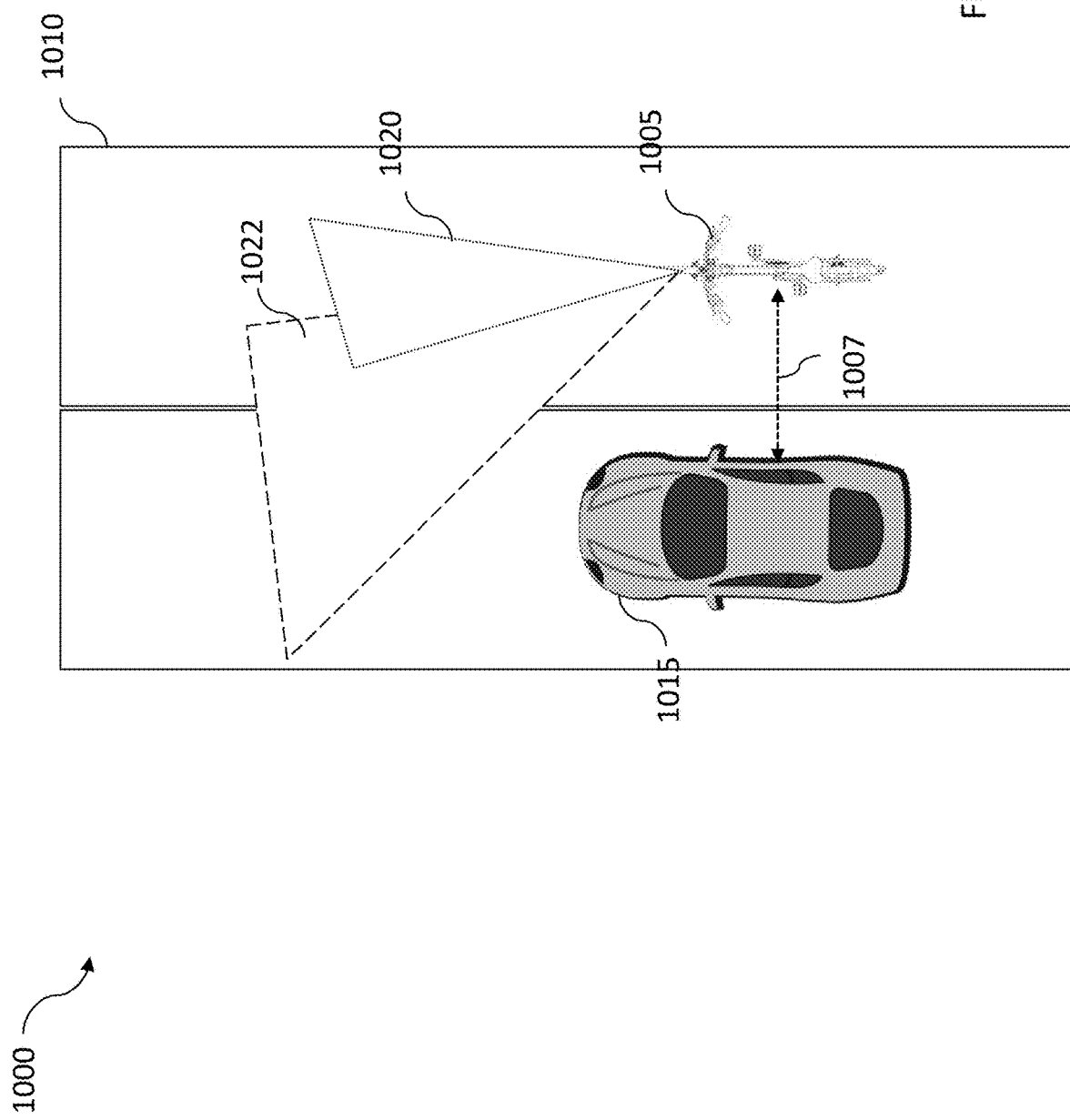

FIG. 10A depicts a scenario 1000 where an electric bicycle 1005 is traveling along a road 1010 next to a vehicle 1015 at night. The system 800, via the hazard detection module 810, determines an occurrence of a potential hazard to the electric bicycle 1005 or to the rider of the electric bicycle as the vehicle 1015 traveling next to the electric bicycle 1005 (e.g., based on data received from a motion capture sensor 1007). The system 800, via the action module 830, causes the electric bicycle to perform a visibility action that causes a head lamp of the electric bicycle to adjust a shape of illumination 1020 to become visible in an area 1022 between the electric bicycle 1005 and the vehicle 1015.

Figure 10B:
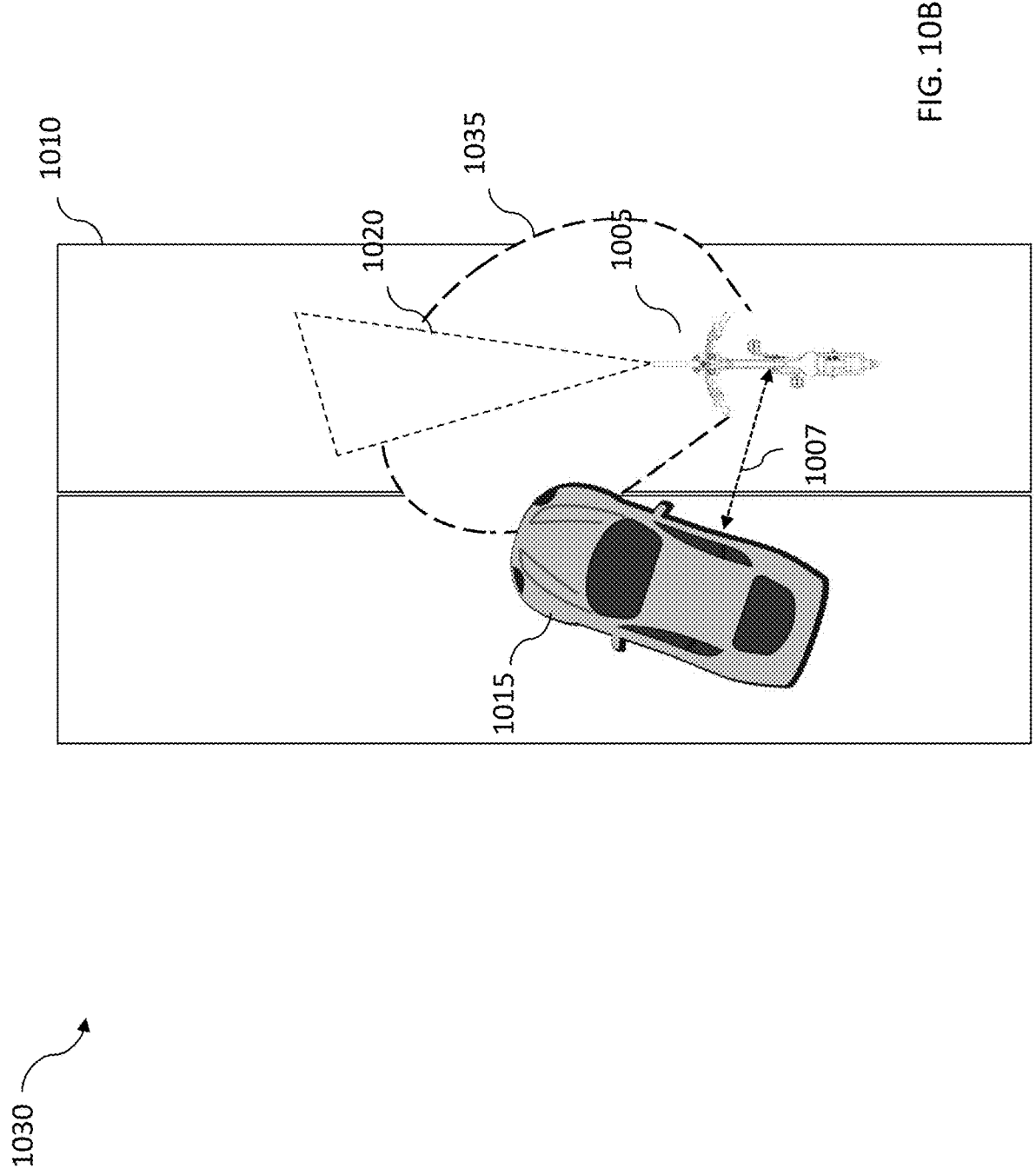

FIG. 10B depicts a scenario 1030 where an electric bicycle 1005 is traveling along the road 1010 next to the vehicle 1015 at night. The system 800, via the hazard detection module 810, determines an occurrence of a potential hazard to the electric bicycle 1005 or to the rider of the electric bicycle as the vehicle 1015 traveling towards the electric bicycle 1005 (e.g., based on data received from a motion capture sensor 1007). The system 800, via the action module 830, causes the electric bicycle to perform a visibility action that causes downlighting devices of the electric bicycle to create a light envelope 1035 around the bicycle, in addition to the illumination 1020 emitted by the head lamp. The shape of the light envelope 1035 can dynamically change or move to alert a driver of the vehicle, such as by moving into an area between the electric bicycle 1005 and the vehicle 1015 and/or impinging on the movement of the vehicle 1015.

Figure 10C:
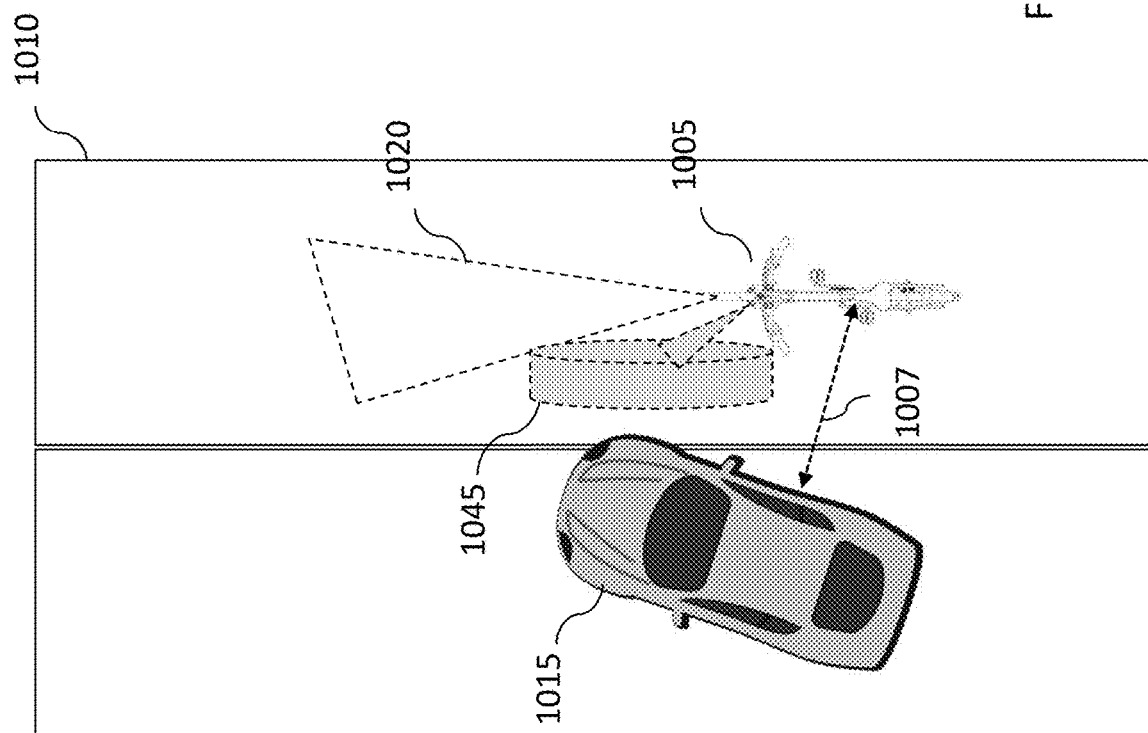

FIG. 10C depicts a scenario 1040 where an electric bicycle 1005 is traveling along the road 1010 next to the vehicle 1015 at night. The system 800, via the hazard detection module 810, determines an occurrence of a potential hazard to the electric bicycle 1005 or to the rider of the electric bicycle as the vehicle 1015 turning into the path of the electric bicycle 1005 (e.g., based on data received from a motion capture sensor 1007). The system 800, via the action module 830, causes the electric bicycle to perform a visibility action that causes side lighting devices to create a three-dimensional shape of light 1045 (e.g., via a laser projection or multiple lighting devices) that is visible in an area between the electric bicycle 1005 and the vehicle 1015.

For example, when riding in mist or fog, the light 1045 can illuminate a 3D area next to the electric bicycle 1005. The 3D light image can facilitate a driver of the vehicle 1015 seeing the electric bicycle 1005 before a collision. Thus, the bicycle 1005 can, in some cases, determine a context of travel (e.g., mist, fog, and so on), and adapt the action module 830 to present a certain type of illumination suitable for the context of travel.

FIG. 10D depicts a scenario 1050 where an electric bicycle 1005 is traveling along the road 1010 next to the vehicle 1015 during the day or during high visibility conditions. The system 800, via the hazard detection module 810, determines an occurrence of a potential hazard to the electric bicycle 1005 or to the rider of the electric bicycle as the vehicle 1015 traveling next to the electric bicycle 1005 (e.g., based on data received from a motion capture sensor 1007). The system 800, via the action module 830, causes the electric bicycle to perform a visibility action that causes a communication device of the electric bicycle 1005 to send a message 1055 (e.g., over Bluetooth or another messaging channel) to the vehicle 1015 that a bicycle is close by, alerting a driver of the vehicle 1015 to the presence of the bicycle.

Of course, the system 800 can be employed in other scenarios, such as when vehicle traveling towards the electric bicycle from a location behind the bicycle, where the action module 830 causes the electric bicycle to perform a visibility action that causes multiple rear lighting devices of the electric bicycle to dynamically perform a three-dimensional pattern of illumination, among other actions.

Further, the system 800, or other systems described herein, can send messages to vehicles as well as infrastructure, in response to the detection of potential hazards. Such messages can alert the hazards of the presence of the bicycle to one or many vehicles at a location or route, but can also notify certain entities (e.g., city or municipal entities) of the detected hazards.

Thus, as described herein, the bicycle visibility system 800 can perform various operations to increase and/or enhance the visibility of the electric bicycle in dangerous or predicted dangerous conditions. For example, the system 800, stored in memory of the controller 215 of the electric bicycle 200, can detect a potential hazard proximate to the electric bicycle, determine a context associated with a path traveled by the electric bicycle, select one or more lighting devices based on the potential hazard and the determined context of the path traveled by the electric bicycle, and cause the electric bicycle to perform a visibility action for the electric bicycle using the selected one or more lighting devices.

Examples of an Automatic Lighting System

As described herein, in some embodiments, the electric bicycle 110 automatically modifies lighting operations in response to a ride context for a bike ride and/or bike actions performed by the electric bicycle 110.

Figure 11:
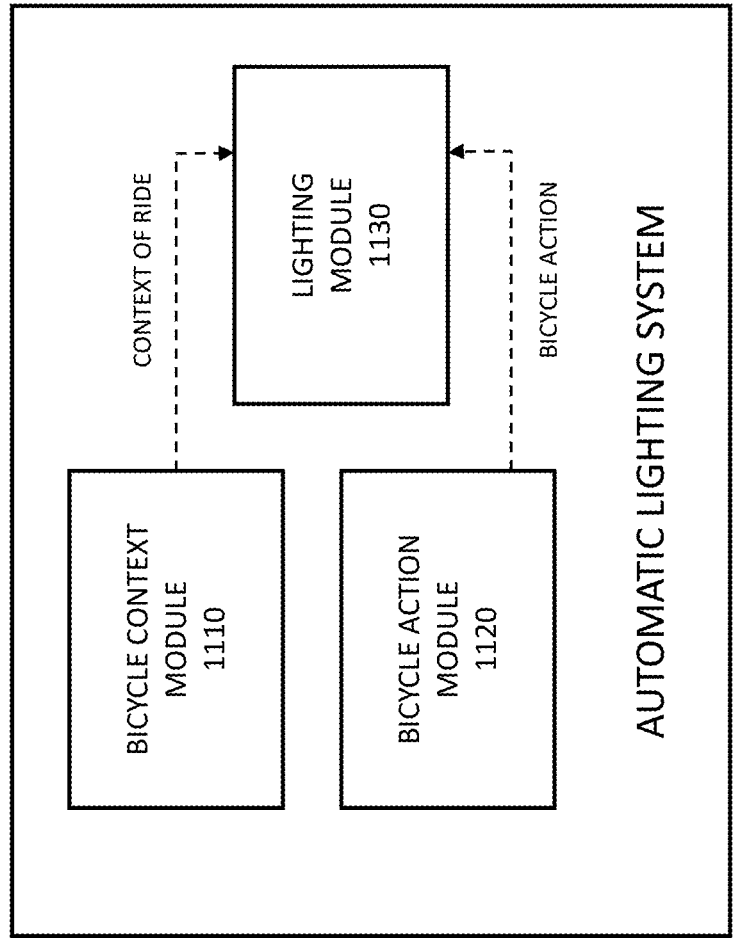
FIG. 11 is a block diagram illustrating components of an automatic lighting system.

FIG. 11 is a block diagram illustrating components of an automatic lighting system 1100. The components and/or modules of the automatic lighting system 1100 (which can be supported or included by the safety system 130 and/or the fleet management server 140) can be implemented with a combination of software (e.g., executable instructions, or computer code) and hardware (e.g., at least a memory and processor). Accordingly, as used herein, in some example embodiments, a component/module is a processor-implemented component/module and represents a computing device having a processor that is at least temporarily configured and/or programmed by executable instructions stored in memory to perform one or more of the functions that are described herein. The automatic lighting system 1100 includes a bicycle context module 1110, a bicycle action module 1120, and a lighting module 1130.

In some embodiments, the bicycle context module 1110 is configured and/or programmed to determine a ride context associated with an environment through which the electric bicycle is traveling. For example, the bicycle context module 1110 can receive information collected or captured by data from the environment associated with a current visibility for a rider of the electric bicycle and/or associated with a current number of vehicles sharing a road with the electric bicycle, among other types of information.

In some embodiments, the bicycle action module 1120 is configured and/or programmed to determine a current bicycle action is being performed by the electric bicycle. For example, current bicycle actions can include a turning of the bicycle, an acceleration of the bicycle, a braking of the bicycle, and so on.

In some embodiments, the lighting module 1130 is configured and/or programmed to select one or more lighting devices based on the ride context of the environment through which the electric bicycle is traveling and/or based on the current bicycle action being performed by the electric bicycle. Further, the lighting module 1130 causes the electric bicycle to perform a lighting action for the electric bicycle using the selected one or more lighting devices that is based on the ride context associated with the environment through which the electric bicycle is traveling and/or based on the current bicycle action.

For example, the lighting module 1130 causes the electric bicycle to automatically perform an action that increases illumination emitted by the one or more lighting devices in a forward direction in response to a bicycle context indicating low visibility around the bicycle.

As another example, the lighting module 1130 causes the electric bicycle to perform an action that increases illumination emitted by the one or more lighting devices in a side direction around the electric bicycle (e.g., devices 267, 262, 272, 277) in response to a ride context indicating a congested or heavy trafficked road upon which the bicycle is traveling.

Further, the automatic lighting system 1100 can automatically modify operations for an area or environment to which a bicycle is traveling but has not yet entered. For example, the bicycle context module 1110 can determine an unsafe ride context for the environment through which the electric bicycle is traveling or is going to travel based on information received from another electric bicycle that has previously traveled through the environment (e.g., information tracked and obtained from the fleet management server 140). Using this context information, the lighting module 1130 causes the electric bicycle to perform an action that increases intensity of a lighting envelope emitted around the electric bicycle in response to the determined unsafe ride context.

Thus, in some cases, the bicycle context module 1110 can determine an unsafe location context for the environment through which the electric bicycle is traveling by communicating with the fleet management server 140. For example, the module transmits location information for the environment to the fleet management server 140, which manages a fleet of electric bicycles that includes the electric bicycle, and receives, from the fleet management server 140, an indication that the environment is currently an unsafe location for bicycles. Using the received context information, the lighting module 1130 causes the electric bicycle to perform a visibility action in response to the determined unsafe location context for the environment.

The automatic lighting system 1100 can also automatically modify and/or adapt the lighting of the electric bicycle (e.g., the electric bicycle 200) based on a type of path or road traveled by the bicycle. For example, the bicycle context module 1110 determines the environment through which the electric bicycle is traveling includes a bicycle path and the lighting module causes 1130 causes the electric bicycle to perform an action that adjusts illumination emitted from the one or more lighting devices to a path mode of illumination. A path mode of illumination can include lighting that is focused on or directed to illuminating the path and not focused on making the bicycle visible in all directions, because a bicycle path is often separated from vehicles and other hazards.

In contrast and as another example, the bicycle context module 1110 determines the environment through which the electric bicycle is traveling includes a street and the lighting module 1130 causes the electric bicycle to perform an action that adjusts illumination emitted from the one or more lighting devices to a street mode of illumination. A street mode of illumination can include lighting that is focused on making the bicycle visible to other vehicles or pedestrians, because the street is often shared with other vehicles but may provide lighting that assist the bicycle in seeing the environment when riding along the street.

In some cases, the context can change, and the automatic lighting system 1100 can adapt a current mode of operation to a different mode of operation. For example, the bicycle context module 1110 determines at a later time that the ride context for the environment through which the electric bicycle is traveling has changed, and the lighting module 1130 causes the electric bicycle to perform a different lighting action for the electric bicycle using the selected one or more lighting devices based on the changed ride context associated with the environment through which the electric bicycle is traveling.

As described herein, the automatic lighting system 1100 performs various processes and methods to automatically adjust lighting for an electric bicycle based on a context surrounding the electric bicycle.

Figure 12:
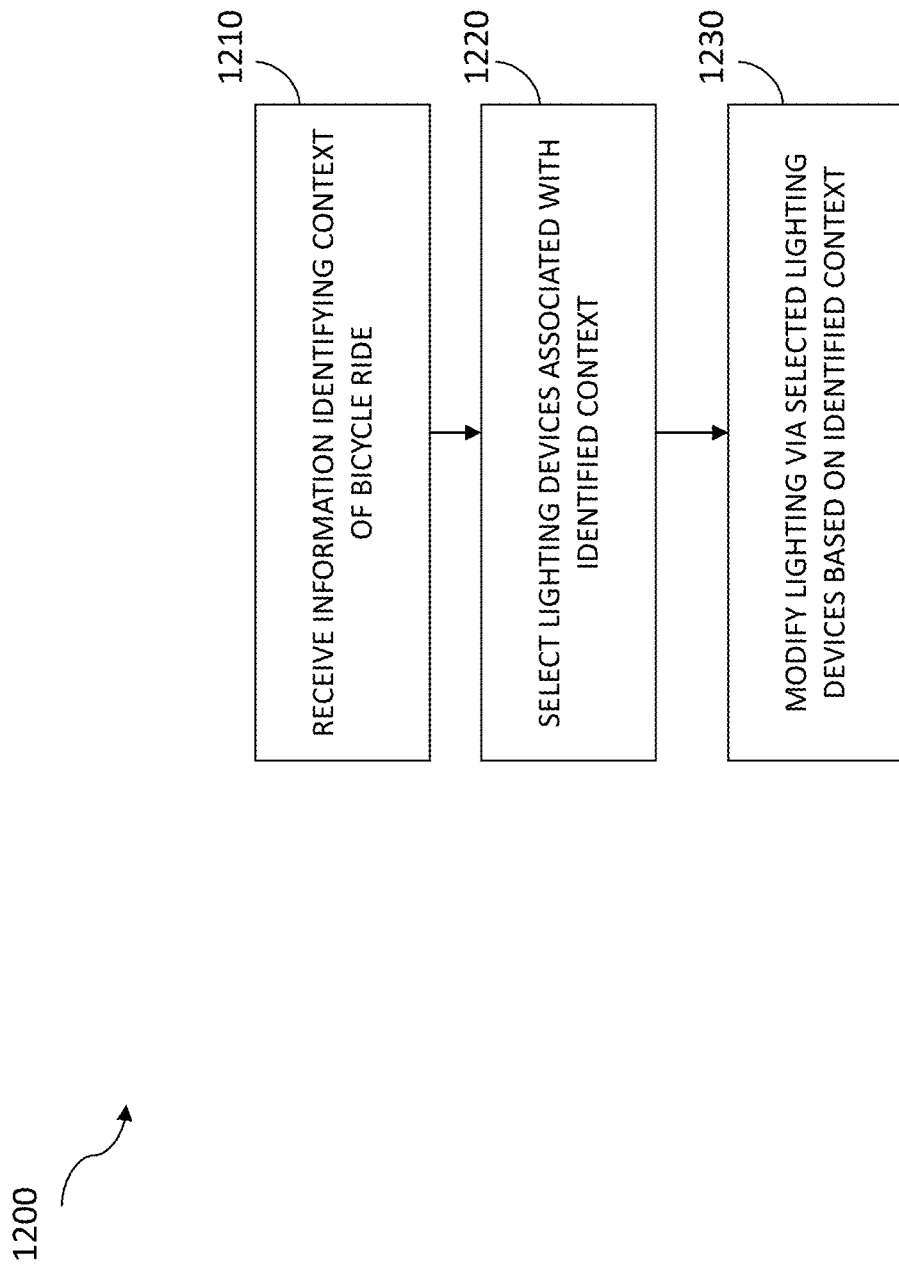
FIG. 12 is a flow diagram illustrating an example method for adjusting the lighting of an electric bicycle based on a current mode of travel of the electric bicycle.

FIG. 12 is a flow diagram illustrating a method 1200 for adjusting the lighting of an electric bicycle based on a current mode of travel of the electric bicycle. The method 1200 may be performed by the automatic lighting system 1100 and, accordingly, is described herein merely by way of reference thereto. It will be appreciated that the method 1200 may be performed on any suitable hardware.

In operation 1210, the automatic lighting system 1100 receives or accesses information identifying a context of a bicycle ride currently traveled by an electric bicycle. For example, the bicycle context module 1110 can receive information collected or captured by data from the environment associated with a current visibility for a rider of the electric bicycle and/or associated with a current number of vehicles sharing a road with the electric bicycle, among other types of information.

In operation 1220, the automatic lighting system 1100 selects lighting devices associated with the identified context. For example, the lighting module 1130 can select a head lamp when the context indicates a low visibility surrounding the bicycle ride and select a downlighting system when the context indicates a crowded road of vehicles surrounding the electric bicycle on the bicycle ride.

In operation 1230, the automatic lighting system 1100 modifies the current lighting via the selected lighting devices based on the identified context. For example, the lighting module 1130 causes the electric bicycle to automatically perform an action that increases illumination emitted by the one or more lighting devices in a forward direction in response to a bicycle context indicating low visibility around the bicycle.

As another example, the lighting module 1130 causes the electric bicycle to perform an action that increases illumination emitted by the one or more lighting devices in a side direction around the electric bicycle (e.g., devices 267, 262, 272, 277) in response to a ride context indicating a congested or heavy trafficked road upon which the bicycle is traveling.

As described herein, the automatic lighting system 1100 also performs various processes and methods to automatically adjust lighting for an electric bicycle based on bicycle actions performed (or predicted to be performed) by the electric bicycle.

Figure 13:
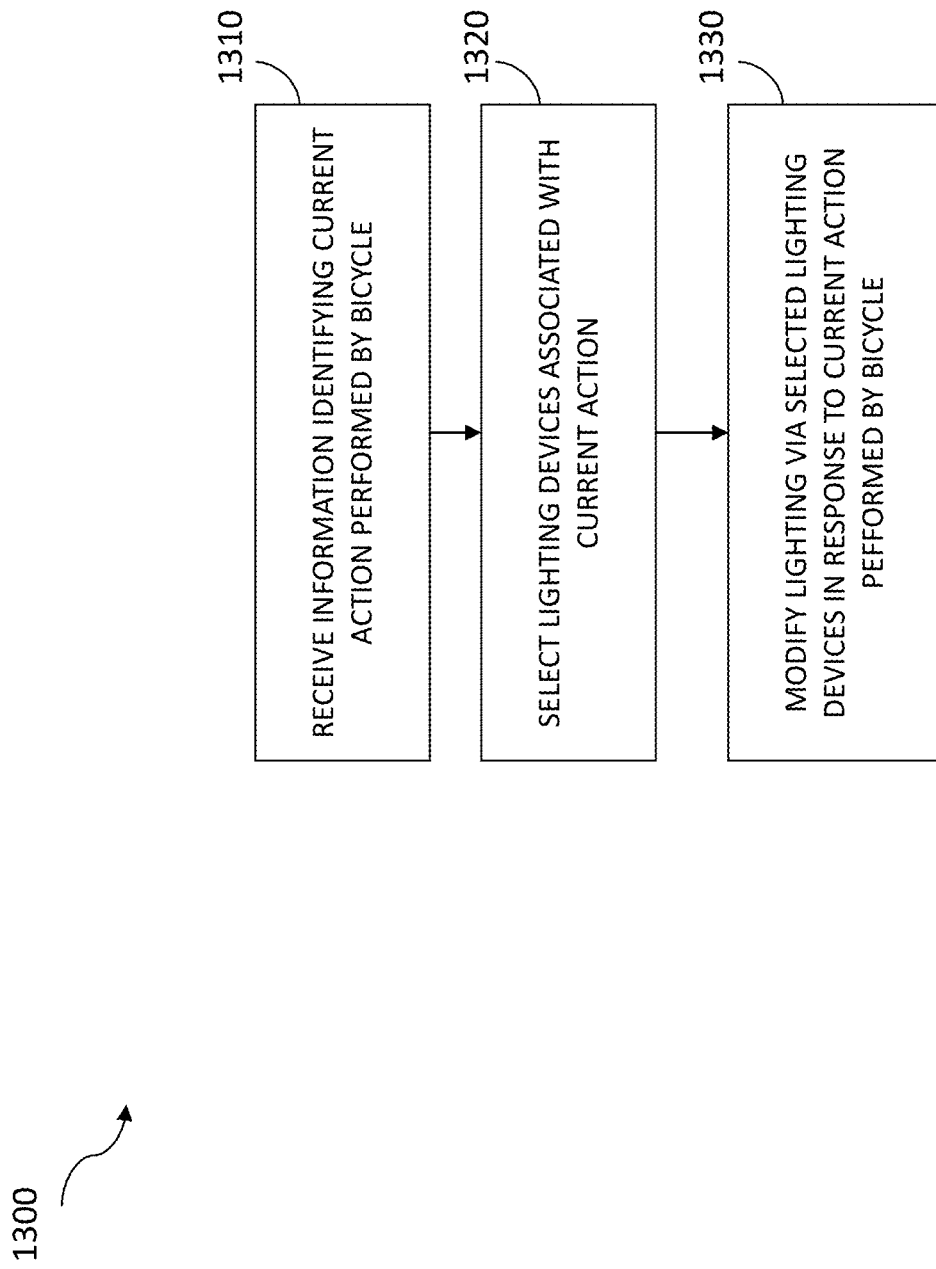
FIG. 13 is a flow diagram illustrating an example method for adjusting the lighting of an electric bicycle based on a current action performed by the electric bicycle.

FIG. 13 is a flow diagram illustrating an example method 1300 for adjusting the lighting of an electric bicycle based on a current action performed by the electric bicycle. The method 1300 may be performed by the automatic lighting system 1100 and, accordingly, is described herein merely by way of reference thereto. It will be appreciated that the method 1300 may be performed on any suitable hardware.

In operation 1310, the automatic lighting system 1100 receives information identifying a current action performed by an electric bicycle and/or determines a current bicycle action is being performed by the electric bicycle. For example, the current actions can include turning actions, acceleration actions, braking actions, and so on.

In operation 1320, the automatic lighting system 1100 selects lighting devices associated with the current bicycle action. For example, the lighting module 1130 can select a head lamp and grip lights when the bicycle is performing a turning action and select a downlighting system when the bicycle is performing a regenerative braking action.

In operation 1330, the automatic lighting system 1100 causes the electric bicycle to perform a lighting action for the electric bicycle using one or more lighting devices of the electric bicycle that is based on the current bicycle action being performed by the electric bicycle. For example, the lighting module 1130 can modify a shape of illumination emitted by the one or more lighting devices in response to the performance of the current bicycle action, can modify an angle of illumination emitted by the one or more lighting devices in response to the performance of the current bicycle action, can modify an intensity of illumination emitted by the one or more lighting devices in response to the performance of the current bicycle action, can modify a pattern of illumination emitted by the one or more lighting devices in response to the performance of the current bicycle action, and/or can modify a color of illumination emitted by the one or more lighting devices in response to the performance of the current bicycle action.

The system 1100, therefore, can modify the lighting in response to various bicycle action, such as:

when the current bicycle action is a turning action being performed by the electric bicycle, the system 1100 causes a head lamp of the electric bicycle to modify a shape of illumination to light an area in front of the electric bicycle at which the electric bicycle is turning (e.g., to illuminate the turn) and to emit a pattern indicative of the turn via the head lamp;

when the current bicycle action is an acceleration action being performed by the electric bicycle, the system 1100 causes a head lamp of the electric bicycle to modify a shape of illumination to light a larger area in front of the electric bicycle;

when the current bicycle action is an acceleration action being performed by the electric bicycle, the system 1100 causes downlighting of the electric bicycle to modify an envelope of illumination to increase the visibility of the electric bicycle during the braking action; and so on.

Thus, the automatic lighting system 1100 can automatically modify lighting for an electric bicycle in response to various context information and/or bicycle actions. As described herein, the system 1100 can anticipate or determine a context for an area predicted to be entered by the electric bicycle and modify its lighting in advance of reaching the area.

For example, the automatic lighting system 1100, which is stored in memory of the controller 215 of the electric bicycle 200, performs operations to transmit location information for a location that includes the electric bicycle (or is predicted to include the bicycle) to the fleet management server 140, which manages a fleet of electric bicycles that includes the electric bicycle 200. The system 1100 receives, from the fleet management server 140, an indication that the location is currently an unsafe location for bicycles and causes the electric bicycle 200 to perform a visibility action in response to the indication of the unsafe location for bicycles (e.g., in advance of reaching the location).

The fleet management server 140, as described herein, can utilize information from other electric bicycles to determine that the location is currently an unsafe location for bicycles. Further, the server 140 can make determinations based on various sets of data, such as data that represents a time-weighted average of potential hazard events that previously occurred with other electric bicycles of the fleet of electric bicycles. Thus, the server 140 can update the level of danger or hazard for the location as time passes and electric bicycles either encounter or do not encounter potential hazards.

Examples of a Location Safety System

As described herein, in some embodiments, the electric bicycle 110 performs safety actions based on how safe a location (e.g., an area, street, intersection, path, and so on) is determined to be for a given bicycle ride with the bicycle 110.

Figure 14:
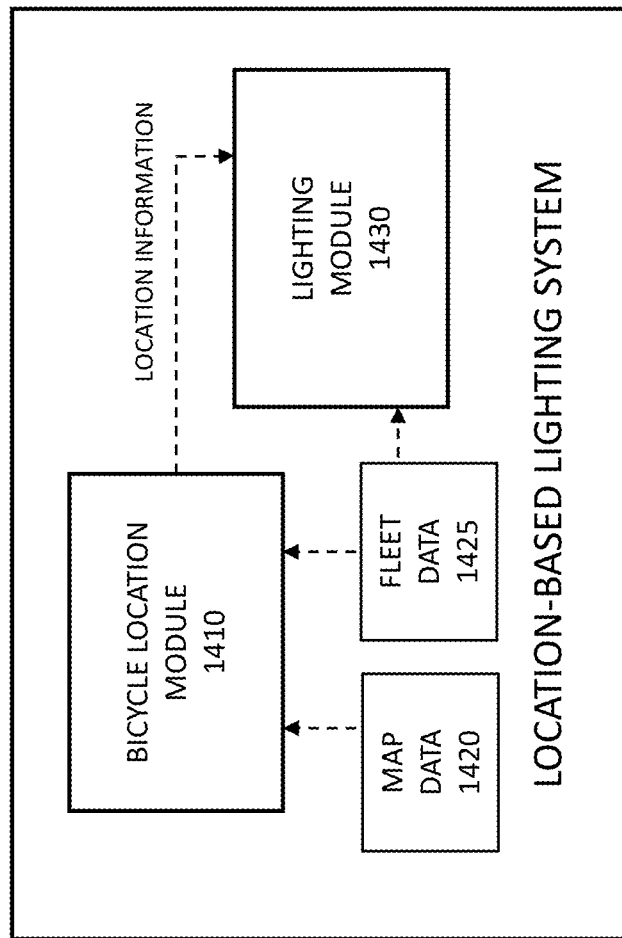
FIG. 14 is a block diagram illustrating components of a location-based lighting system.

FIG. 14 is a block diagram illustrating components of a location-based lighting system 1400. The components and/or modules of the location-based lighting system 1400 (which can be supported or included by the safety system 130 and/or the fleet management server 140) can be implemented with a combination of software (e.g., executable instructions, or computer code) and hardware (e.g., at least a memory and processor). Accordingly, as used herein, in some example embodiments, a component/module is a processor-implemented component/module and represents a computing device having a processor that is at least temporarily configured and/or programmed by executable instructions stored in memory to perform one or more of the functions that are described herein. The location-based lighting system 1400 includes a bicycle location module 1410 (which accesses map data 1420 and/or fleet data 1425) and a lighting module 1430.

In some embodiments, the bicycle location module 1410 is configured and/or programmed to identify a location associated with an environment through which the electric bicycle is traveling. For example, the bicycle location module 1410 can identify the location (or a location type) as a certain geographical location associated with the environment through which the electric bicycle is traveling, such as via map data 1420 accessed by the module 1410. In some cases, the bicycle location module 1410 identifies the location associated with an environment through which the electric bicycle is predicted to travel based on a determined path of travel for the electric bicycle.

As another example, the bicycle location module 1410 identifies a type of travel surface associated with the environment through which the electric bicycle is traveling, and/or specific intersection on a city grid within the environment through which the electric bicycle is traveling. The map data 1420 can provide GPS information, such as Lat-Lon data for the area in which the bicycle is traveling or other identifiers, such as a street or path upon which the bicycle is riding.

The bicycle location module 1410 identifies the location associated with an environment through which the electric bicycle is traveling using map data 1420 (e.g., global positioning system (GPS) data) captured by the one or more sensors attached to the frame of the electric bicycle, motion detection data captured by the one or more sensors attached to the frame of the electric bicycle (e.g., to determine whether the area is a road or path based on the detection of other types of vehicles) and/or image data captured by the one or more sensors attached to the frame of the electric bicycle (e.g., to determine the type of area based on features in images of the area). Further, the bicycle location module 1410 can utilize the fleet data 1425 to assist in determining the type of location (e.g., using information from multiple bicycles of a fleet of bicycles manages by the fleet management server 140).

In some embodiments, the lighting module 1430 is configured and/or programmed to determine a safety metric for the identified location and cause the electric bicycle to perform a lighting action for the electric bicycle that is based on the safety metric determined for the location.

The safety metric can be in various formats or scales, and functions to represent a current safety level for the location. For example, the metric can have a simple scale (e.g., low danger, medium danger, high danger), or can be more granular (e.g., a number from 1-100). Further, the safety metric can indicate a type of dangerous condition at the location associated with the environment through which the electric bicycle is traveling, as well as the level of danger (or safety).

For example, the lighting module 1430 can determine the safety metric in the following example scenarios:

transmitting location information identified by the bicycle location module 1410 for the location through which the electric bicycle is traveling to the fleet management server 140, receiving, from the fleet management server 140, information captured by other electric bicycles of the fleet of electric bicycles that have previously traveled through the location, and generating the safety metric based on the information captured by the other electric bicycles. In some cases, the server 140 can generate the safety metric and send the metric information to the system 1400;

transmitting location information identified by the bicycle location module 1410 for the location through which the electric bicycle is traveling to the fleet management server 140, receiving, from the fleet management server 140, information captured by other electric bicycles of the fleet of electric bicycles that have previously traveled through the location within a certain time period before a current time period within which the electric bicycle travels through the location, and generating the safety metric based on the information captured by the other electric bicycles;

transmitting location information identified by the bicycle location module 1410 for the location through which the electric bicycle is traveling to the public database server 150 that tracks historical information associated with dangerous events at the location, receiving, from the public database 150, information associated with the dangerous events at the location, and generating the safety metric based on the information received from the public database; and so on.

The lighting module 1430, in some cases, can perform the safety actions described herein, such as actions to enhance a visibility of the electric bicycle within the environment (e.g., to be seen) and/or actions to increase a visibility of objects within the environment (e.g., to see within the environment)

As described herein, in some embodiments, the location-based lighting system 1400 performs various processes and methods when performing actions based on a determined level of safety for a location that includes (or is predicted to include) the electric bicycle.

Figure 15:
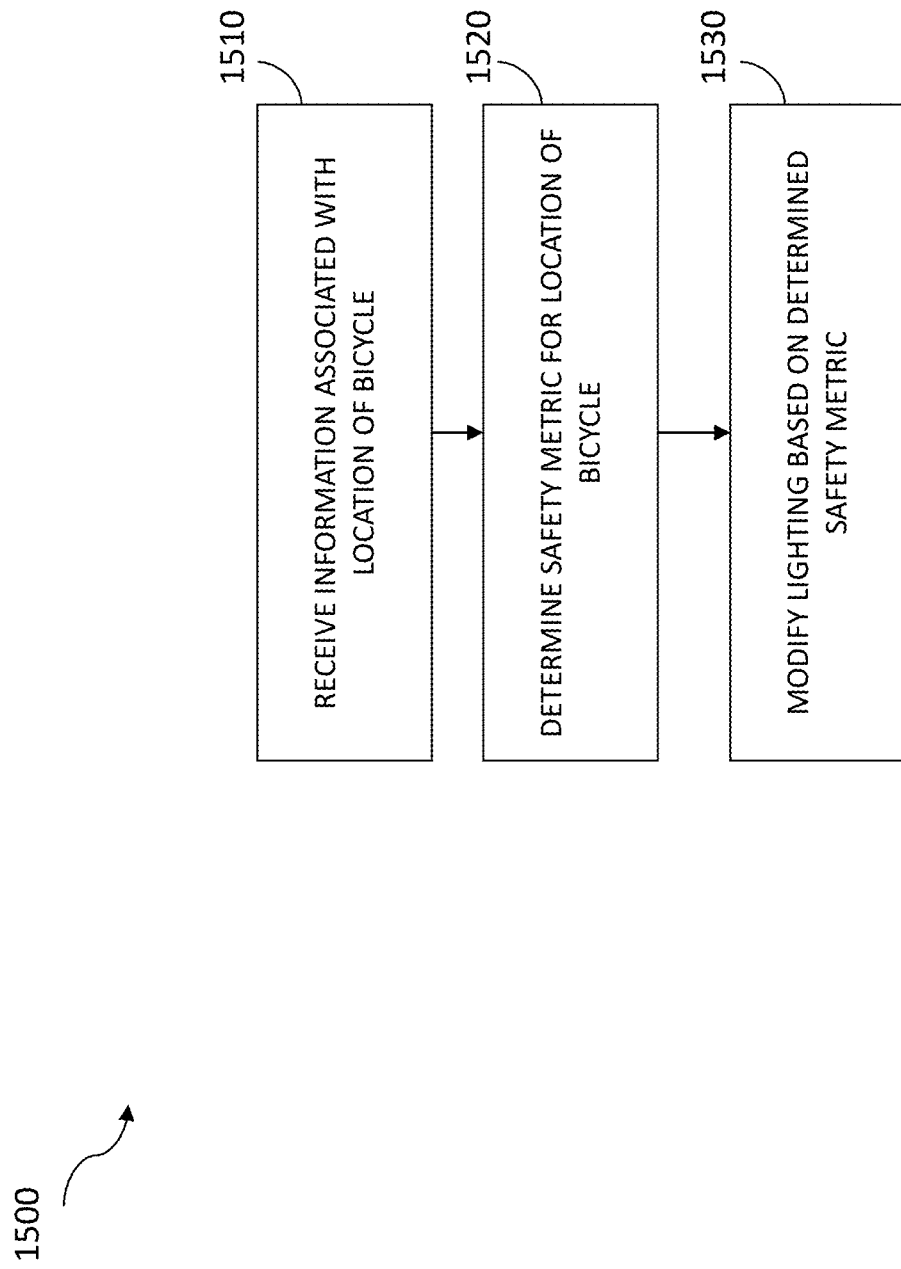
FIG. 15 is a flow diagram illustrating an example method for performing a safety action based on a location of an electric bicycle.

FIG. 15 is a flow diagram illustrating an example method 1500 for performing a safety action based on a location of an electric bicycle. The method 1500 may be performed by the location-based lighting system 1400 and, accordingly, is described herein merely by way of reference thereto. It will be appreciated that the method 1500 may be performed on any suitable hardware.

In operation 1510, the location-based lighting system 1400 identifies a location associated with an environment through which the electric bicycle is traveling. For example, the bicycle location module 1410 can identify the location (or a location type) as a certain geographical location associated with the environment through which the electric bicycle is traveling, such as via map data 1420 accessed by the module 1410. In some cases, the bicycle location module 1410 identifies the location associated with an environment through which the electric bicycle is predicted to travel based on a determined path of travel for the electric bicycle.

In operation 1520, the location-based lighting system 1400 determines a safety metric for the identified location. For example, the lighting module 1430 can determine a safety metric based on sensed data and/or data stored at remote servers (e.g., the fleet management server 140). The safety metric can be determined based on a current visibility at the location, an indication of previous potential hazard events at the location, a number and/or proximity of vehicles at the location, a type of route or surface at the location, and so on.

In operation 1530, the location-based lighting system 1400 causes the electric bicycle to perform a lighting action for the electric bicycle that is based on the safety metric determined for the location. For example, the lighting module 1430 can perform the safety actions described herein, such as actions to enhance a visibility of the electric bicycle within the environment and/or actions to increase a visibility of objects within the environment.

Figure 16:
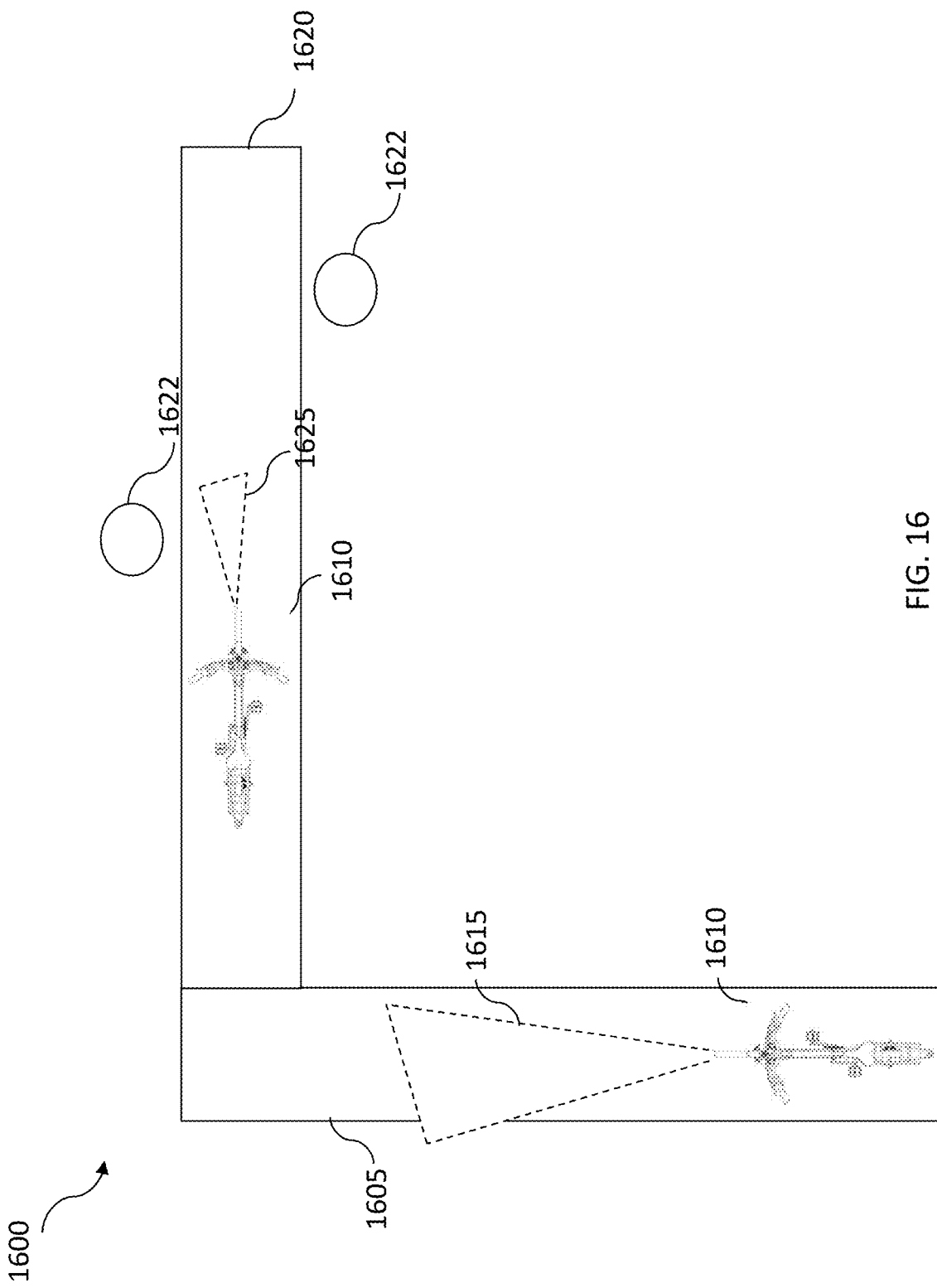
FIG. 16 is a diagram illustrating safety actions performed for a rider of an electric bicycle.

FIG. 16 is a diagram 1600 illustrating a safety action performed for a rider of an electric bicycle. As depicted, the electric bicycle 1610 travels along a path 1605 of low visibility. The location-based lighting system 1400, having knowledge of the visibility, causes the electric bicycle 1610 to emit a head lamp beam having a high intensity and large shape. As the electric bicycle 1610 moves to a different path 1620, which has its own lighting (e.g., the streetlights 1622), the system 1400 modifies the head lamp beam to a lower intensity beam 1625, because the streetlights 1622 also provide illumination for the path 1620.

Thus, the location-based lighting system 1400 can perform various operations for adjusting the lighting for an electric bicycle based on a current or predicted location of the bicycle. For example, the location-based lighting system 1400 is stored in memory of the controller 215 of the electric bicycle 200 and performs operations to identify a location through which the electric bicycle is predicted to enter along a current path of travel and determine a safety metric for the identified location. Using the determined metric, the system 1400 causes the electric bicycle to perform a lighting action for the electric bicycle that is based on the safety metric determined for the location. In some cases, the system 1400 performs the lighting action in advance of the electric bicycle entering the identified location.

Examples of a Path Lighting System

As described herein, in some embodiments, the electric bicycle 100 provides path specific lighting patterns and intensities when an electric bicycle enters or is traveling along a bicycle path. For example, the electric bicycle can utilize various lighting devices (e.g., laser illumination devices) to illuminate the edges, borders, shape, and/or center line of the bicycle path.

Figure 17:
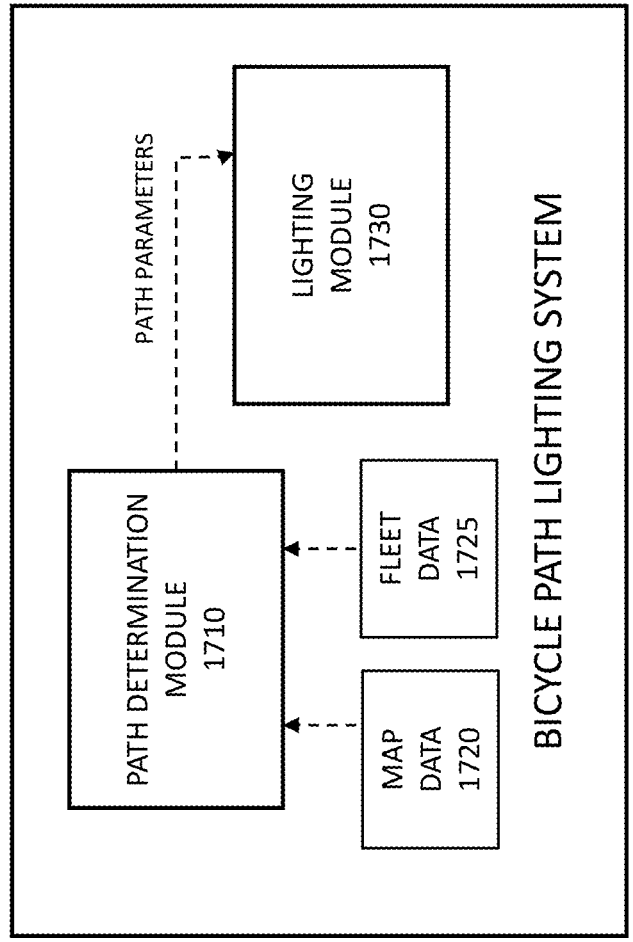
FIG. 17 is a block diagram illustrating components of a path lighting system.

FIG. 17 is a block diagram illustrating components of a path lighting system 1700. The components and/or modules of the path lighting system 1700 (which can be supported or included by the safety system 130 and/or the fleet management server 140) can be implemented with a combination of software (e.g., executable instructions, or computer code) and hardware (e.g., at least a memory and processor). Accordingly, as used herein, in some example embodiments, a component/module is a processor-implemented component/module and represents a computing device having a processor that is at least temporarily configured and/or programmed by executable instructions stored in memory to perform one or more of the functions that are described herein. The path lighting system 1700 includes a path determination module 1710 (which accesses map data 1720 and/or fleet data 1725) and a lighting module 1730.

In some embodiments, the bicycle path module 1710 is configured and/or programmed to determine the electric bicycle is traveling on a bicycle path and capture information associated with the bicycle path. For example, the bicycle path module 1710 can determine the electric bicycle is traveling on a bicycle path based on global positioning system (GPS) data captured by the one or more sensors (e.g., GPS sensors) that identifies a current location of the electric bicycle, based on map data (e.g., map data 1720, which is similar to map data 1420) that identifies a current location of the electric bicycle is a location on the bicycle path, based on image data captured by image sensors that identify the area surrounding the bicycle as a bike path, based on path objects (e.g., signs, signals, and so on) that provide an identifier of the bike path to the bicycle, and so on.

Further, the bicycle path module 1710 can capture various types of information about the bicycle path, such as information identifying a level of visibility for a rider of the electric bicycle while traveling on the bicycle path, information identifying a width of the bicycle path, information identifying a type of surface of the bicycle path, information identifying a current weather condition for an environment that includes the bicycle path, and so on.

In some cases, the bicycle path module 1710 can capture or access information from remote servers, such as the fleet management server 140. For example, the module 1710 can capture information associated with the bicycle path (e.g., size or width of path, geometry of path, and so on) from the fleet management server 140 or from a fleet database 1725 of the system 1700, which can include a database that relates bicycle path identifiers and bicycle path size or width information. The module can access similar information from other databases, such as bicycle path information from a public mapping database that includes information relating bicycle paths with bicycle path size and/or location information.

In some embodiments, the lighting module 1730 is configured and/or programmed to generate lighting parameters based on the captured information associated with the bicycle path and cause the electric bicycle to perform a lighting action for the electric bicycle using the generated lighting parameters. For example, the lighting module can perform various actions to illuminate a shape or width of the bicycle path. Example actions include emitting a laser projection that defines a perimeter of the bicycle path traveled by the electric bicycle, emitting a laser projection that creates a center line on the bicycle path traveled by the electric bicycle, and so on.

The lighting module 1730, therefore, generates lighting parameters (e.g., parameters that indicate a size of the laser projection or a location with respect to the moving electric bicycle) based on the information associated with the bicycle path. As an example, the path information can indicate a bike path has a width of 12 feet across and generate lighting parameters that project a right-side edge line 3 feet from the bicycle (e.g., the bicycle being in a center of the right side of the path) and a left side edge 9 feet from the bicycle, to create a box or channel within the bike path during low or dark lighting conditions.

Similarly, the module 1730 can generate lighting parameters that project a centerline that is 3 feet from the bicycle (e.g., the bicycle being in a center of the right side of the path) to line of illumination on the center of the bike path during low or dark lighting conditions.

Figure 18:
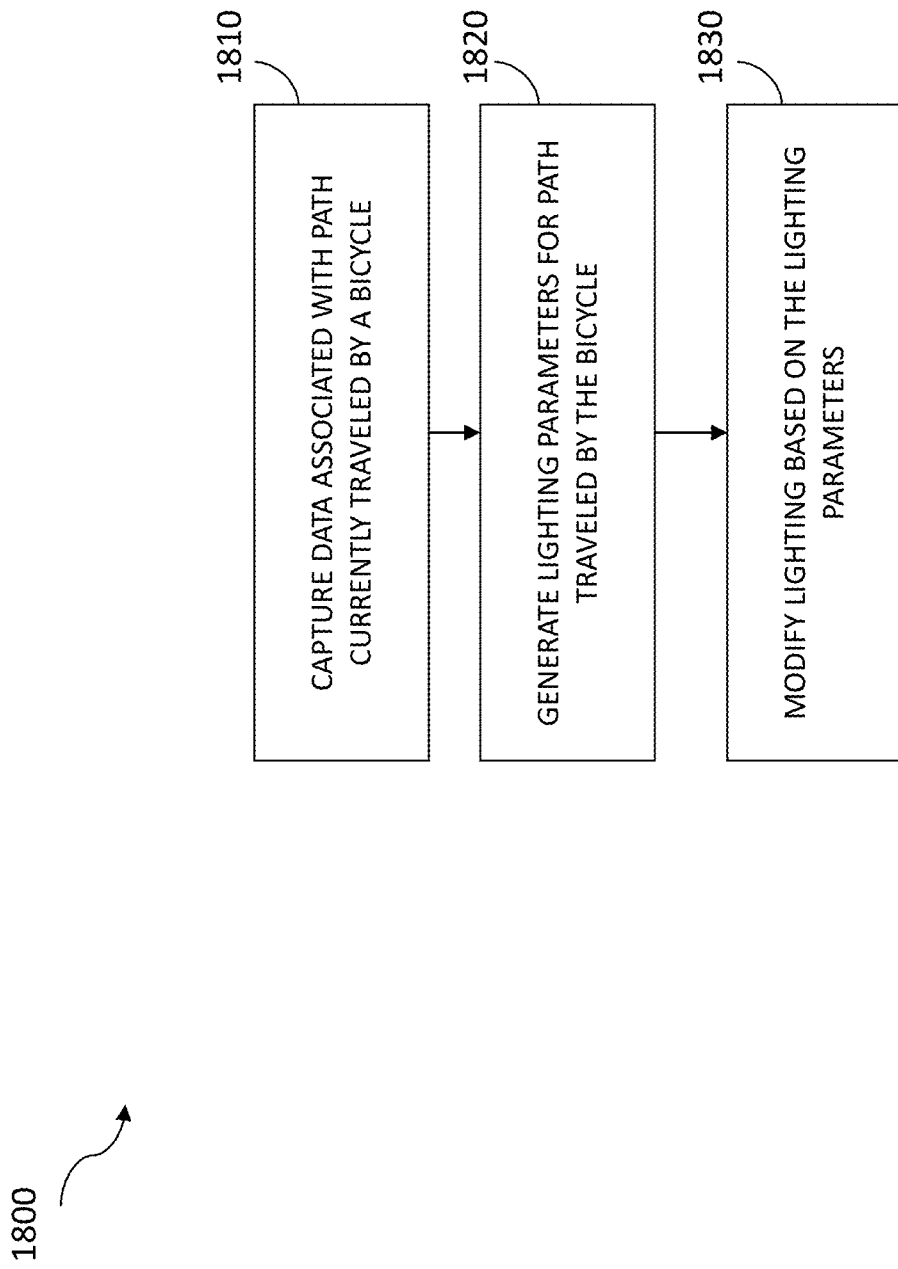
FIG. 18 is a flow diagram illustrating an example method for performing a safety action based on a determination of a path traveled by an electric bicycle.

As described herein, the path lighting system 1700 performs various processes or methods to illuminate a bicycle path for an electric bicycle. FIG. 18 is a flow diagram illustrating an example method 1800 for performing a safety action based on a determination of a path traveled by an electric bicycle. The method 1800 may be performed by the path lighting system 1700 and, accordingly, is described herein merely by way of reference thereto. It will be appreciated that the method 1800 may be performed on any suitable hardware.

In operation 1810, the path lighting system 1700 determines the electric bicycle is traveling on a bicycle path and captures information associated with the bicycle path. For example, the bicycle path module 1710 can capture various types of information about the bicycle path, such as information identifying a level of visibility for a rider of the electric bicycle while traveling on the bicycle path, information identifying a width of the bicycle path, information identifying a type of surface of the bicycle path, information identifying a current weather condition for an environment that includes the bicycle path, and so on.

In operation 1820, the path lighting system 1700 generates lighting parameters based on the captured information associated with the bicycle path and causes, in operation 1830, the electric bicycle to perform a lighting action for the electric bicycle using the generated lighting parameters. For example, the module 1730 can generate lighting parameters that project a centerline that is 3 feet from the bicycle (e.g., the bicycle being in a center of the right side of the path) to line of illumination on the center of the bike path during low or dark lighting conditions.

Figure 19A:
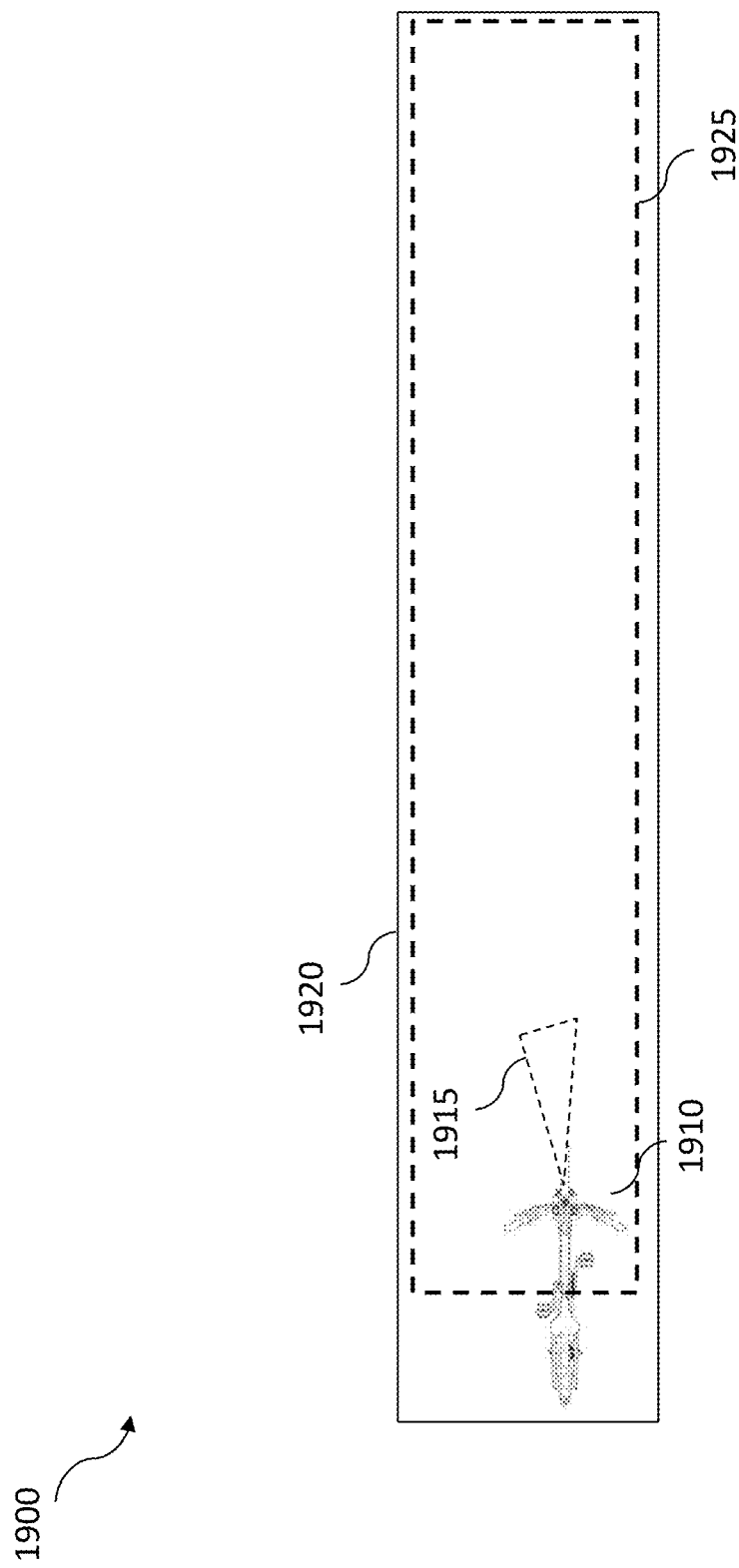
FIGS. 19A-19B are diagrams illustrating different path-based safety actions.
Figure 19B:
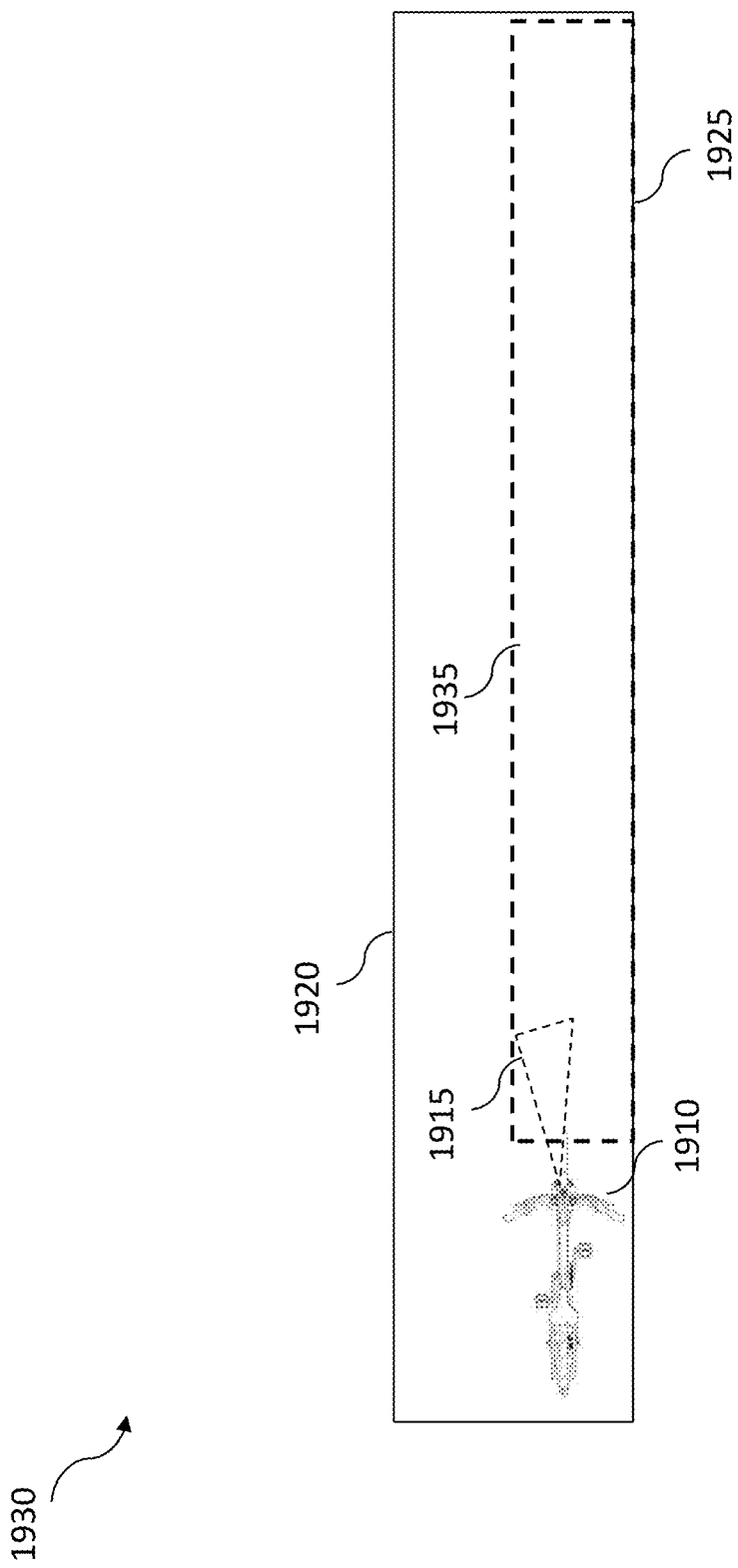

FIGS. 19A-19B illustrate scenarios reflecting the types of lighting actions performed by the system 1800 when an electric bicycle is determined to be on a bicycle path or other dark corridor or road.

For example, FIG. 19A depicts a scenario 1900 where an electric bicycle 1910 travels along a bicycle path 1920 in dark or poor visibility conditions (e.g., at night or during a foggy morning), projecting a front beam 1915 from head lamp. The path lighting system 1700 captures information about the path 1920, such as the width of the path 1920, and generates lighting parameters associated with the width of the path 1920, such as parameters that define a laser illumination box 1925 to project around and in front of the electric bicycle 1910. Using the parameters, the electric bicycle 1910, via side or front lighting devices, projects the laser illumination, such as the box 1925, to create a lane of travel for the bicycle 1910 that approximates the width of the path 1920.

The laser illumination box 1925 can take on different shapes or geometries and surround the bicycle 1910 at different locations. For example, as depicted in FIG. 19A, the box 1925 is shaped such that a right edge is closer to the bicycle 1910, while the left edge is away from the bicycle 1910, in order to outline the bike path 1920 while the bicycle 1910 travels on one side (e.g., the right side) of the path 1920, and thus on within the right side within the box 1925.

Of course, the bicycle can project other illumination to orient the bicycle 1910 along the path 1920, such as edge lines, a front arrow that modifies its position as the path changes shape along a route of travel, and so on. For example, FIG. 19B depicts a scenario 1930 where the electric bicycle 1910 creates and illuminates a center line 1935 on the path 1920, similar to the box 1925, in order to guide the rider of the bicycle 1910 along the path 1920 at a safe location or area on the path (e.g., on the right side).

Thus, as described herein, the system 1700 can present various lighting options when a bicycle is determined to be riding along a bicycle path, such as actions of emitting a laser projection that defines a perimeter of the bicycle path traveled by the electric bicycle, actions of emitting a laser projection that creates a center line on the bicycle path traveled by the electric bicycle, actions of adjusting an intensity of light emitted by a head lamp of the electric bicycle, actions of adjusting a shape of a light envelope projected around the electric bicycle, and so on.

The system 1700 therefore, performs operations to create a safe, or safer, riding experience on a bicycle path. For example, the system 1700, which is stored in memory of the controller 215 of the electric bicycle 200, can determine the electric bicycle is traveling on a bicycle path, capture information associated with a width or size of the bicycle path, and cause the electric bicycle to perform a lighting action for the electric bicycle using the captured information. The lighting action can include emitting a laser projection that creates a center line on the bicycle path traveled by the electric bicycle and/or creates a lighted perimeter of the bicycle path traveled by the electric bicycle.

Examples of a Bicycle Control System

As described herein, in some embodiments, the electric bicycle 110 modifies operations (e.g., adjusts a top speed or available pedal assist level) based on the rider on the bicycle 110 and/or a detected or determined position of the rider on the bicycle 110.

Figure 20:
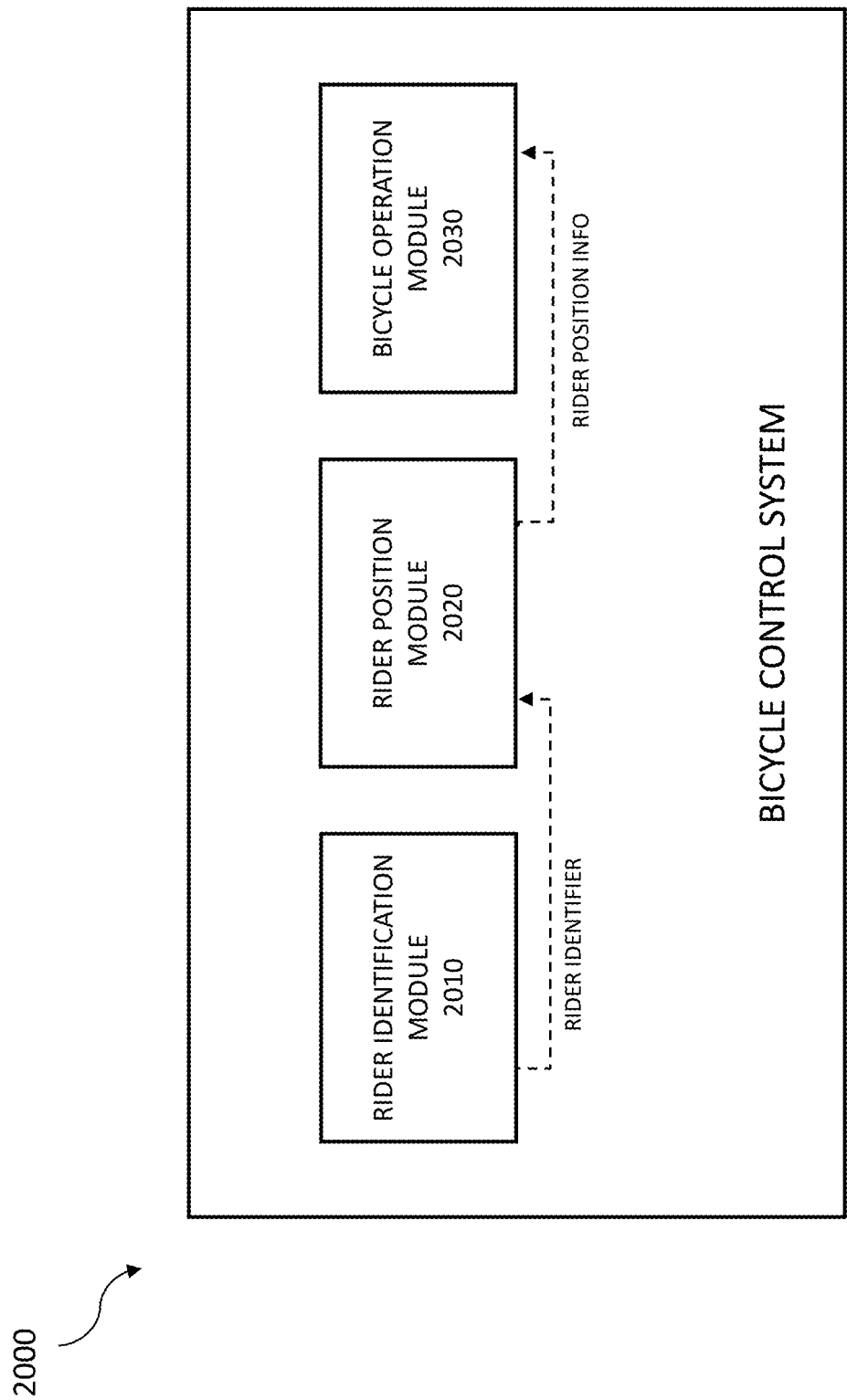
FIG. 20 is a block diagram illustrating components of a bicycle control system.

FIG. 20 is a block diagram illustrating components of a bicycle control system 2000. The components and/or modules of the bicycle control system 2000 (which can be supported or included by the safety system 130 and/or the fleet management server 140) can be implemented with a combination of software (e.g., executable instructions, or computer code) and hardware (e.g., at least a memory and processor). Accordingly, as used herein, in some example embodiments, a component/module is a processor-implemented component/module and represents a computing device having a processor that is at least temporarily configured and/or programmed by executable instructions stored in memory to perform one or more of the functions that are described herein. The bicycle control system 2000 includes a rider identification module 2010, a rider position module 2020, and a bicycle operation module 2030.

In some embodiments, the rider identification module 2010 is configured and/or programmed to identify a rider of the electric bicycle. For example, the rider identification module 2010 can identify the rider from credentials provided by the rider via the user interface and/or via certain personal characteristics, such as a weight distribution of the rider, a seat height or other configuration of the rider, and so on. In some cases, for electric bicycles owned and operated by a single rider, the module 2010 can assume or default to a rider always being the owner of the bicycle.

However, in cases where electric bicycles are utilized by multiple riders (e.g., fleet operations, bike share service, families, and so on), the module 2010 can identify the rider based on credentials provided by the rider, such as log in or payment credentials, employee credentials (for fleet users), a paired key fob or mobile device, and so on.

In some embodiments, the rider position module 2020 is configured and/or programmed to determine a current position of the rider on the electric bicycle. For example, the rider position module 2020 can determine the rider is in a safe, normal, or suitable position on the bicycle (e.g., seated and both hands on the handlebars with both feet on the pedals) or an unsafe or unsuitable position (e.g., seated but leaning back, one hand on the handlebars, both legs on one side of the bicycle, and so on).

The rider position module 2020 can determine the current position based on data captured by various sensors 250 of the bicycle, such as the electric bicycle 200. For example, the module 2020:

determines a current position of the rider on the electric bicycle is a suitable position based on information captured by a force sensor at a seat of the electric bicycle, force sensor at the pedals, and force sensors at grips of handlebars of the electric bicycle;

determines a current position of the rider on the electric bicycle is a suitable position based on weight information (e.g., a distribution of weight) captured by a force sensor at a seat of the electric bicycle;

determines a current position of the rider on the electric bicycle is a suitable position based on weight information captured by a force sensor at a seat of the electric bicycle and based on pedal sensors at pedals of the electric bicycle that capture forces applied to the pedals of the electric bicycle;

determines a current position of the rider on the electric bicycle is a suitable position based on grip information captured by force sensors at grips of handlebars of the electric bicycle and based on pedal sensors at pedals of the electric bicycle that capture forces applied to the pedals of the electric bicycle; and so on.

In some embodiments, the bicycle control module 2030 is configured and/or programmed to control one or more operations of the electric bicycle based on the identification of the rider of the electric bicycle and/or based on the determined current position of the rider on the electric bicycle. For example, can modify operations in a variety of ways, such as by:

restricting or lowering a top speed of the electric bicycle based on the identification of the rider of the electric bicycle and/or based on the determined current position of the rider on the electric bicycle;

performing a braking operation for the electric bicycle based on the identification of the rider of the electric bicycle and/or based on the determined current position of the rider on the electric bicycle;

limiting an available pedal assist (PAS) level of operation for the electric bicycle based on the identification of the rider of the electric bicycle and/or based on the determined current position of the rider on the electric bicycle;

preventing a throttle type operation for the electric bicycle based on the identification of the rider of the electric bicycle and/or based on the determined current position of the rider on the electric bicycle;

restricting a top speed of the electric bicycle based on the identification of the rider of the electric bicycle as a new rider of the electric bicycle and based on the determined current position of the rider on the electric bicycle being an unfavorable or undesirable position for riding the electric bicycle;

when the electric bicycle is part of a fleet of electric bicycles provided to riders via a bicycle share service, restricting a top speed of the electric bicycle based on the identification of the rider of the electric bicycle as a new rider to the bicycle share service and/or based on the determined current position of the rider on the electric bicycle being an unfavorable position for riding the electric bicycle; and so on.

Thus, the system 2000 considers type of rider (e.g., new, young, inexperienced, new to the bicycle, and so on), and/or rider position (e.g., safe or unsafe position) when determined whether to modify operations or permit complete use of the electric bicycle, among other things. As described herein, the system 2000 can perform various processes or methods when controlling the operation of an electric bicycle.

Figure 21:
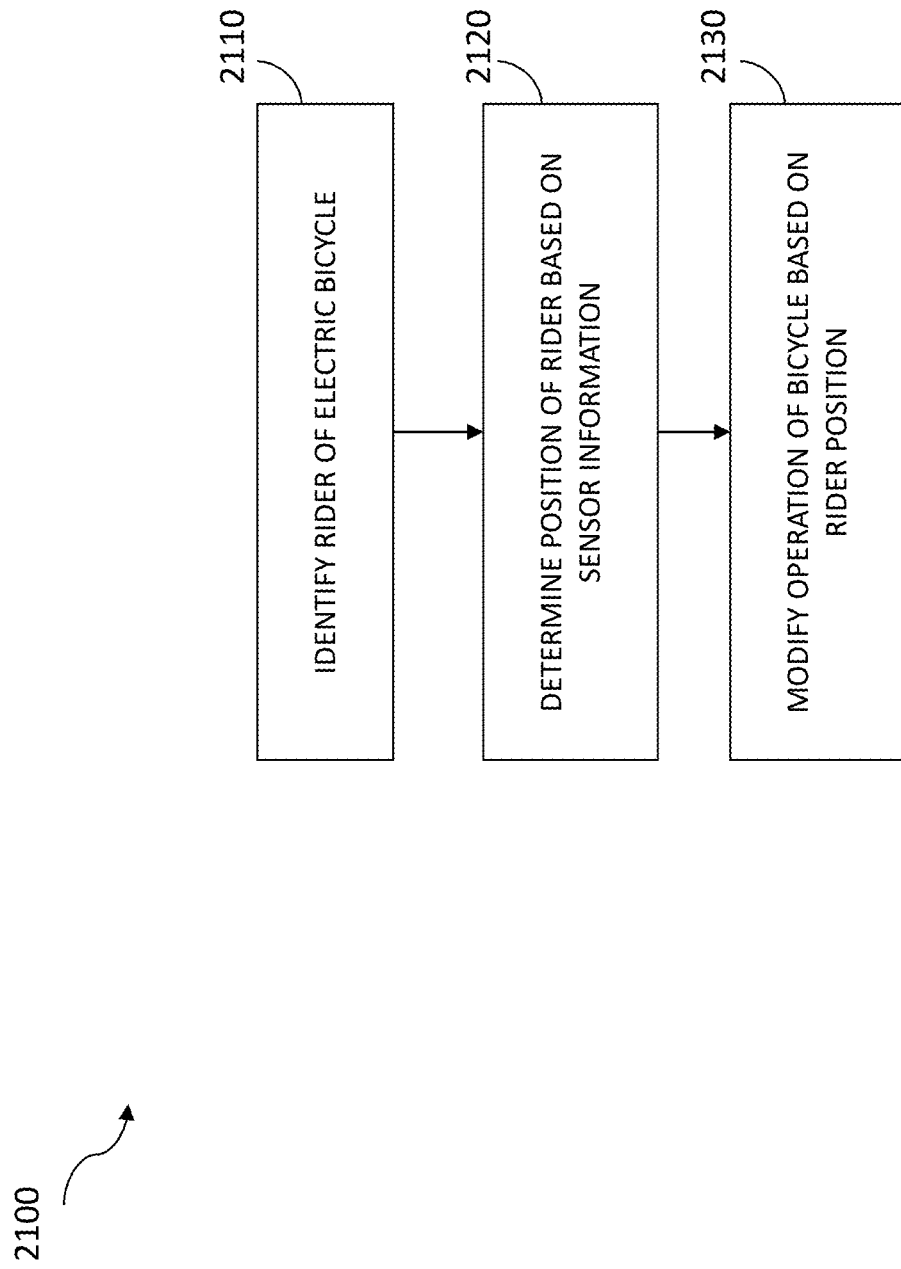
FIG. 21 is a flow diagram illustrating an example method for controlling an operation of an electric bicycle.

FIG. 21 is a flow diagram illustrating an example method 2100 for controlling an operation of an electric bicycle. The method 2100 may be performed by the bicycle control system 2000 and, accordingly, is described herein merely by way of reference thereto. It will be appreciated that the method 2100 may be performed on any suitable hardware.

In operation 2110, the bicycle control system 2000 identifies a rider of the electric bicycle. For example, the rider identification module 2010 can identify the rider from credentials provided by the rider via the user interface and/or via certain personal characteristics, such as a weight distribution of the rider, a seat height or other configuration of the rider, and so on.

Also, as described herein, in cases where electric bicycles are utilized by multiple riders (e.g., fleet operations, bike share service, families, and so on), the module 2010 can identify the rider based on credentials provided by the rider, such as log in or payment credentials, employee credentials (for fleet users), and so on.

In operation 2120, the bicycle control system 2000 determines a current position of the rider on the electric bicycle based on sensor information captured by one or more sensors of the electric bicycle. For example, the rider position module 2020 can determine the rider is in a safe, normal, or suitable position on the bicycle (e.g., seated and both hands on the handlebars with both feet on the pedals) or an unsafe or unsuitable position (e.g., seated but leaning back, one hand on the handlebars, both legs on one side of the bicycle, and so on).

In operation 2130, the bicycle control system 2000 controls one or more operations of the electric bicycle based on the determined current position of the rider on the electric bicycle. For example, the bicycle control module 2030 can modify limits applied to the operation of the electric bicycle as well, such as the top speed or available PAS level for a rider.

Thus, the bicycle control system 2000 can perform the following control operations to provide a safe and enjoyable riding experience to a rider, such as a new rider:

determine the rider is in a position that is associated with a safe riding position on the electric bicycle, and control the one or more operations of the electric bicycle to remove any restricted operations based on the determination that the rider is in a safe riding position on the electric bicycle for a certain period of time (e.g., 3-10 seconds);

determine the rider is in an unsafe position and restrict operations of the electric bicycle until the rider moves into a safe position for a certain period of time (e.g., 3-10 seconds); and so on.

Figure 22:
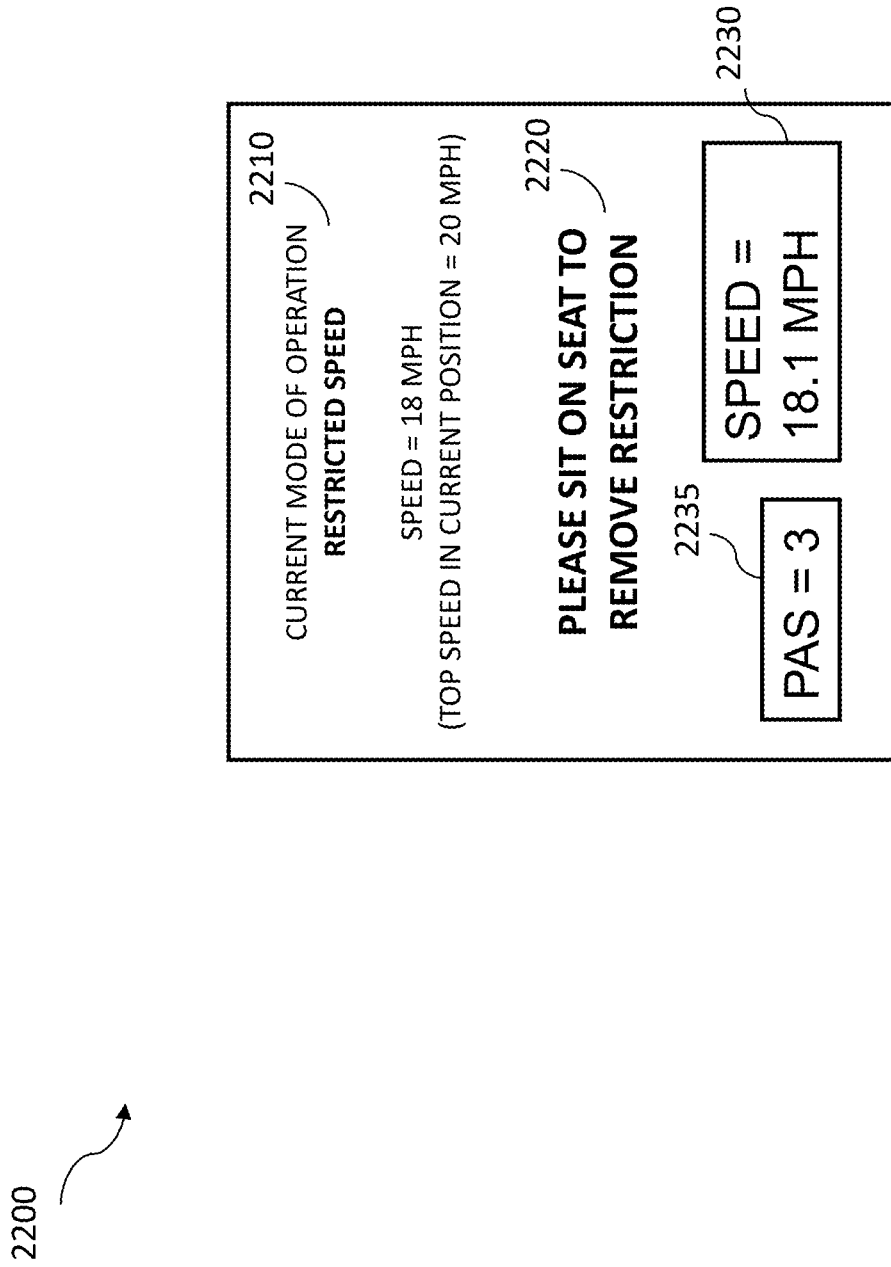
FIGS. 22-23 are diagrams illustrating example user interfaces presented to a rider of an electric bicycle.

The electric bicycle, in some cases, can inform the rider of an applied restriction or other modified operation via a user interface of the bicycle. For example, FIG. 22 depicts a user interface 2200 presented to a rider currently on the electric bicycle in an unsafe position. The user interface 2200 presents information identifying a current mode of operation 2210 (e.g., a "restricted speed" mode), instructions 2220 on what actions to perform to remove the restriction, and information 2230, 2235 that identifies the applied speed and PAS level restrictions.

Figure 23:
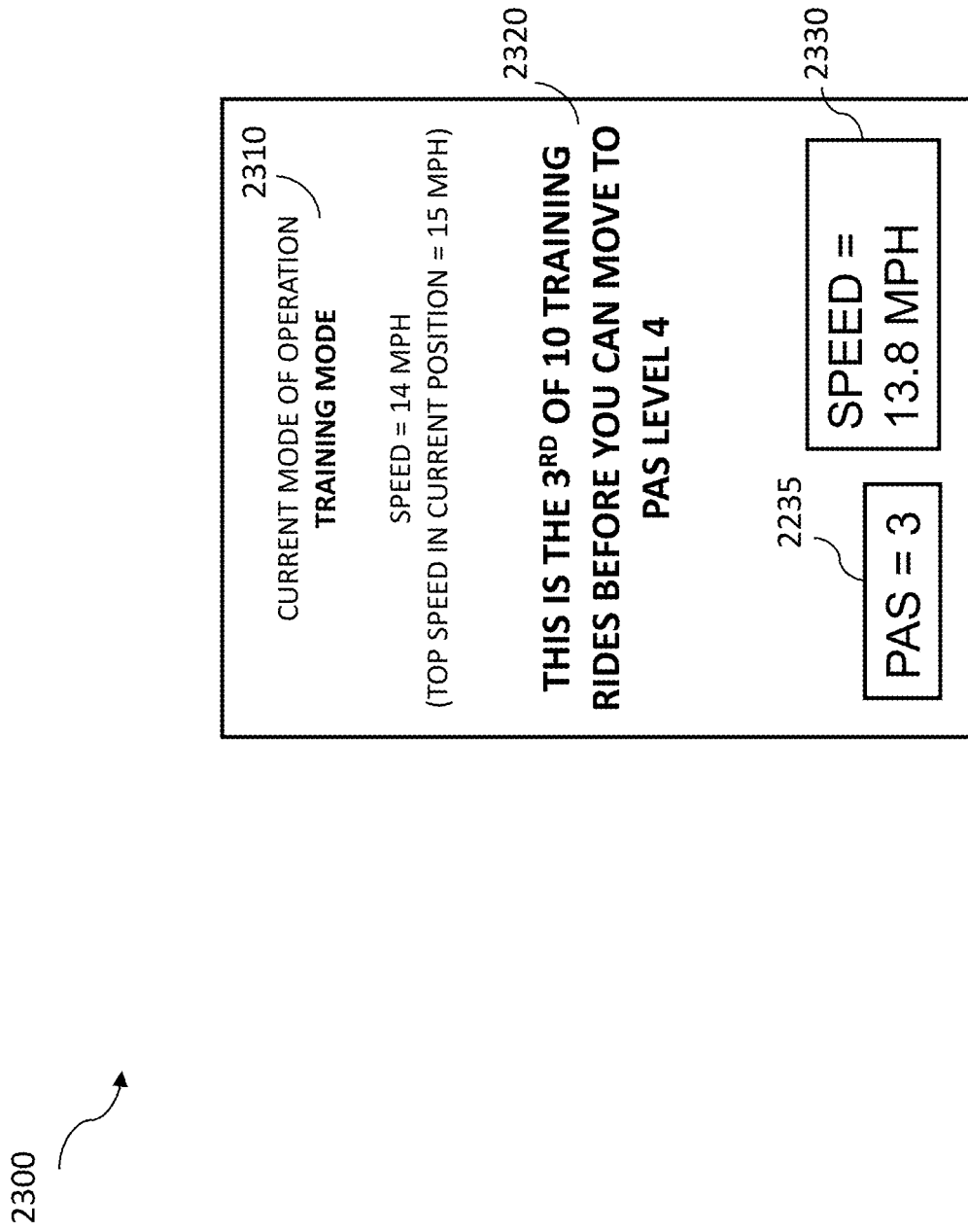

FIG. 23 depicts another user interface 2300, which presents information identifying a current mode of operation 2310 as a "training mode of operation," where the user is new to the electric bicycle. The user interface 2300 presents information 2320 identifying the stage of training (e.g., $3^{rd}$ of 10 rides), as well as information 2330, 2335 that identifies the applied speed and PAS level restrictions. Of course, the system 2000 can render and present other types of information to riders of the electric bicycles.

In some embodiments, the bicycle control system 2300 can control operations based on a mode of operation of the bicycle. For example, the sensor data described herein can determine a current mode of operation (e.g., normal riding mode, hill mode, walking mode) and control operations based on the mode of operation.

Example scenarios include:

The system 2300 determines a bicycle is riding up a hill based on tire pressure sensors measure a delta or difference in the pressure on one tire versus another and/or a front shock is displaced a certain distance and causes a PAS level to increase automatically (or reduce when the sensors indicate the bicycle is going downhill);

The system 2300 determines a rider is standing on their bicycle to pedal harder and auto adjusts the PAS level to meet the effort applied by the rider (e.g., meeting a crank rotation velocity to an adjusted PAS level);

The system 2300 determines the bicycle is in a walk mode of operation, and causes the back wheel to rotate slowly to maintain a pace with the user walking the bicycle;

The system 2300 determines a front wheel is not spinning at a same speed as the back wheel and prevents the throttle from operating, as the bicycle is likely standing up or being held up by the user; and so on.

Thus, in some embodiments, the bicycle control system 2000 provides a safe, enjoyable riding experience to a rider of an electric bicycle by controlling operations of the bicycle to ensure the rider is capable and properly positioned to ride the bicycle in a safe manner. For example, the system 2000, stored in the memory of the controller 215 of the electric bicycle 200, can perform operations to determine a current position of the rider on the electric bicycle is an unsuitable position based on sensor information captured by one or more sensors of the electric bicycle, and restrict one or more operations of the electric bicycle based on the determined current position of the rider on the electric bicycle being the unsuitable position.

Examples of a Friction Detection System

As described herein, in some embodiments, the electric bicycle 100 utilizes sensor information to determine a level of friction applied by a road surface to an electric bicycle, in order to warn a rider of slippery or dangerous conditions (e.g., due to rain, sleet, snow, and so on) and/or perform mitigation operations to mitigate the potential hazardous operation of the bicycle.

Figure 24:
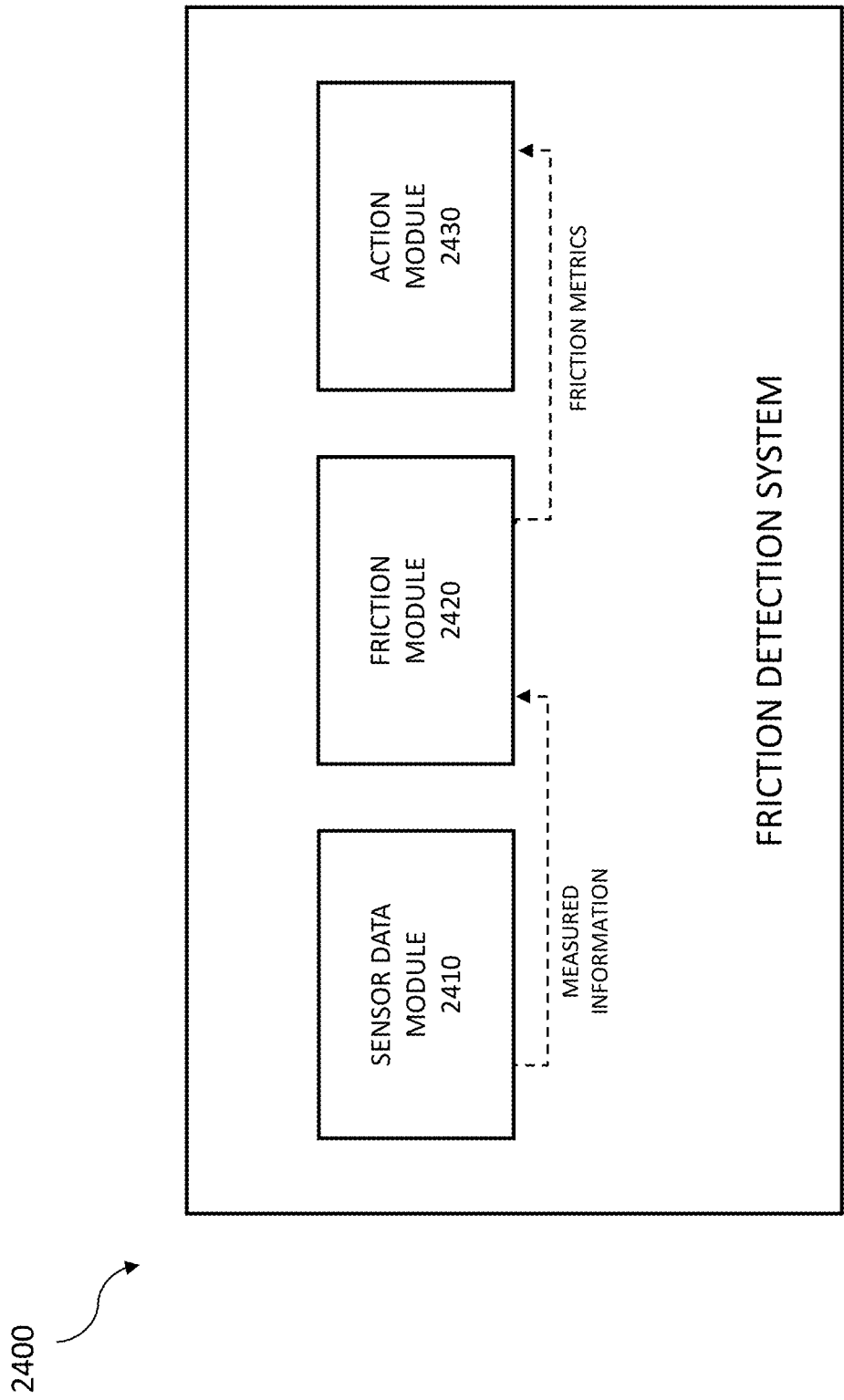
FIG. 24 is a block diagram illustrating components of a friction detection system.

FIG. 24 is a block diagram illustrating components of a friction detection system 2400. The components and/or modules of the friction detection system 2400. (which can be supported or included by the safety system 130 and/or the fleet management server 140) can be implemented with a combination of software (e.g., executable instructions, or computer code) and hardware (e.g., at least a memory and processor). Accordingly, as used herein, in some example embodiments, a component/module is a processor-implemented component/module and represents a computing device having a processor that is at least temporarily configured and/or programmed by executable instructions stored in memory to perform one or more of the functions that are described herein. The friction detection system 2400 includes a sensor data module 2410, a friction module 2420, and an action module 2430.

In some embodiments, the sensor data module 2410 is configured and/or programmed to receive information captured by one or more sensors of the electric bicycle. For example, the sensor data module 2410 can receive or access information measured by the sensors 250 (e.g., an accelerometer or IMUs) that indicates a current operation of the electric bicycle 200, such as forces applied to the bicycle 200 when traveling on a road.

In some embodiments, the friction module 2420 is configured and/or programmed to determine or estimate one or more metrics associated with a contact friction currently applied to the electric bicycle by a road surface upon which the electric bicycle is traveling. For example, the friction module 2420 can determine the metrics by determining multiple force vectors applied to the electric bicycle at a current speed and tilt angle of the electric bicycle from motion data captured by the one or more sensors of the electric bicycle, comparing the multiple force vectors to baseline force vectors for the electric bicycle at the current speed and tilt angle, and determining the one or more metrics based on the comparison of the multiple force vectors to baseline force vectors for the electric bicycle.

In some cases, the sensor data module 2410 can also capture or receive information that identifies local weather data (e.g., via moisture or temperature sensors), in order to capture or determine a baseline or anticipated friction level. Further, the friction module 2420 can access tire pressure information, and utilize such information when determining and/or comparing force vectors, in order to accurately determining the metrics for the bicycle.

Thus, the friction module 2420 can determine or estimate the one or more metrics associated with the contact friction currently applied to the electric bicycle based on force vectors determined for the electric bicycle from accelerometer data that identifies a current speed and tilt angle for the electric bicycle.

In some embodiments, the action module 2430 is configured and/or programmed to perform an action in response to the estimated contact friction currently applied to the electric bicycle. For example, the action module 2430 can present an alert to a rider of the electric bicycle via a user interface of the electric bicycle that indicates a slippery condition on the road surface upon which the electric bicycle is traveling, can perform an automatic braking operation when the one or more metrics represent a slippery condition on the road surface upon which the electric bicycle is traveling, can present a haptic feedback warning to a rider of the electric bicycle that indicates a slippery condition or dangerous level of traction on the road surface upon which the electric bicycle is traveling; and so on.

Figure 25:
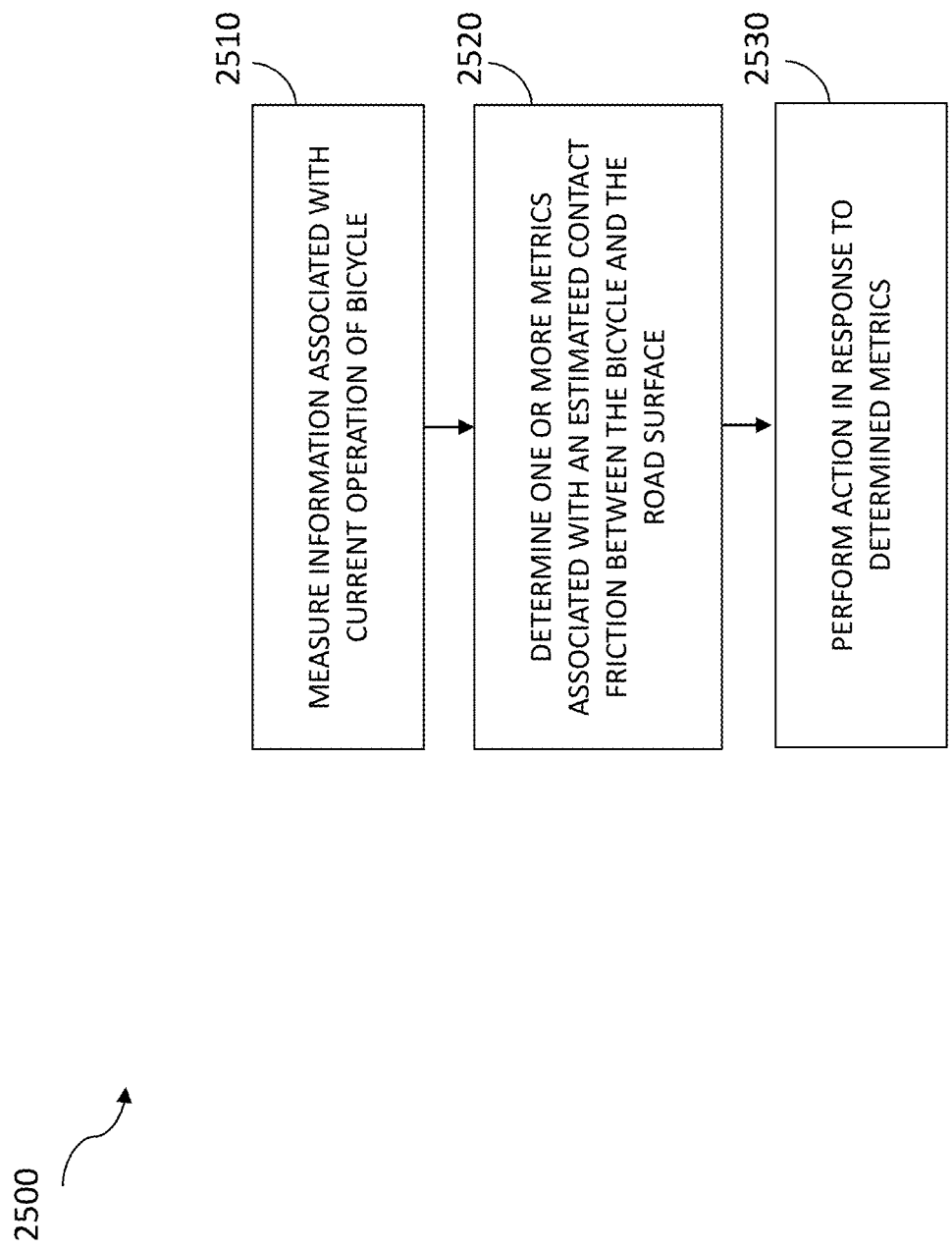
FIG. 25 is a flow diagram illustrating an example method for alerting a rider of an electric bicycle of a current traction condition for the electric bicycle.

As described herein, the friction detection system 2400 performs various processes and methods when determining that an electric bicycle may slip on a road surface. FIG. 25 is a flow diagram illustrating an example method 2500 for alerting a rider of an electric bicycle of a current traction condition for the electric bicycle. The method 2500 may be performed by the friction detection system 2400 and, accordingly, is described herein merely by way of reference thereto. It will be appreciated that the method 2500 may be performed on any suitable hardware.

In operation 2510, the friction detection system 2400 receives information captured by one or more sensors of the electric bicycle, such as information captured by accelerometers or IMUs of the electric bicycle that indicates operational information (e.g., force vectors) for the bicycle. For example, the sensor data module 2410 can receive or access information measured by the sensors 250 (e.g., an accelerometer or IMUs located on a frame of the bicycle, such as at the center of mass of the bicycle) that indicates a current operation of the electric bicycle 200, such as forces applied to the bicycle 200 when traveling on a road.

In operation 2520, the friction detection system 2400 determines one or more metrics associated with a contact friction currently applied to the electric bicycle by a road surface upon which the electric bicycle is traveling. For example, the friction module 2420 can determine or estimate the one or more metrics associated with the contact friction currently applied to the electric bicycle based on force vectors determined for the electric bicycle from accelerometer data that identifies a current speed and tilt angle for the electric bicycle.

In operation 2530, the friction detection system 2400 performs an action in response to the estimated contact friction currently applied to the electric bicycle. For example, the action module 2430 can present an alert to a rider of the electric bicycle via a user interface of the electric bicycle that indicates a slippery condition on the road surface upon which the electric bicycle is traveling, can perform an automatic braking operation when the one or more metrics represent a slippery condition on the road surface upon which the electric bicycle is traveling, can present a haptic feedback warning to a rider of the electric bicycle that indicates a slippery condition or dangerous level of traction on the road surface upon which the electric bicycle is traveling; and so on.

Figure 26:
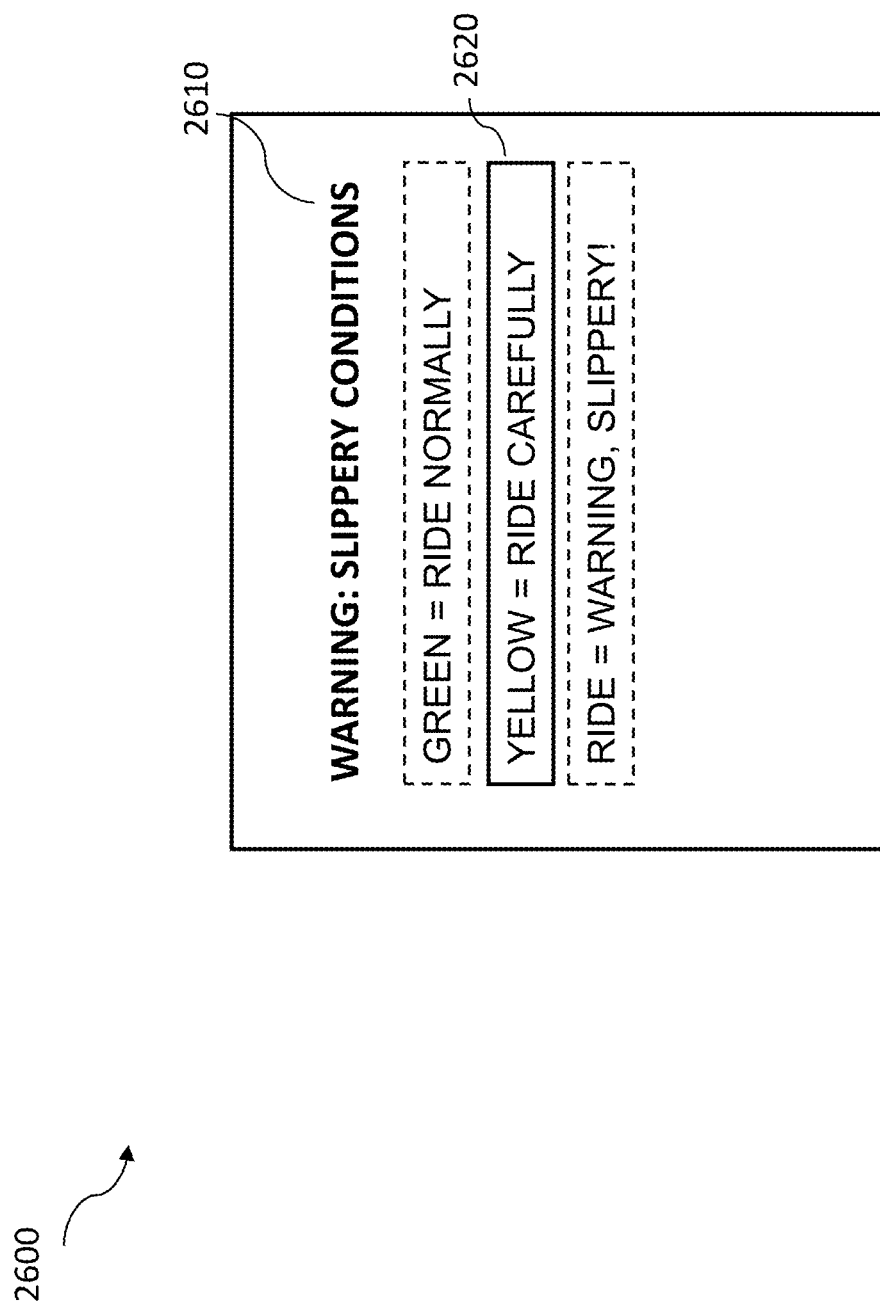
FIG. 26 is a diagram illustrating an example user interface presented to a rider of an electric bicycle.

FIG. 26 depicts an example user interface 2600 presented to a rider of an electric bicycle. The user interface 2600 includes a warning message 2610 (e.g., "slippery conditions") that includes a currently detected level of traction for the bicycle, such as a warning 2620 to ride carefully. Thus, the electric bicycle can display information to a rider that warns the rider of slippery or dangerous conditions. Further, as described herein, the bicycle can modify operations, such as slow down, based on certain detected conditions, in order to provide a safe or safer riding experience to the rider.

The system 2400, therefore, performs operations to provide a safe riding experience in a variety of conditions (e.g., cold weather, snow, rain, sleet, and so on). For example, the system 2400 stored in the memory of the controller 215 of the electric bicycle 200, can perform operations to identify, from one or more sensors of the electric bicycle, an unsafe environmental condition at an environment within which the electric bicycle is traveling, determine a friction condition for a road surface upon which the electric bicycle is traveling through the environment, and perform an action in response to the determined friction condition for the road surface upon which the electric bicycle is traveling through the environment.

Example Embodiments of the Technology

The following are example embodiments of the technology, as described herein.

In some embodiments, a rider safety system is stored in memory of the controller of an electric bicycle and includes:

a hazard detection module that receives data captured by one or more sensors and from an environment through which an electric bicycle is traveling and detects an occurrence of a potential hazard to the electric bicycle or to a rider of the electric bicycle and an imminence of the potential hazard to the electric bicycle or to the rider of the electric bicycle; an action selection module that selects a safety action based on the occurrence of the potential hazard and the imminence of the potential hazard; and an action module that causes the electric bicycle to perform the selected safety action in response to the detected potential hazard.

For example, the rider safety system can perform a method of detecting an occurrence of a potential hazard to the electric bicycle or to a rider of the electric bicycle based on data from an environment through which the electric bicycle is traveling that is captured by one or more sensors of the electric bicycle and selecting a safety action based on the occurrence of the potential hazard, where the selected safety action includes a safety action that alerts the rider to the occurrence of the potential hazard to the electric bicycle or to the rider of the electric bicycle, and a safety action that causes the electric bicycle to warn an entity associated with the potential hazard of the occurrence of the potential hazard.

In some embodiments, a rider safety system is stored in memory of the controller of an electric bicycle and includes: a hazard detection module that receives data captured by the one or more sensors and from an environment through which the electric bicycle is traveling and detects an occurrence of a potential hazard to the electric bicycle or to a rider of the electric bicycle; an action selection module that selects a safety action based on the occurrence of the potential hazard, where the selected safety action includes an action performed by the one or more haptic actuators of the electric bicycle; and an action module that causes the electric bicycle to perform the selected safety action in response to the detected potential hazard.

For example, the rider safety system can perform a method of detecting an occurrence of a potential hazard to the electric bicycle or to a rider of the electric bicycle, selecting a safety action based on the occurrence of the potential hazard, where the selected safety action includes presenting haptic feedback to a rider of the electric bicycle, causing the electric bicycle to perform the selected safety action in response to the detected potential hazard, determining that the rider of the electric bicycle has performed a turning operation or a braking operation in response to the selected safety action, and causing the electric bicycle to stop performance of the selected safety action in response to the turning operation or the braking operation.

In some embodiments, a rider safety system is stored in memory of the controller of an electric bicycle and includes: an object detection module that receives data captured by the one or more sensors and from an environment through which the electric bicycle is traveling and determines an identification of an object within the environment through which the electric bicycle is traveling and a location of the object within the environment through which the electric bicycle is traveling; an action selection module that selects a safety action based on the identification of the object and the location of the object within the environment through which the electric bicycle is traveling; and an action module that causes the electric bicycle to perform the selected safety action in response to the identification of the object.

For example, the rider safety system can perform a method of receiving data captured by the one or more sensors and from an environment through which the electric bicycle is traveling, determining a ride context for the electric bicycle while traveling through the environment, identifying an object within the environment through which the electric bicycle is traveling based on the data captured by the one or more sensors and from the determined ride context, selecting a safety action based on the identification of the object, and causing the electric bicycle to perform the selected safety action in response to the identification of the object.

In some embodiments, a bicycle visibility system is stored in memory of the controller of an electric bicycle and includes: a hazard detection module that receives data captured by the one or more sensors and from an environment through which the electric bicycle is traveling and detects an occurrence of a potential hazard to the electric bicycle or to a rider of the electric bicycle and a context associated with the occurrence of the potential hazard; a device selection module that selects one or more safety devices based on the occurrence of the potential hazard and the context of the occurrence of the potential hazard; and an action module that causes the electric bicycle to perform a visibility action for the electric bicycle using the selected one or more safety devices.

For example, the bicycle visibility system can perform a method of detecting a potential hazard proximate to an electric bicycle, determining a context associated with a path traveled by the electric bicycle, selecting one or more lighting devices based on the potential hazard and the determined context of the path traveled by the electric bicycle, and causing the electric bicycle to perform a visibility action for the electric bicycle using the selected one or more lighting devices.

In some embodiments, an automatic lighting system is stored in memory of the controller of an electric bicycle and includes: a bicycle context module that determines a ride context associated with an environment through which the electric bicycle is traveling; and a lighting module that selects one or more lighting devices based on the ride context of the environment through which the electric bicycle is traveling and causes the electric bicycle to perform a lighting action for the electric bicycle using the selected one or more lighting devices that is based on the ride context associated with the environment through which the electric bicycle is traveling.

For example, the automatic lighting system can perform a method of transmitting location information for a location that includes the electric bicycle to a fleet management server that manages a fleet of electric bicycles that includes the electric bicycle, receiving, from the fleet management server, an indication that the location is currently an unsafe location for bicycles, and causing the electric bicycle to perform a visibility action in response to the indication of the unsafe location for bicycles.

In some embodiments, a location-based lighting system is stored in memory of the controller of an electric bicycle and includes: a bicycle location module that identifies a location associated with an environment through which the electric bicycle is traveling; and a lighting module that determines a safety metric for the identified location and causes the electric bicycle to perform a lighting action for the electric bicycle using the multiple lighting devices that is based on the safety metric determined for the location.

For example, the location-based lighting system can perform a method of identifying a location through which the electric bicycle is predicted to enter along a current path of travel, determining a safety metric for the identified location, and causing the electric bicycle to perform a lighting action for the electric bicycle that is based on the safety metric determined for the location, where the lighting action is performed in advance of the electric bicycle entering the identified location.

In some embodiments, a path lighting system is stored in memory of the controller of an electric bicycle and includes: a bicycle path module that determines the electric bicycle is traveling on a bicycle path and captures information associated with the bicycle path; and a lighting module that generates lighting parameters based on the captured information associated with the bicycle path and causes the electric bicycle to perform a lighting action for the electric bicycle using the generated lighting parameters.

For example, the path lighting system can perform a method of determining an electric bicycle is traveling on a bicycle path, capturing information associated with a width of the bicycle path, and causing the electric bicycle to perform a lighting action for the electric bicycle using the captured information, such as an action to illuminate a representative center line for the bicycle path.

In some embodiments, a bicycle control system is stored in memory of the controller of an electric bicycle and includes: a rider identification module that identifies a rider of the electric bicycle; a rider position module that determines a current position of the rider on the electric bicycle; and a control module that controls one or more operations of the electric bicycle based on the identification of the rider of the electric bicycle and based on the determined current position of the rider on the electric bicycle.

For example, the bicycle control system can perform a method of determining a current position of a rider on an electric bicycle is an unsuitable or unfavorable position based on sensor information captured by one or more sensors of the electric bicycle and restricting one or more operations of the electric bicycle based on the determined current position of the rider on the electric bicycle being the unsuitable or unfavorable position.

In some embodiments, a friction detection system is stored in memory of the controller of the electric bicycle and includes: a sensor data module that receives information captured by the one or more sensors of the electric bicycle; a friction module that determines one or more metrics associated with a contact friction currently applied to the electric bicycle by a road surface upon which the electric bicycle is traveling; and an action module that performs an action in response to the estimated contact friction currently applied to the electric bicycle.

For example, the friction detection system can perform a method of identifying, from one or more sensors of the electric bicycle, an unsafe environmental condition at an environment within which the electric bicycle is traveling, determining a friction condition for a road surface upon which the electric bicycle is traveling through the environment, and performing an action in response to the determined friction condition for the road surface upon which the electric bicycle is traveling through the environment.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the electric bike and bike frame may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:
1. An electric bicycle, comprising:
a frame having a head tube, down tube, top tube, and seat tube;
a front wheel attached to the frame via a fork connected to the head tube;
a rear wheel attached to the frame via a dropout assembly of the frame;

an electric motor mounted to the rear wheel that propels the electric bicycle;

a battery pack mounted to the frame of the electric bicycle that provides power to the electric motor;

a controller that controls operations of the battery pack of the electric bicycle and the electric motor of the electric bicycle;

one or more sensors attached to the frame of the electric bicycle;

multiple lighting devices mounted to the frame of the electric bicycle; and a bicycle visibility system stored in memory of the controller and including:
- a hazard detection module that receives data captured by the one or more sensors and from an environment through which the electric bicycle is traveling and detects:
  - an occurrence of a potential hazard to the electric bicycle or to a rider of the electric bicycle; and
  - a context associated with the occurrence of the potential hazard;
- a device selection module that selects one or more safety devices based on the occurrence of the potential hazard and the context of the occurrence of the potential hazard;
- an action module that causes the electric bicycle to perform a visibility action for the electric bicycle using the selected one or more safety devices,
  - wherein the visibility action includes causing lighting devices on a side of the frame of the electric bicycle to generate a three-dimensional shape visible in an area between the electric bicycle and the potential hazard.

2. The electric bicycle of claim 1,
wherein the selected one or more safety devices include the multiple lighting devices mounted to the frame of the electric bicycle;
wherein the multiple lighting devices include a head lamp that emits light having:
- a first shape associated with a normal operation of the electric bicycle; and
- a second shape associated with a safety operation of the electric bicycle; and wherein the action module causes the electric bicycle to perform the visibility action by causing the head lamp to emit light having the second shape associated with a safety operation of the electric bicycle.

3. The electric bicycle of claim 1,
wherein the selected one or more safety devices include the multiple lighting devices mounted to the frame of the electric bicycle;
wherein the multiple lighting devices include:
- a head lamp that emits light in a forward direction; and
- a light mounted to an end of handlebars of the electric bicycle;

wherein the action module causes the electric bicycle to perform the visibility action by causing the head lamp to emit light in the forward direction and causing the light mounted to an end of handlebars of the electric bicycle to emit light to a side direction away from the electric bicycle.

4. The electric bicycle of claim 1,
wherein the selected one or more safety devices include the multiple lighting devices mounted to the frame of the electric bicycle;
wherein the multiple lighting devices include a downlighting system that illuminates a surface under which the electric bicycle is traveling;
wherein the action module causes the electric bicycle to perform the visibility action by causing the downlighting system to modify a shape of illumination of the surface under which the electric bicycle is traveling.

5. The electric bicycle of claim 1, wherein the action module causes the electric bicycle to perform a visibility action that adjusts an angle of illumination for light emitted by a head lamp of the electric bicycle.

6. The electric bicycle of claim 1, wherein the action module causes the electric bicycle to perform a visibility action that dynamically adjusts a shape of light emitted by a head lamp of the electric bicycle.

7. The electric bicycle of claim 1, wherein the action module causes the electric bicycle to perform a visibility action that causes multiple rear lighting devices of the electric bicycle to emit a dynamically changing pattern of light in three-dimensional space behind the electric bicycle.

8. The electric bicycle of claim 1, wherein the action module causes the electric bicycle to perform a visibility action that causes a head lamp of the electric bicycle to adjust a shape of illumination to become visible in an area between the electric bicycle and the potential hazard.

9. The electric bicycle of claim 1, wherein the hazard detection module receives data captured by one or more visibility sensors and determines a visibility context associated with the occurrence of the potential hazard.

10. The electric bicycle of claim 1, wherein the hazard detection module receives data captured by one or more motion sensors and determines a vehicle hazard context associated with the occurrence of the potential hazard.

11. The electric bicycle of claim 1, wherein the hazard detection module receives data captured by one or more location sensors and determines a location safety context associated with the occurrence of the potential hazard.

12. The electric bicycle of claim 1, wherein the hazard detection module receives data captured by one or more light sensors and determines an environmental lighting context associated with the occurrence of the potential hazard.

13. The electric bicycle of claim 1, wherein the hazard detection module determines the occurrence of the potential hazard to the electric bicycle or to the rider of the electric bicycle as a vehicle traveling towards the electric bicycle; and wherein the action module causes the electric bicycle to perform a visibility action that causes a head lamp of the electric bicycle to adjust a shape of illumination to become visible in an area between the electric bicycle and the vehicle.

14. The electric bicycle of claim 1, wherein the hazard detection module determines the occurrence of the potential hazard to the electric bicycle or to the rider of the electric bicycle as a vehicle traveling towards the electric bicycle from a location behind the electric bicycle; and wherein the action module causes the electric bicycle to perform a visibility action that causes multiple rear lighting devices of the electric bicycle to dynamically perform a three-dimensional pattern of illumination.

15. The electric bicycle of claim 1, wherein the device selection module selects an audio safety device that outputs an auditory alarm in a direction of the potential hazard.

16. The electric bicycle of claim 1, wherein the potential hazard is a vehicle, and wherein the device selection module selects a notification device that transmits a message indicating a presence of the electric bicycle to a computing device associated with the vehicle.

17. A method performed by a bicycle visibility system stored in memory of a controller of an electric bicycle, the method comprising:
  receiving data captured by one or more sensors of the electric bicycle and from an environment through which the electric bicycle is traveling;
  detecting an occurrence of a potential hazard to the electric bicycle or to a rider of the electric bicycle, wherein the occurrence of the potential hazard includes a vehicle traveling towards the electric bicycle from a location behind the electric bicycle;
  determining a context associated with a path traveled by the electric bicycle;
  selecting one or more safety devices based on the occurrence of the potential hazard and the determined context of the path traveled by the electric bicycle; and
  causing the electric bicycle to perform a visibility action for the electric bicycle using the selected one or more safety devices,
    wherein the visibility action causes multiple rear lighting devices of the electric bicycle to dynamically perform a three-dimensional pattern of illumination.

18. The method of claim 17, wherein the context associated with a path traveled by the electric bicycle includes a context that identifies a level of visibility for the electric bicycle within the path.

19. A non-transitory computer-readable medium whose contents, when executed by a bicycle visibility system stored in memory of a controller of an electric bicycle, causes the rider bicycle visibility system to perform a method, the method comprising:
  detecting a potential hazard proximate to the electric bicycle;
  selecting one or more lighting devices based on the potential hazard; and
  causing the electric bicycle to generate a three-dimensional pattern of illumination visible in an area between the electric bicycle and the detected potential hazard using the selected one or more lighting devices.

20. The non-transitory computer-readable medium of claim 19, wherein the selected one or more lighting devices include multiple rear lighting devices of the electric bicycle or lighting devices on a side of a frame of the electric bicycle.

* * * * *